US012480333B2

(12) United States Patent
Fisher et al.

(10) Patent No.: US 12,480,333 B2
(45) Date of Patent: Nov. 25, 2025

(54) ELECTRONIC LOCKBOX

(71) Applicant: SentriLock, LLC, Cincinnati, OH (US)

(72) Inventors: Scott R. Fisher, West Chester, OH (US); Alan F. Deardoff, Morrow, OH (US); Nancy C. Griffiths, West Chester, OH (US); Daniel C. Cambron, Lexington, KY (US); Matthew K. Caskey, Loveland, OH (US)

(73) Assignee: SentriLock, LLC, Cincinnati, OH (US)

( * ) Notice: Subject to any disclaimer, the term of this patent is extended or adjusted under 35 U.S.C. 154(b) by 173 days.

(21) Appl. No.: 18/237,181

(22) Filed: Aug. 23, 2023

(65) Prior Publication Data

US 2023/0392412 A1    Dec. 7, 2023

Related U.S. Application Data

(62) Division of application No. 18/105,510, filed on Feb. 3, 2023, now Pat. No. 11,802,421, which is a division
(Continued)

(51) Int. Cl.
*E05B 19/00* (2006.01)
*E05B 47/00* (2006.01)
(Continued)

(52) U.S. Cl.
CPC ...... *E05B 19/0005* (2013.01); *E05B 47/0012* (2013.01); *E05B 65/5246* (2013.01);
(Continued)

(58) Field of Classification Search
CPC ......... E05B 47/0012; E05B 2047/0017; E05B 2047/0024; E05B 2047/0025;
(Continued)

(56) References Cited

U.S. PATENT DOCUMENTS

| | | | |
|---|---|---|---|
| 5,331,830 A * | 7/1994 | Su | E05B 67/063 70/38 A |
| 5,654,696 A | 8/1997 | Barrett | |

(Continued)

FOREIGN PATENT DOCUMENTS

| | | |
|---|---|---|
| WO | 1992014571 | 7/1993 |
| WO | 2011065892 | 6/2011 |
| WO | 2016200814 | 12/2016 |

OTHER PUBLICATIONS

International Search Report, PCT/US19/66836, 21 pages (Jun. 10, 2020).

*Primary Examiner* — Christine M Mills
*Assistant Examiner* — Peter H Watson
(74) *Attorney, Agent, or Firm* — Frederick H. Gribbell; Russell F. Gribbell; William E. Crouse

(57) ABSTRACT

An electronic lockbox uses a rotary actuator with multiple positions to achieve multiple locking states. Multiple positions of the actuator are detected, using optical sensors. The locking mechanism includes an outer sleeve and an inner cylindrical barrel that are coupled with torsion springs. The lockbox has a shackle and a key bin that are retained by the inner barrel when in the locked state, and the barrel can be rotated to either release the shackle or to release the key bin that typically holds a building's key.

5 Claims, 39 Drawing Sheets

Related U.S. Application Data of application No. 16/699,312, filed on Nov. 29, 2019, now Pat. No. 11,598,120.

(60) Provisional application No. 62/824,494, filed on Mar. 27, 2019.

(51) Int. Cl.
*E05B 65/52* (2006.01)
*E05G 1/00* (2006.01)
*E05G 1/04* (2006.01)
*E05G 1/10* (2006.01)
*G07C 9/00* (2020.01)

(52) U.S. Cl.
CPC .............. *E05G 1/005* (2013.01); *E05G 1/04* (2013.01); *E05G 1/10* (2013.01); *G07C 9/00571* (2013.01); *G07C 9/00896* (2013.01); *E05B 2047/0073* (2013.01); *G07C 2009/00936* (2013.01); *G07C 2209/08* (2013.01); *G07C 2209/62* (2013.01)

(58) Field of Classification Search
CPC ..... E05B 2047/0073; E05B 2047/0074; E05B 19/0005; E05B 67/00; E05B 67/063; E05B 67/10; E05G 1/005; E05G 1/04; G07C 9/00571; G07C 9/00896; G07C 2009/00936; G07C 2209/08; G07C 2209/62; Y10T 70/5031
See application file for complete search history.

(56) References Cited

U.S. PATENT DOCUMENTS

| | | | |
|---|---|---|---|
| 5,705,991 A | 1/1998 | Kniffin | |
| 5,791,172 A | 8/1998 | Deighton | |
| 6,427,973 B1 | 8/2002 | Harold | |
| 6,624,742 B1 | 9/2003 | Romano | |
| 6,761,051 B1 | 7/2004 | Tsai | |
| 6,822,553 B1 | 11/2004 | Henderson | |
| 6,842,105 B1 | 1/2005 | Henderson | |
| 6,937,140 B1 | 8/2005 | Outslay | |
| 7,177,819 B2 | 2/2007 | Muncaster | |
| 7,606,558 B2 | 10/2009 | Despain | |
| 7,880,584 B2 | 2/2011 | Larson | |
| 8,040,218 B2 | 10/2011 | Hays | |
| 8,683,833 B2 | 4/2014 | Marschalek | |
| 9,336,637 B2 | 5/2016 | Neil | |
| 11,352,817 B2 | 6/2022 | Gengler | |
| 2002/0060458 A1* | 5/2002 | Roatis | E05B 47/0012 292/199 |
| 2002/0107010 A1 | 8/2002 | Witte | |
| 2004/0219903 A1 | 11/2004 | Despain | |
| 2005/0207087 A1 | 9/2005 | Fisher | |
| 2006/0283216 A1 | 12/2006 | Marcelle | |
| 2007/0156758 A1 | 7/2007 | Adiga | |
| 2008/0246587 A1 | 10/2008 | Fisher | |
| 2009/0153291 A1 | 6/2009 | Larson | |
| 2009/0293562 A1 | 12/2009 | Fisher | |
| 2010/0245107 A1 | 9/2010 | Fulker | |
| 2011/0215597 A1* | 9/2011 | Weum | E05B 47/0012 292/144 |
| 2011/0251876 A1 | 10/2011 | Fisher | |
| 2011/0254659 A1 | 10/2011 | Bowen | |
| 2012/0068817 A1 | 3/2012 | Fisher | |
| 2012/0213362 A1 | 8/2012 | Bliding | |
| 2013/0214903 A1 | 8/2013 | Kalous | |
| 2014/0236350 A1 | 8/2014 | Woodard | |
| 2014/0266586 A1 | 9/2014 | Fisher | |
| 2014/0359292 A1 | 12/2014 | Kawamura | |
| 2016/0119961 A1 | 4/2016 | Hrabak | |
| 2019/0234113 A1 | 8/2019 | Neau | |
| 2019/0383057 A1 | 12/2019 | Larson | |
| 2020/0002973 A1 | 1/2020 | Hill | |
| 2020/0071955 A1 | 3/2020 | Binek | |
| 2020/0071965 A1 | 3/2020 | Zacchio | |
| 2022/0180681 A1 | 6/2022 | Ufkes | |

\* cited by examiner

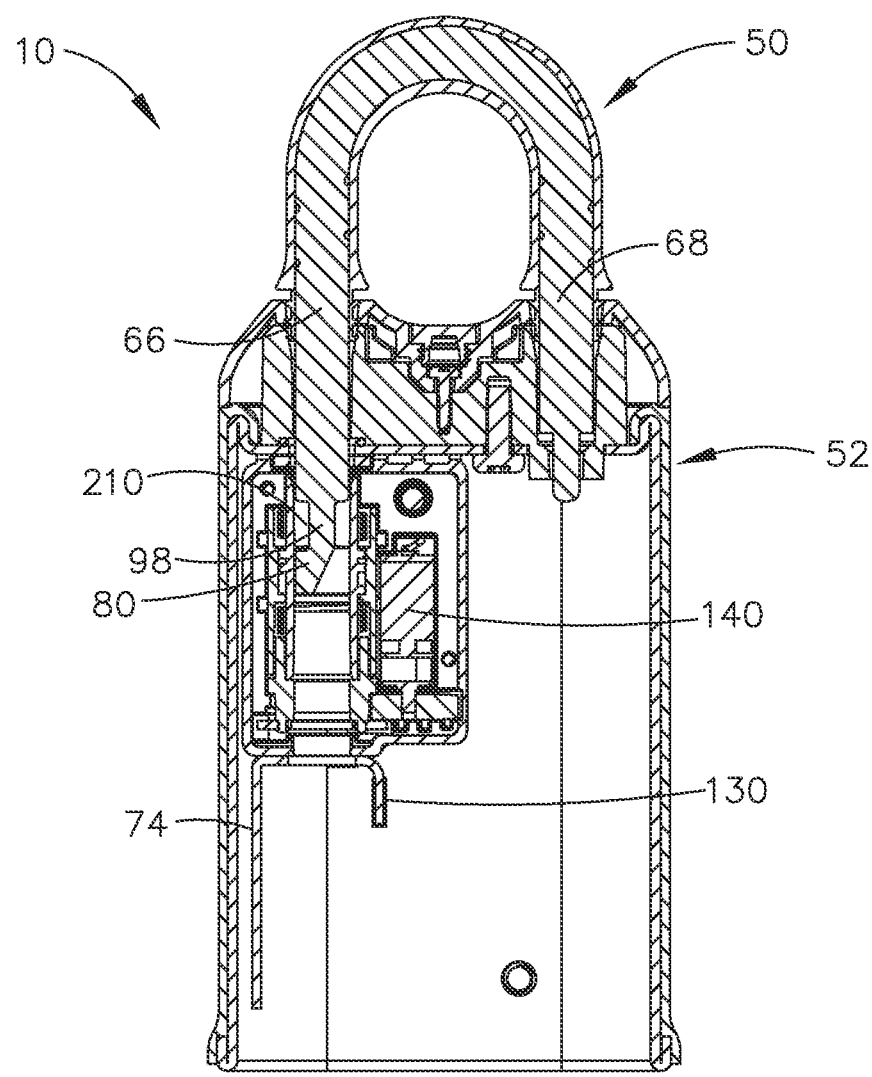
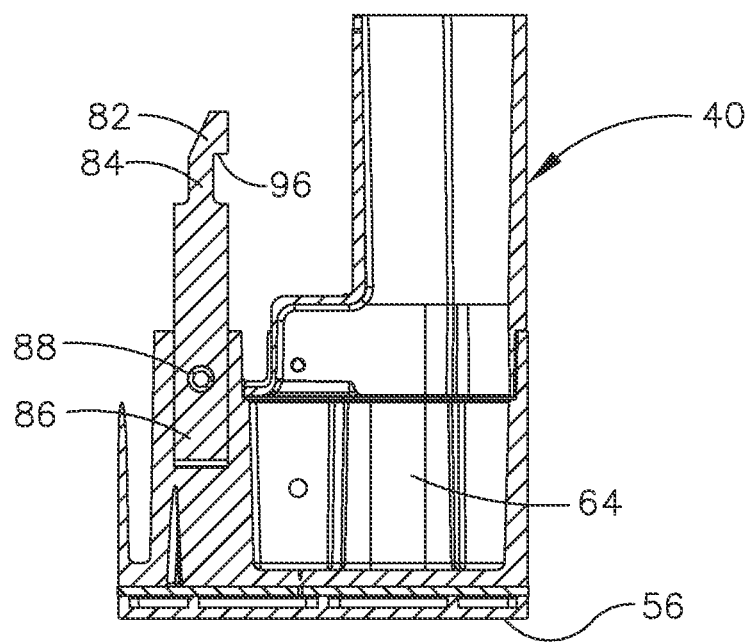
FIG. 22

ELECTRONIC LOCKBOX

CROSS-REFERENCE TO RELATED APPLICATIONS

The present application is a divisional of application Ser. No. 18/105,510, titled "IMPROVED ELECTRONIC LOCKBOX," filed on Feb. 3, 2023, which is a divisional of application Ser. No. 16/699,312, titled "IMPROVED ELECTRONIC LOCKBOX," filed on Nov. 29, 2019; and claims priority to provisional patent application Ser. No. 62/824,494, titled "IMPROVED ELECTRONIC LOCKBOX," filed on Mar. 27, 2019.

TECHNICAL FIELD

The technology disclosed herein relates generally to electronic locking equipment and is particularly directed to an electronic lockbox of the type which uses a rotary actuator with multiple positions to achieve multiple locking states, including a "lock" state, a "shackle release" state, and a "key bin release" state. Embodiments are specifically disclosed as an electronically controlled lockbox with a rotary actuator, in which multiple positions of the actuator are detected preferably using non-contact sensors, such as optical sensors.

The actuator acts as a prime mover (such as an electric motor) that is in mechanical communication with a cylindrical "barrel" that is sized and shaped to interact with latches that can hold (lock) in place a shackle and a key bin. The barrel can be rotated (by the actuator) from its locked position (the "home" position) to either a shackle release position or a key bin release position.

The actuator can also rotate a movable indicator disk that has predetermined openings that act as windows so that, when the disk is rotated to a predetermined position, one of the windows will uncover an optical sensor. In one embodiment, there are two optical photosensors (such as photodiodes) and two light-emitting devices (such as LEDs), and if the indicator disk is rotated to a "home position," both photosensors are uncovered because of a first window ("window #1"), and both can see the corresponding optical signals being emitted by the two LEDs. This is the locked state for both the shackle and the key bin.

When the indicator disk is rotated in either direction by a predetermined minimum angular distance, then the first window becomes "closed" and neither photosensor can see the optical signals being emitted by the two LEDs. This is still a locked state, until the indicator disk becomes rotated to an extent where it reaches one of two other predetermined positions. One of those positions is in the clockwise (CW) direction of disk rotation, and the other position is in the counterclockwise (CCW) direction of disk rotation.

When the indicator disk is rotated in a direction #1 (either CW or CCW) by a predetermined angular distance, a second window in the indicator disk uncovers the first LED-photosensor pair, such that the first photosensor again receives the optical signal being emitted by that first LED. When that occurs, the key bin latch is released, and a human user can obtain access to the building key that has been placed within the key bin.

A similar result is obtained if the indicator disk is rotated in a direction #2 from the home position, which is the opposite (CW or CCW) rotational direction from direction #1. After being rotated by a predetermined distance in the second rotation direction, a third optical window in the disk uncovers the second LED-photosensor pair, such that the second photosensor again receives the optical signal being emitted by that second LED. When that occurs, the shackle is released, and a human user can either install or remove the lockbox (from its previously mounted position, on a doorknob, for example).

The lockbox includes a system controller with a computer processing circuit that is programmed to keep track of the positioning of the actuator, and thereby knows which of the positions the actuator has moved to, under control of the software programming and according to commands entered by a human user of the lockbox system. A sensing circuit for the optical sensors includes an analog-to-digital (A/D) converter that receives an analog voltage signal from the photosensors, and converts that to a digital number; or alternatively, a voltage threshold detector could instead be used to sense the output signals from the optical sensors. The computer processing circuit also can have a capability to sense logic level binary bits as representing the output valve of the optical sensors.

As the indicator disk is rotated, the received light is converted to an electrical signal by each photosensor, and the A/D converter samples those signals at a fast rate, so that the computer processing circuit can make decisions about "where" the actuator is currently positioned, essentially in real time. Typically, the processing circuit is looking for an "edge" of a positive-going or negative-going signal that signifies a significant change of state in the amplitude of optical energy being received by the photosensor(s). When that edge is detected, the processing circuit will stop the electric motor (the actuator) that was causing the movement of the indicator disk. The locking system has now reached a new state, either a release state for the shackle or for the key bin, or back to the home position (which is the locked or "armed" state).

In a preferred embodiment, the outer sleeve of the locking mechanism has two portions, referred to herein as a "top sleeve portion" and a "bottom sleeve portion.". The "bottom sleeve portion" rotates with the indicator disk, and when rotated in direction #1, it has a tab portion #1 that causes the "top sleeve portion" to also rotate (in direction #1). When rotated in direction #2, a torsion spring #1 causes the "top sleeve portion" to rotate (in direction #2), rather than using a tab portion.

When the top sleeve portion rotates, either a tab portion #2 or a torsion spring #2 causes the cylindrical barrel to rotate. This barrel includes internal protrusions that lock the shackle latch and the key bin latch in place at all times, except when the barrel has been sufficiently rotated to one of the unlock positions. Under the control of the processing circuit, the other components described above will be rotated until the indicator disk reaches either one of the positions in which the second or third optical windows become "uncovered," which will allow one of the photosensors to again "see" its associated LED optical signal. If that occurs, under normal operating conditions, then the sleeves and interior barrel will also have been repositioned into either the shackle release state or key bin release state, and the lockbox will physically respond as such—either the key bin will physically be accessible or the shackle will physically release (and can be removed).

In a preferred mode of operation, the human user must act with some alacrity, because the processing circuit will only wait a few seconds before automatically turning the motor on again, to rotate the entire locking mechanism rotating subassembly back to the home position (which is the lock state). Assuming the user has acted accordingly, and has removed either the shackle, or the building key from the key bin, then the mechanical components of this lock are now in an "armed" state—at the home position. The difference between the armed state and the locked state is simple: until the shackle or the key bin is replaced back into the lockbox, then one cannot accurately say that the lockbox is actually "locked." However, the preferred design of the latches is such that the shackle latch pin—or the key bin latch pin—can be slid back into the interior barrel while the lockbox is presently in the armed state (the home position), and once those components have been properly inserted and have seated within the barrel, then they will automatically become locked. This occurs without any further movements of the motor; in other words, the indicator disk (and the lower sleeve portion) do not significantly move while the shackle latch pin or key bin latch pin is being fully inserted. The actual barrel internal protrusions will likely move a small amount while allowing these latch pins to be re-inserted, but that is expected in this design.

The fact that the barrel must be rotated to "unlock" either the shackle or the key bin makes this design quite tamper resistant. A major physical impact on any surface of the lockbox will not result in the lock mechanism opening, because such an impact will produce a shock force in a linear direction, not a rotational direction. Moreover, the interior barrel is made of metal, and the shackle cannot be pulled out by any human strength. Even if a mechanical leverage was to be applied by a prospective thief, it is more likely that the building's doorknob, or the door itself, would break before the shackle latch would break open.

In an alternate embodiment, the torsion springs and sleeve are removed and the barrel is rotated directly by the motor drive system. This alternative design still keeps the major security benefits of the strong metal barrel with its interior protrusions having sufficient mechanical strength to prevent a person from simply overpowering the latch, for example. One feature that would be lost in this alternative embodiment would be the ability to re-insert the shackle or the key bin without any additional action by the human user. Without the torsion springs and outer sleeves, the barrel would not have an "armed" state that allows the shackle to be quickly inserted in a one-step procedure. Therefore, in operation, a user would not be able to insert the shackle (or the key bin latch pin) without first instructing the lockbox to engage the motor, which would rotate the barrel to one of the unlock positions, and thereby allow the shackle (or the key bin) to be inserted. The interior latching protrusions inside the barrel would provide a horizontal (perpendicular) latching (or locking) surface to mate against a similar horizontal (perpendicular) surface on the latch hook distal end of the latch pin.

In another alternate embodiment, magnetic sensors could be used to detect one of three predetermined operational positions of the barrel. In this embodiment, the barrel position disk would have three permanent magnets at three different locations around the circumference of the disk, corresponding to those three positions of the barrel. The "home" position could have an additional magnet, in order to generate a larger (perhaps "wider") magnetic field, for example. The other two positions could then have a single magnet, for example. The magnetic sensor would detect the magnetic fields at each location, generating a "hit" at each predetermined position. Or, two different magnetic sensors could be used, perhaps to differentiate between the "wider" magnetic field produced at the "home" position.

In yet another alternate embodiment, an electromechanical limit switch could be used to detect one of three predetermined operational positions of the barrel. The barrel position disk in this embodiment would have a relatively smooth outside circumference (an "outer perimeter"), with three protrusions at the predetermined positions. The limit switch could include a cam follower that makes contact with the outer perimeter of the barrel position disk. When the barrel rotates, the position disk also rotates, and the disk's smooth outside circumference slides along the cam follower. Once a predetermined position is reached, one of the position disk's protrusions would force the cam follower to deflect in a manner that would actuate the limit switch, thus generating a predetermined position "hit." This is similar to a rotating cam limit switch system.

In still another alternate embodiment, a metal sensing proximity switch could be used to detect one of the three predetermined operational positions of the barrel. The barrel position disk in this embodiment could have three locations where a small piece of metal is attached. During operation, when the disk is turned, the metal proximity switch would generate a "hit" whenever the position disk reaches one of these three predetermined positions, because the metal proximity sensor will "detect" that piece of metal. Note that the metal pieces used in this embodiment could be of many different forms; they could be placed in cutouts, or glued to the outer perimeter of a circular wheel, or perhaps they could form a small protrusion that nearly touches the proximity switch as the barrel position disk rotates.

STATEMENT REGARDING FEDERALLY SPONSORED RESEARCH OR DEVELOPMENT

None.

BACKGROUND

Electronic lockboxes typically include one or more mechanical actuators that are used to either lock or unlock certain key components. Lockboxes used for real estate situations typically include a secure compartment for holding a dwelling key, and often include a shackle for attaching the lockbox to the building, typically using a doorknob as the attachment point. Some lockboxes have two separate actuators: one that unlocks the key compartment, and a second one that releases the shackle. Lockboxes sold by SentriLock, LLC have a single movable linear actuator that performs both unlocking functions, by moving to different physical positions within the lockbox.

Some lockboxes have a linear potentiometer that provides a variable resistance that can be used as the detection element for determining the physical position of the movable actuator. If the lockbox is quite sturdily constructed, it may be used for many years to the point that sensing elements, such as linear potentiometers, unfortunately become less reliable than the remainder of the lockbox. So, for a more robust lockbox design, a non-contact sensor may well be desirable for use in providing position information about the moving parts of such an electronic lockbox, and thereby create a more robust construction that will last for many more years.

Many conventional lockboxes use actuators that move linearly between the lock positions and the unlock positions. The current designs tend to use spring-loaded parts that must compress one or more springs to achieve one of the unlocking states for the lockbox; later, the action of the actuator, as it moves back to the lockbox's locked state, will then uncompress (relax) those same one or more springs, thereby using energy (usually from a battery) for creating these compressing-relaxing spring cycles.

SUMMARY

Accordingly, it is an advantage to provide an electronic lockbox with a rotary actuator that has multiple predetermined "stop" positions for locking and unlocking a key compartment and a shackle, in which the movements of the actuator into the various predetermined stop positions are detected by at least one non-contact sensor.

It is another advantage to provide an electronic lockbox with a rotary actuator that has multiple positions for locking and unlocking a key compartment and a shackle, in which there is a movable indicator disk that nominally rotates along with the rotary actuator; the movable indicator has at least one window or opening so that, as the movable indicator rotates in a pathway that is proximal to an optical sensor, that sensor detects the window or opening during movements of the actuator.

It is yet another advantage to provide an electronic lockbox with a rotary actuator that has multiple predetermined "stop" positions for locking and unlocking a key compartment and a shackle, in which there is a movable indicator disk that nominally rotates along with the rotary actuator; the movable indicator disk has multiple windows or openings so that, as the movable indicator disk rotates proximal to an optical sensor, that sensor detects the multiple windows or openings during movements of the actuator.

It is still another advantage to provide an electronic lockbox with a rotary actuator that has multiple predetermined "stop" positions for locking and unlocking a key compartment and a shackle, in which there is a movable indicator disk that nominally rotates along with the rotary actuator. The movable indicator disk has multiple windows or openings; proximal to the movable indicator disk is at least one LED and at least one photosensor and, as the movable indicator disk rotates, that photosensor detects electromagnetic energy (i.e., light) emitted by the LED through one of those windows or openings at predetermined positions of movement of the indicator disk.

It is a further advantage to provide an electronic lockbox with a rotary actuator that has multiple predetermined "stop" positions for locking and unlocking a key compartment and a shackle, in which there is an indicator disk that nominally rotates along with the rotary actuator; proximal to the indicator disk is a position sensor such as a magnetic sensor, a metal-sensing proximity switch, or an electromechanical limit switch.

It is a yet further advantage to provide an electronic lockbox with a movable actuator that has multiple predetermined "stop" positions for locking and unlocking a key compartment and a shackle, in which a movable indicator disk is in mechanical communication with the actuator, and a prime mover (such as an electric motor) provides the motive power to rotate the indicator disk, and nominally to rotate the movable actuator.

It is still a further advantage to provide an electronic lockbox with a movable actuator that has multiple predetermined "stop" positions for locking and unlocking a key compartment and a shackle, in which the key compartment has a latch pin that locks against a first corresponding protrusion inside the actuator, and the shackle has a latch pin that locks against a second corresponding protrusion inside the actuator.

It is still another advantage to provide an electronic lockbox with a movable actuator that has multiple predetermined "stop" positions for locking and unlocking a key compartment and a shackle, in which the shackle is separately provided at the site where the lockbox is to be installed.

It is yet another advantage to provide an electronic lockbox with a movable actuator that has multiple predetermined "stop" positions for locking and unlocking a key compartment and a shackle, in which a pair of torsion springs, in a nominally-opposing relationship, are used to help cause rotational movement of the actuator when the lockbox is commanded to place itself in one of its unlocking states; but those torsion springs are free to wind and to unwind during such movements created by a prime mover (such as a motor), and therefore, these springs do not need to be compressed or wound to any significant degree during a nominal unlocking or relocking movement, thereby saving energy for such operational cycles by the overall lockbox control system.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, an electronic lockbox is provided, which comprises: (a) a housing; (b) an electronic control circuit, including: a computer processing circuit, a memory circuit including instructions executable by the processing circuit, an input/output interface circuit, a motor driver circuit, at least one light source driver circuit, and at least one photosensor detection circuit; (c) a key bin that is either locked in place or is released, which is under the control of the computer processing circuit; (d) a shackle that is either locked in place or is released, which is under the control of the computer processing circuit; (e) a movable actuator that rotates, the movable actuator having a plurality of predetermined stop positions at: (i) a home position; (ii) a key bin release position; and (iii) a shackle release position; the movable actuator having at least one protrusion that either locks one of the key bin and the shackle in place, or releases one of the key bin and the shackle, depending upon a physical position of the movable actuator; (f) a movable indicator that is in mechanical communication with the movable actuator; (g) a motor that acts as a prime mover of the movable indicator, the motor receiving energy from the motor driver circuit, under the control of the computer processing circuit; (h) at least one light source that emits electromagnetic energy toward the movable indicator, under the control of the computer processing circuit; and (i) at least one photosensor that is located proximal to the movable indicator, the at least one photosensor detecting at least a portion of the electromagnetic energy that is emitted by the at least one light source if the movable indicator has been moved to at least one predetermined position, the at least one photosensor generating at least one output signal that is related to the detected electromagnetic energy; (j) wherein: (i) if the movable actuator is positioned at the home position as determined by the at least one photosensor, then both the key bin and the shackle are locked in place; (ii) if the movable actuator is positioned at the key bin release position as determined by the at least one photosensor, then the key bin is in a released state and its contents become available to a human user; and (iii) if the movable actuator is positioned at the shackle release position as determined by the at least one photosensor, then the shackle is in a released state and can be detached from the lockbox by a human user.

In accordance with another aspect, an electronic lockbox is provided, which comprises: (a) a housing; (b) an electronic control circuit, including: a computer processing circuit, a memory circuit including instructions executable by the processing circuit, an input/output interface circuit, and a motor driver circuit; (c) a key bin that is either locked in place or is released, which is under the control of the computer processing circuit; (d) a shackle that is either locked in place or is released, which is under the control of the computer processing circuit; (e) a movable actuator that rotates, the movable actuator having a plurality of predetermined stop positions at: (i) a home position; (ii) a key bin release position; and (iii) a shackle release position; the movable actuator having at least one protrusion that either locks one of the key bin and the shackle in place, or releases one of the key bin and the shackle, depending upon a physical position of the movable actuator; (f) a movable indicator that is in mechanical communication with the movable actuator; (g) a motor that acts as a prime mover of the movable indicator, the motor receiving energy from the motor driver circuit, under the control of the computer processing circuit; and (i) at least one sensor that is located proximal to the movable indicator, the at least one sensor detecting at least a portion of the movable indicator; and if the movable indicator has been moved to a predetermined position, then the at least one sensor generates at least one output signal that is related to the detected movable indicator; (j) wherein: (i) if the movable actuator is positioned at the home position as determined by the at least one sensor, then both the key bin and the shackle are locked in place; (ii) if the movable actuator is positioned at the key bin release position as determined by the at least one sensor, the key bin is in a released state and its contents become available to a human user; and (iii) if the movable actuator is positioned at the shackle release position as determined by the at least one sensor, the shackle is in a released state and can be removed by a human user.

In accordance with yet another aspect, an electronic lockbox is provided, which comprises: (a) a housing; (b) an electronic control circuit, including: a computer processing circuit, a memory circuit including instructions executable by the processing circuit, an input/output interface circuit, a prime mover driver circuit; (c) a key bin that is either locked in place or is released, which is under the control of the computer processing circuit; (d) a shackle that is either locked in place or is released, which is under the control of the computer processing circuit; (e) a movable actuator that rotates, the movable actuator having a plurality of predetermined stop positions at least at: (i) a home position; (ii) a key bin release position; and (iii) a shackle release position; the movable actuator having at least one protrusion that either locks one of the key bin and the shackle in place, or releases one of the key bin and the shackle, depending upon a physical position of the movable actuator; and (f) a prime mover that is in mechanical communication with the movable actuator, and controls movements of the movable actuator, the prime mover receiving energy from the prime mover driver circuit under the control of the computer processing circuit; (g) wherein: (i) if the movable actuator is positioned at the home position, then both the key bin and the shackle are locked in place; (ii) if the movable actuator is positioned at the key bin release position, then the key bin is in a released state and its contents become available to a human user; and (iii) if the movable actuator is positioned at the shackle release position, then the shackle is in a released state and can be removed by a human user.

In accordance with still another aspect, an electronic lockbox is provided, which comprises: (a) a housing, the housing including an interior open volume, the housing having an opening; (b) a movable actuator having the general shape of a hollow cylinder with at least two open ends, the hollow cylinder having a centerline in a longitudinal direction, the hollow cylinder including at least one interior protrusion, wherein: a first of the at least one interior protrusion includes a first locking surface that is substantially perpendicular to the longitudinal direction of the hollow cylinder; a second of the at least one interior protrusion includes a second locking surface that is substantially perpendicular to the longitudinal direction of the hollow cylinder; (c) an electronically-controlled prime mover that is in mechanical communication with the movable actuator, the prime mover causing the movable actuator to move at least to: a lock position under first predetermined conditions, and a first unlock position under second predetermined conditions; (d) the opening in the housing is co-linear with a first of the at least two open ends of the hollow cylinder, such that an external shaft may be inserted through the opening and into the first of the at least two open ends of the hollow cylinder, past a location of the first locking surface of the hollow cylinder; and (e) a movable key bin that, when inserted, generally fits within the interior open volume of the housing, the key bin including a first latch pin having the general shape of a first elongated shaft, the first elongated shaft including a first latch hook at a distal end, the first latch hook including a third locking surface that is substantially perpendicular to a longitudinal direction of the first elongated shaft; (f) wherein: the first latch pin is sized and shaped to be inserted through a second of the at least one open end of the movable actuator hollow cylinder, and then to be inserted through at least a portion of the hollow cylinder past the second of the at least one interior protrusion, such that after the first latch pin is at a fully inserted position, then the third locking surface directly faces the second locking surface; if the movable actuator is at the lock position, then the first latch pin cannot be pulled out of the hollow cylinder; and if the movable actuator is at the first unlock position, then the first latch pin is removable from the hollow cylinder, thereby allowing a human user to obtain access to the contents of the movable key bin.

In accordance with a further aspect, a latching apparatus for an electronic lockbox is provided, which comprises: (a) a movable actuator having the general shape of a cylinder, the movable actuator including: (i) a cylindrically-shaped rotatable barrel; (ii) a movable two-piece outer sleeve, including a bottom sleeve and a top sleeve; and (iii) a first torsion spring and a second torsion spring, the first torsion spring being mechanically coupled to the barrel and the top sleeve, the second torsion spring being mechanically coupled to the top sleeve and the bottom sleeve; (b) a primer mover that is in mechanical communication with the bottom sleeve; and (c) a housing containing at least the rotatable barrel, the top sleeve, the bottom sleeve, the first torsion spring, the second torsion spring, and the prime mover; (d) wherein: the first and second torsion springs are pre-wound to a minimum tension that provides a torque sufficient to overcome the static friction between the housing and the top sleeve, and sufficient to overcome the static friction between the housing and the barrel.

In accordance with a yet further aspect, a latching apparatus for an electronic lockbox is provided, which comprises: (a) a movable actuator having the general shape of a hollow cylinder, the movable actuator including: (i) a cylindrically-shaped rotatable barrel; (ii) a movable two-piece outer sleeve, including a bottom sleeve and a top sleeve; (iii) a first torsion spring, the first torsion spring being mechanically coupled to the barrel and the top sleeve; (iv) a first spur gear mounted so as to move with the bottom sleeve; (v) a latch pin; and (vi) a prime mover, a mechanical output of the prime mover being in mechanical communication with a prime mover spur gear, the prime mover spur gear being in mechanical communication with the first spur gear; (b) wherein: during insertion of the latch pin into the rotatable barrel, the maximum torque imparted on the first spur gear by the torsion spring, at a maximum rotation angle of the rotatable barrel, is sufficient to rotate the barrel back to its neutral position after the latch pin has been fully inserted into the barrel, and is less than or equal to a back drive torque limit of the prime mover.

In accordance with a still further aspect, a latching apparatus for an electronic lockbox is provided, which comprises: (a) a movable actuator having the general shape of a hollow cylinder with at least two open ends, the hollow cylinder having a centerline in a longitudinal direction, the hollow cylinder including at least one interior protrusion; (b) a first latch hook at the distal end of a first latch pin includes a first oblique surface; and (c) a second latch hook at the distal end of a second latch pin includes a second oblique surface; (d) wherein: when the first and second latch pins are inserted into the movable actuator, and the movable actuator is rotated such that both the latch pins are not removable, due to being latched with the at least one interior protrusion inside the movable actuator, the first and second oblique surfaces are retained in sufficiently close proximity that the latch pins cannot be independently sufficiently rotated to slide past the at least one interior protrusion of the movable actuator.

In accordance with yet another aspect a latching apparatus for an electronic lockbox is provided, which comprises: (a) a movable actuator having the general shape of a hollow cylinder, the movable actuator including: (i) a cylindrically-shaped rotatable barrel; (ii) a movable two-piece outer sleeve, including a bottom sleeve and a top sleeve; (iii) a first torsion spring mechanically coupled to the rotatable barrel and the top sleeve, in a configuration that holds the first torsion spring under tension to a predetermined torque; and (iv) a second torsion spring mechanically coupled to the top sleeve and the bottom sleeve in a configuration that holds the second torsion spring under tension to a predetermined torque in a direction opposite the first torsion spring; and (c) a housing containing at least the rotatable barrel, the top sleeve, the bottom sleeve, the first torsion spring, and the second torsion spring; (d) wherein: during normal operating conditions, the first and second torsion springs collectively exert a high angular centering force on the top sleeve and the rotatable barrel, ensuring that the barrel maintains a predetermined position relative to the bottom sleeve.

In accordance with still another aspect, a latching apparatus for an electronic lockbox is provided, which comprises: (a) a movable actuator having the general shape of a hollow cylinder, the movable actuator comprises: (i) a cylindrically-shaped rotatable barrel; (ii) a movable two-piece outer sleeve, including a bottom sleeve and a top sleeve; (iii) a first torsion spring mechanically coupled to the rotatable barrel and the top sleeve, in a configuration that holds the first torsion spring under tension to a predetermined torque; (iv) a second torsion spring mechanically coupled to the top sleeve and the bottom sleeve in a configuration that holds the second torsion spring under tension to a predetermined torque in a direction opposite the first torsion spring; (v) a first spur gear mounted so as to move with the rotatable barrel; and (vi) a prime mover, a mechanical output of the prime mover being in mechanical communication with a prime mover spur gear, the prime mover spur gear being in mechanical communication with the first spur gear; (b) wherein: the rotatable barrel and the top and bottom sleeves, all being mechanically coupled through the first and second torsion springs, increases the energy efficiency of the latching apparatus, because the prime mover only needs to overcome the friction between the housing and the rotatable barrel, and the top and bottom sleeves, and does not have to overcome the spring force exerted by the first and second torsion springs during a latch release operation.

In accordance with yet a further aspect, a latching apparatus for an electronic lockbox is provided, which comprises: (a) a movable actuator having the general shape of a hollow cylinder, the movable actuator including: (i) a cylindrically-shaped rotatable barrel; (ii) a movable two-piece outer sleeve, including a bottom sleeve and a top sleeve; (iii) a first torsion spring mechanically coupled to the rotatable barrel and the top sleeve, in a configuration that holds the first torsion spring under tension to a predetermined torque; (iv) a second torsion spring mechanically coupled to the top sleeve and the bottom sleeve in a configuration that holds the second torsion spring under tension to a predetermined torque in a direction opposite the first torsion spring; (v) a first spur gear mounted so as to move with the movable actuator; and (vi) a prime mover, a mechanical output of the prime mover being in mechanical communication with a prime mover spur gear, the prime mover spur gear being in mechanical communication with the spur gear; (b) a first latch hook at the distal end of a first latch pin which includes a first oblique surface; and (c) a second latch hook at the distal end of a second latch pin which includes a second oblique surface; (d) wherein: if the rotatable barrel is immobilized during an unlatching operation, due to an external tension being applied by one of the first and second latching pins, the prime mover can still rotate at least one of the top and bottom sleeves and impart a resultant torque into at least one of the corresponding first and second torsion springs, thereby allowing the latching apparatus to unlatch once the external tension is removed.

In accordance with still a further aspect, a latching apparatus for an electronic lockbox is provided, which comprises: (a) a movable actuator having the general shape of a hollow cylinder with at least two open ends, the hollow cylinder including at least one interior protrusion; (b) a first latch hook at the distal end of a first latch pin which includes a first oblique surface; and (c) a second latch hook at the distal end of a second latch pin which includes a second oblique surface; (d) wherein: the orientation of the first and second latch pins are in opposition to each other when inserted into the movable actuator such that the first and second oblique surfaces face each other in sufficiently close proximity inside the movable actuator that a human user cannot rotate either of the first or second latch pins such that either pin can be removed, thereby creating an improved security profile.

In accordance with yet another aspect, a latching apparatus for an electronic lockbox is provided, which comprises: (a) a movable actuator having the general shape of a hollow cylinder with at least two open ends, the hollow cylinder including at least one interior protrusion; (i) a cylindrically-shaped rotatable barrel; (ii) a movable two-piece outer sleeve, including a bottom sleeve and a top sleeve; and (iii) a first torsion spring mechanically coupled to the rotatable barrel and the top sleeve, in a configuration that holds the first torsion spring under tension to a predetermined torque; (iv) a second torsion spring mechanically coupled to the top sleeve and the bottom sleeve in a configuration that holds the second torsion spring under tension to a predetermined torque in a direction opposite the first torsion spring; and (b) a first latch hook at the distal end of a first latch pin; (c) wherein: the interior protrusion exhibits a helical geometry surface, such that if the first latch pin is inserted into the barrel, the latch pin slides along the helical surface, forcing the barrel to rotate, and once the latch pin mechanically clears the final portion of the helical surface, the latch pin latches with the interior protrusion, and the barrel rotates back to its neutral position, due to the tension of the torsion springs.

In accordance with still another aspect, a latching apparatus for an electronic lockbox is provided, which comprises: (a) a movable actuator having the general shape of a hollow cylinder with at least two open ends, the hollow cylinder including a first interior protrusion, and a second interior protrusion; (b) a cylindrically-shaped rotatable barrel; (c) a first latch hook at the distal end of a first latch pin, the first latch hook being sized and shaped to mechanically interface with the first interior protrusion; and (d) a second latch hook at the distal end of a second latch pin, the second latch hook being sized and shaped to mechanically interface with the second interior protrusion; (e) wherein: the first interior protrusion is sufficiently wide such that after the first latch pin has been inserted into the barrel and has become latched, the first latch pin does not unlatch itself as the second latch pin is inserted and rotates the rotatable barrel during the second latch pin insertion.

In accordance with another aspect, an electronic lockbox is provided, which comprises: (a) a housing; (b) an electronic control circuit, including: a computer processing circuit, a memory circuit including instructions executable by the processing circuit, an input/output interface circuit, a motor driver circuit, and at least one position detector; (c) a key bin that is either locked in place or is released, which is under the control of the computer processing circuit; (d) a shackle that is either locked in place or is released, which is under the control of the computer processing circuit; (e) a movable actuator that comprises a cylindrically-shaped barrel and the movable actuator is mounted so as to rotate with a barrel spur gear; (f) a movable indicator is mounted so as to rotate with the barrel spur gear, a position of which is determined by the at least one position detector; (g) a mechanical output of a motor is in mechanical communication with a motor spur gear; and (h) the motor spur gear is in mechanical communication with the barrel spur gear; (i) wherein: the motor is controlled by the electronic control circuit, and when desired is energized by the motor driver circuit, and if the motor rotates, then the motor spur gear also rotates to change a rotational position of the movable indicator and nominally changes a rotational position of the movable actuator.

In accordance with yet another aspect, an electronic lockbox is provided, which comprises: (a) a housing; (b) an electronic control circuit, including: a computer processing circuit, a memory circuit including instructions executable by the processing circuit, an input/output interface circuit, a motor driver circuit, and at least one position detector; (c) a key bin that is either locked in place or is released, which is under the control of the computer processing circuit; (d) a shackle that is either locked in place or is released, which is under the control of the computer processing circuit; (a) a movable actuator that comprises: (i) a two-piece outer sleeve, including a bottom sleeve and a top sleeve; (ii) a first torsion spring and a second torsion spring; and (iii) a cylindrically-shaped barrel; (b) the bottom sleeve is mounted so as to rotate with a barrel spur gear; (c) a movable indicator is mounted so as to rotate with the barrel spur gear, a position of which is determined by the at least one position detector; (d) a mechanical output of a motor is in mechanical communication with a motor spur gear; and (e) the motor spur gear is in mechanical communication with the barrel spur gear; (f) wherein: (i) the motor is controlled by the electronic control circuit, and when desired is energized by the motor driver circuit, and if the motor rotates, then the motor spur gear also rotates to change a rotational position of the bottom sleeve and the movable indicator; (ii) the bottom sleeve, if moving in a first rotational direction of movement, contacts the top sleeve and forces the top sleeve to also rotate in the first rotational direction; (iii) the bottom sleeve, if moving in a second rotational direction of movement, winds the first torsion spring, which forces the top sleeve to also rotate in the second rotational direction; (iv) the top sleeve, if moving in the first rotational direction of movement, winds the second torsion spring, which forces the barrel to also rotate in the first rotational direction; and (v) the top sleeve, if moving in the second rotational direction of movement, contacts the barrel and forces the barrel to also rotate in the second rotational direction.

In accordance with still another aspect, a lockbox locking member is provided, which comprises: (a) a movable actuator having the general shape of a hollow cylinder with at least two open ends, the hollow cylinder having a centerline in a longitudinal direction, the hollow cylinder including at least one interior protrusion, wherein: (i) a first of the at least one interior protrusion of the hollow cylinder includes a first locking surface that is substantially perpendicular to the longitudinal direction of the hollow cylinder; (ii) a second of the at least one interior protrusion of the hollow cylinder includes a second locking surface that is substantially perpendicular to the longitudinal direction of the hollow cylinder; (iii) the first of the at least one interior protrusion of the hollow cylinder includes a first oblique surface; and (iv) the second of the at least one interior protrusion of the hollow cylinder includes a second oblique surface; (b) the first oblique surface comprises a curved surface; and (c) the second oblique surface comprises a curved surface.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

FIG. 22 is a front sectional view of the lockbox of FIG. 1 with the key bin detached.

DETAILED DESCRIPTION

Figure 1:
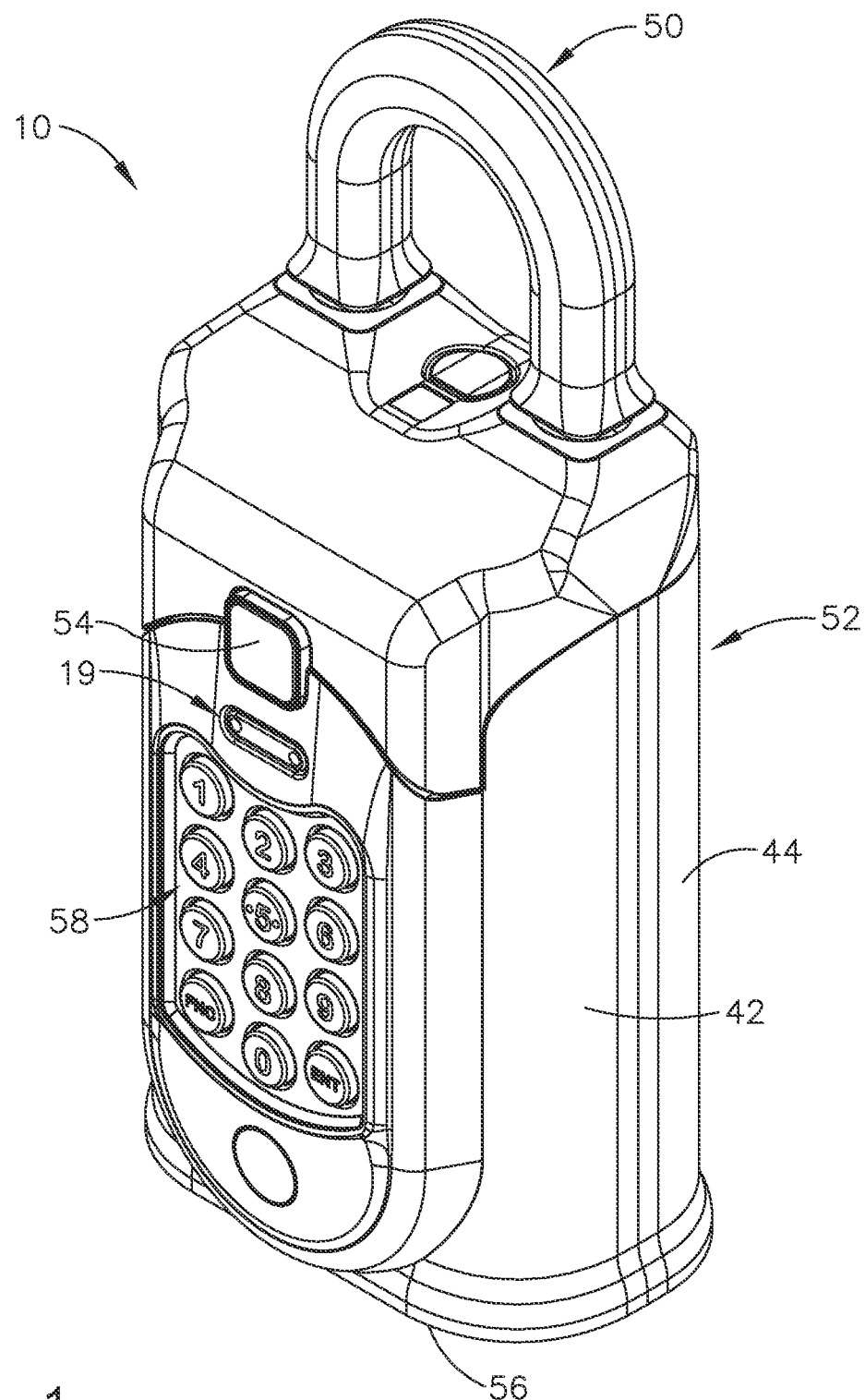
FIG. 1 is a front perspective view of the entire lockbox. As constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The terms "first" and "second" preceding an element name, e.g., first inlet, second inlet, etc., are used for identification purposes to distinguish between similar or related elements, results or concepts, and are not intended to necessarily imply order, nor are the terms "first" and "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein. Furthermore, if software is utilized, then the processing circuit that executes such software can be of a general purpose computer, while fulfilling all the functions that otherwise might be executed by a special purpose computer that could be designed for specifically implementing this technology.

It will be understood that the term "circuit" as used herein can represent an actual electronic circuit, such as an integrated circuit chip (or a portion thereof), or it can represent a function that is performed by a processing device, such as a microprocessor or an ASIC that includes a logic state machine or another form of processing element (including a sequential processing device). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

FIGS. 1-4 show the electronic lockbox in the same overall perspective, as various elements are removed showing the interior parts.

Referring now to FIG. 1, an exemplary embodiment of an electronic lockbox is generally designated by the reference numeral 10. The lockbox has an outer housing (or enclosure or casing) 52, a shackle 50, and a bottom portion of the key bin 56 which is located at the bottom portion of the casing 52. The upper housing of lockbox 10 includes two receptacles (openings) that receive a shackle 50. The shackle 50 has an upper portion and two shackle extensions 66, 68 (see FIG. 3) that fit through the receptacles. The front of the lockbox has a keypad 58, which can be used by a sales agent or other authorized person to enter data to the lockbox's control system. Above the keypad is an indicator LED lamp 19, which will indicate various status states of the lockbox during its operations, and a label, or display, 54.

The keypad 58 may also be referred to as a "data input circuit," in which a human user may press one or more of the keys to enter data, such as numeric information. It will be understood that future versions of electronic lockboxes may someday include a touchscreen display, and in such a design, the keypad will be incorporated directly into that display, and thus the touchscreen display itself would become the data input circuit.

As noted above, electronic lockbox 10 includes a shackle 50 that is typically used to attach the lockbox 10 to a door handle or other fixed object. Electronic lockbox 10 also includes a key compartment which typically holds a dwelling key (not shown), and which can be accessed via the key bin 40.

Figure 2:
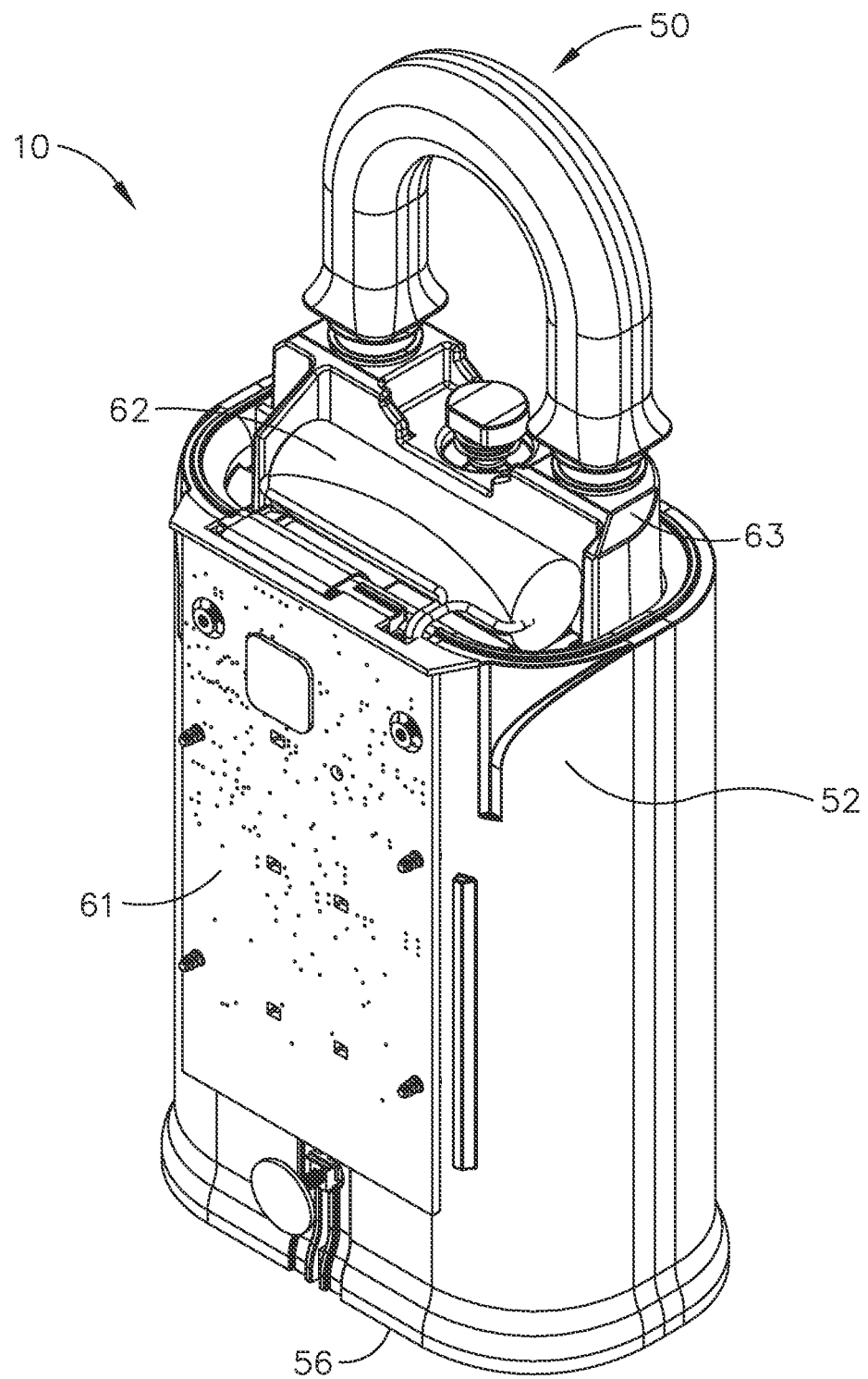
FIG. 2 is a front perspective view of the lockbox of FIG. 1 with the keypad removed, and with the top cap (or cover) and the interior shackle reinforcing member.

In FIG. 2, the electronic lockbox 10 is illustrated showing a battery 62 mounted inside the top portion of the outer casing 52 in front of, and beneath, the shackles 50. The shackles 50 are reinforced by a shackle reinforcing member 63. A PC (printed circuit) board 61 is shown that controls the keypad 58 functions. The PC board 61 may contain an RFID (radio-frequency identification) antenna, or another similar NFC (near-field communication) communications device. The bottom portion of the key bin 56 is also shown.

Figure 3:
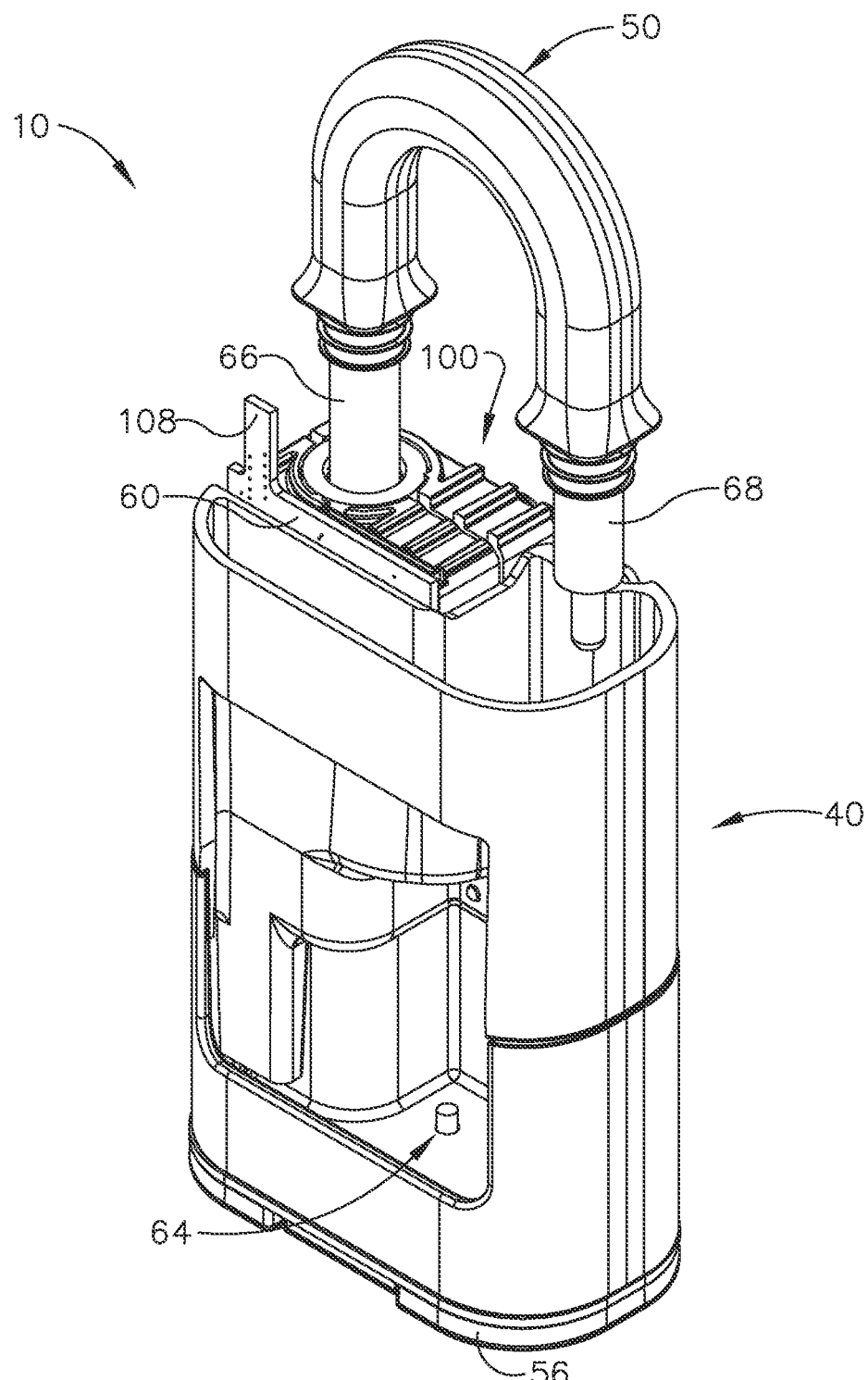
FIG. 3 is a front perspective view of the lockbox of FIG. 1 with the outer casing removed.

In FIG. 3, the outer housing 52 is fully removed showing a key bin 40, having a key compartment 64, and the bottom portion of the key bin at 56. More of the shackle 50 can be seen, namely a shackle extension (or cylindrical latch pin) 66 (also referred to herein as a "second elongated shaft") that engages with the inner locking mechanism, and a shackle extension 68. Behind the key bin 40, is a PC board 60. The PC board 60 contains one or more microprocessors that are programmed to operate the entire lockbox, including sending and receiving signals to and from the keypad 58. At the top of the PC board 60, is a protrusion for a Bluetooth antenna 108. The top portion of an internal housing 100 is shown, where the shackle extension 66 is inserted.

Figure 4:
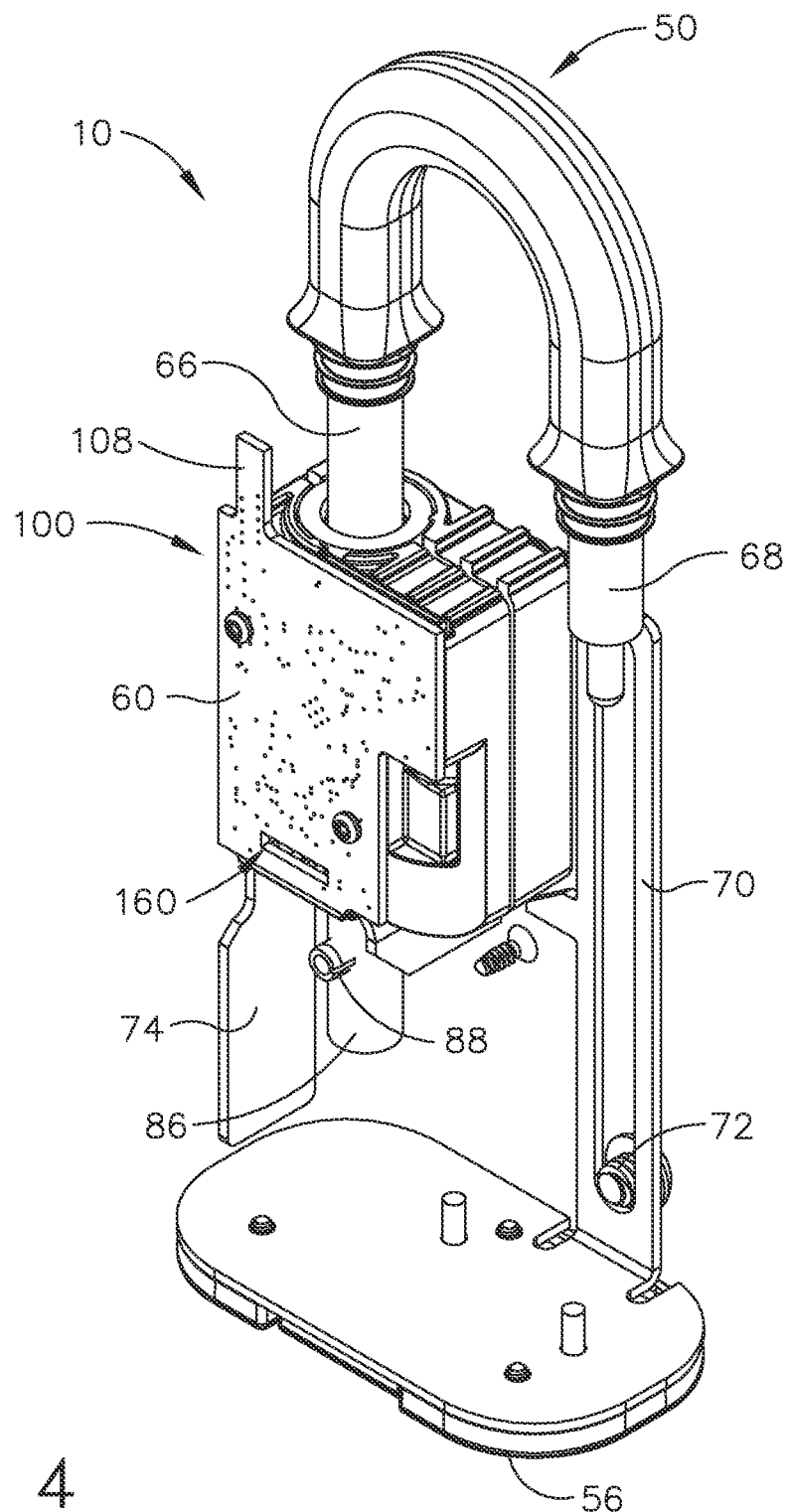
FIG. 4 is a front perspective view of the lockbox of FIG. 1 with the outer casing and key bin removed.

In FIG. 4, the PC board 60 is more fully shown, including the protrusion for the Bluetooth antenna 108. The internal housing or casing, generally designated by the reference numeral 100, is shown mounted at the rear side of the PC board 60. An optical sensor subassembly 160 is shown near the bottom portion of the PC board, through an opening. A key bin latch pin 86 (also referred to herein as a "first elongated shaft") is shown beneath the internal housing 100, and this cylindrical pin 86 is also in a direct line under the shackle extension 66. The pin 86 also has a latch pin fastener 88.

The key bin (not shown in this view) is supported by a guide plate 74, and the key bin includes a slotted elongated guide 70 which is retained to the lockbox housing by a guide nut, or protruding retainer, 72. This guide nut 72 is not only used to retain the key bin to the housing, but to also allow the key bin to "open" by falling out of the bottom of the lockbox by sliding through the slotted key bin guide 70. The guide 70 prevents the key bin from detaching completely from the lockbox when the key bin is released.

Figure 5:
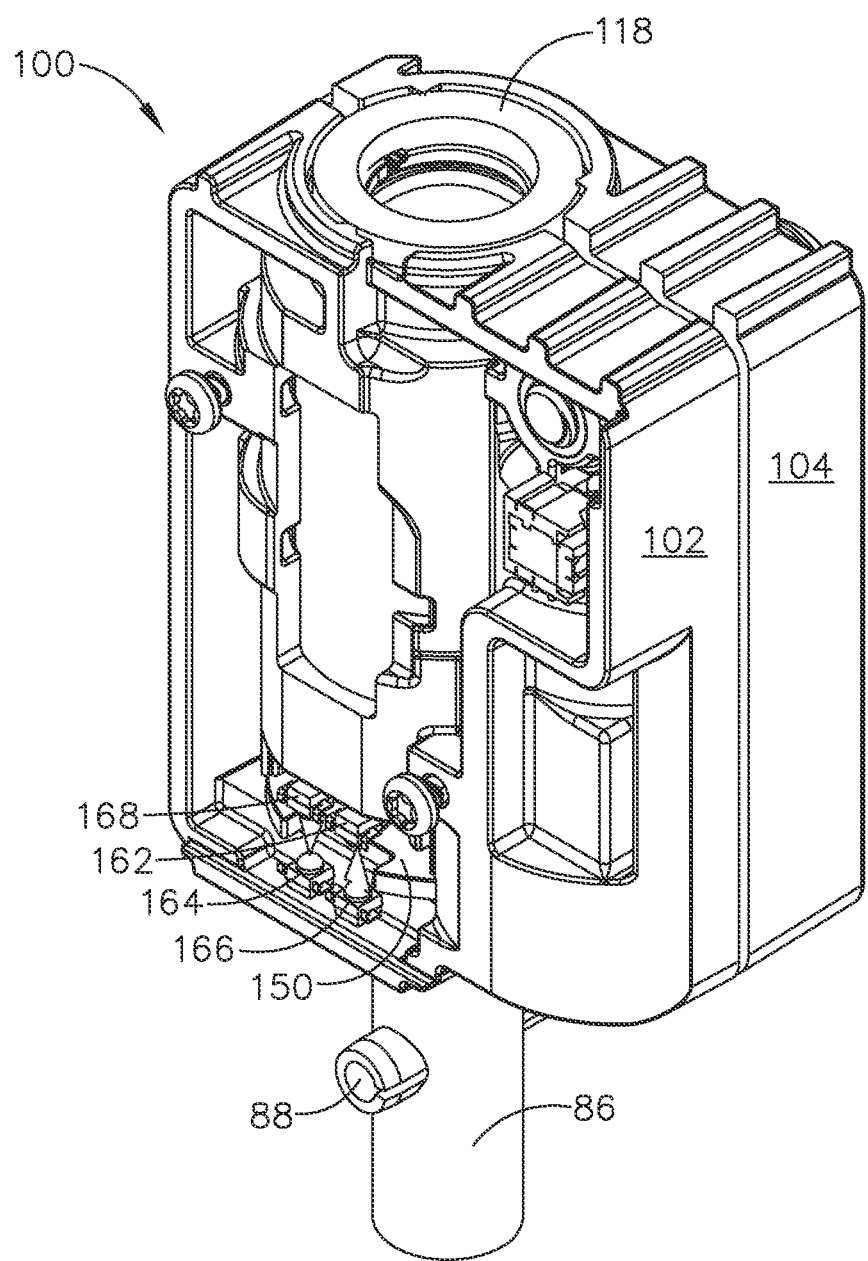
FIG. 5 is a front perspective view of the internal housing subassembly of the lockbox of FIG. 1 with the printed circuit board removed.

Referring now to FIG. 5, the internal housing subassembly 100 is shown without the PC board. The internal housing subassembly has two halves, a front half housing 102, and a rear half housing 104. Contained within the front half and rear half housings, is a top opening 118. (The opening 118 is able to receive an external shaft, for example.) In a direct line underneath the opening 118, near the bottom of the inside of the internal housing subassembly, is a barrel position disk 150 (also referred to herein as a "movable indicator" or "movable indicator disk"). The opening 118 in the housing 100 is co-linear with one of the open ends of the barrel (at 194—see FIG. 14), such that an external shaft may be inserted through both openings 118 and 194, for example. Generally speaking, the above "external shaft" will comprise a portion of the shackle 50.

The movable position indicator disk 150 has several openings (see FIGS. 16-18) that interact with two sets of photodiodes and LEDs, designated by the reference numerals 162, 164 (for the LEDs), and 166, 168 (for the photosensors). Depending on which photosensor is sensing light from which LED, the microprocessor determines what position the barrel position disk 150 currently is in, and this "position" will be discussed in further detail below.

Figure 6:
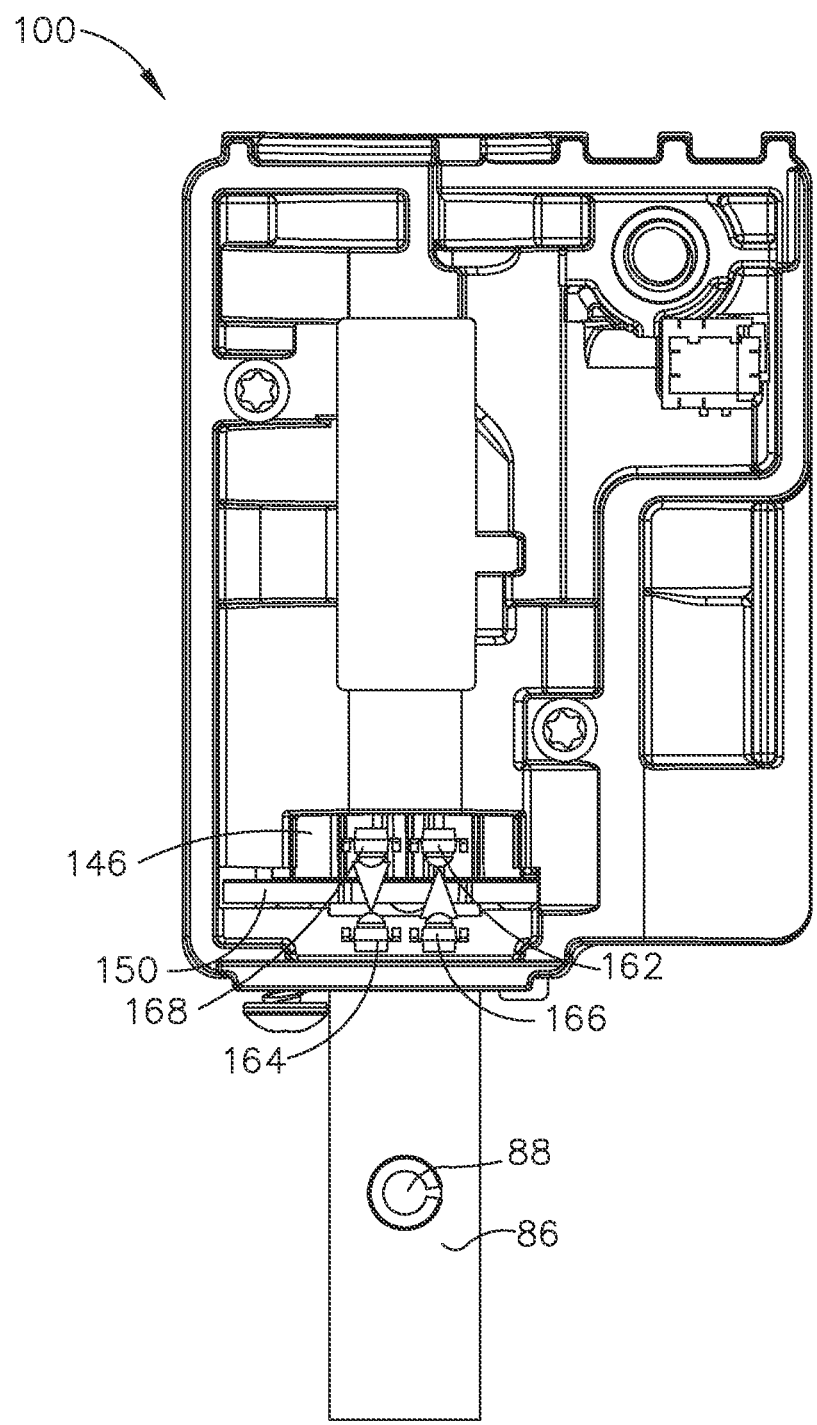
FIG. 6 is a front view of the internal housing subassembly of FIG. 5.

Referring now to FIG. 6, a barrel spur gear 146 is shown. In this view, the indicator disk 150 and key bin latch pin 86 are better shown in their "direct line" orientation below the barrel spur gear 146.

The photosensors and LEDs are also illustrated in a clearer view by FIG. 6. It should be noted that the photosensors are opposingly mounted; the photosensor 166 is beneath the barrel position disk 150, and the photosensor 168 is above the disk 150. Similarly, the LEDs are also mounted in the same fashion; the LED 164 is beneath the disk 150, and the LED 162 is above the barrel position disk 150.

Figure 7:
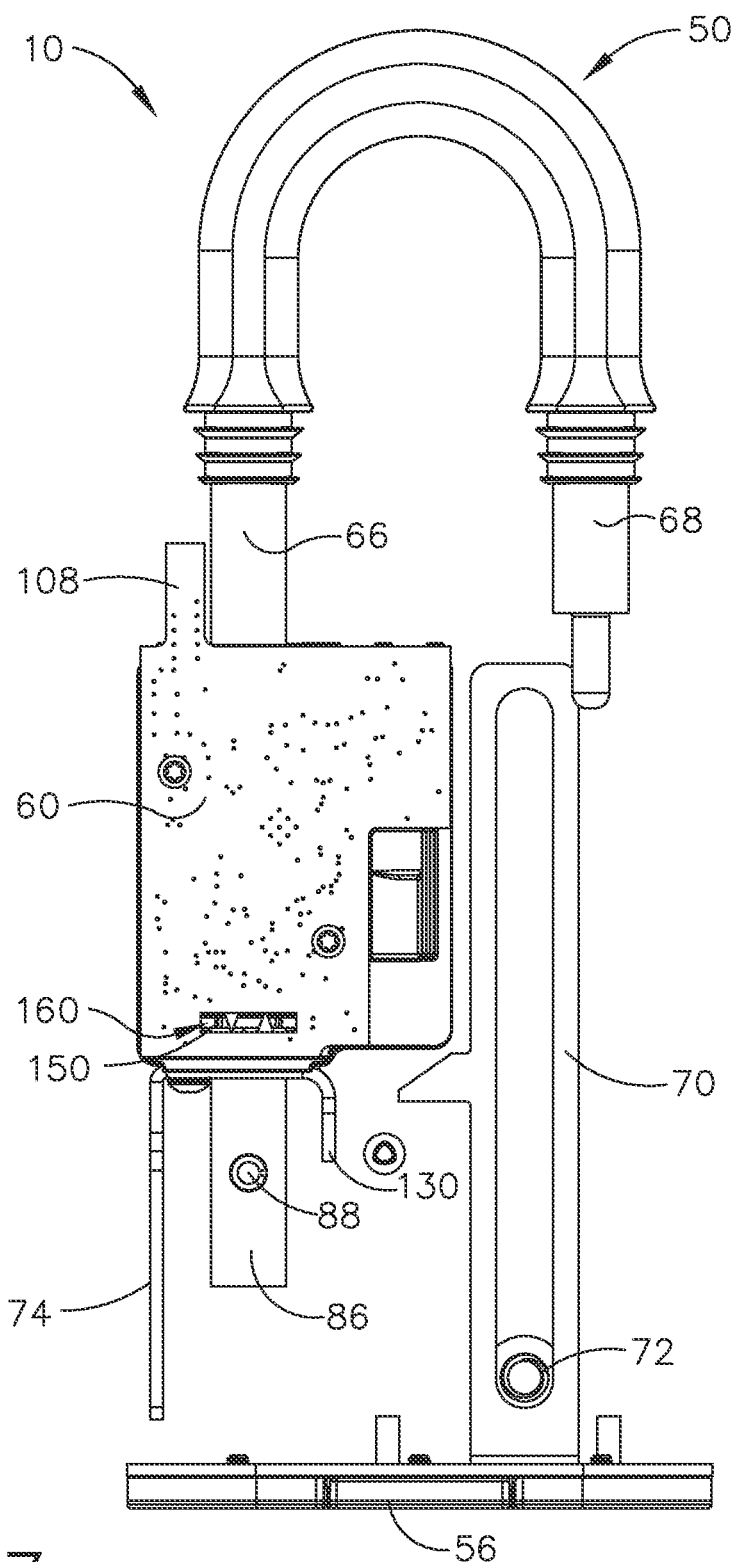
FIG. 7 is a front view of the lockbox components of FIG. 4.

Referring now to FIG. 7, the PC board 60 is shown having an opening in the lower portion showing the barrel position disk 150, and the optical sensor subassembly 160. A bottom mounting bracket 130 is illustrated. The guide nut 72 is shown slidingly coupled with the slotted key bin guide 70. In operation, when the key bin (not shown in this view) is released, the key bin slides along guide nut 72 through the key bin guide 70. As depicted, the key bin guide 70 retains the guide nut 72, so that the key bin cannot completely detach itself from the lockbox.

Figure 8:
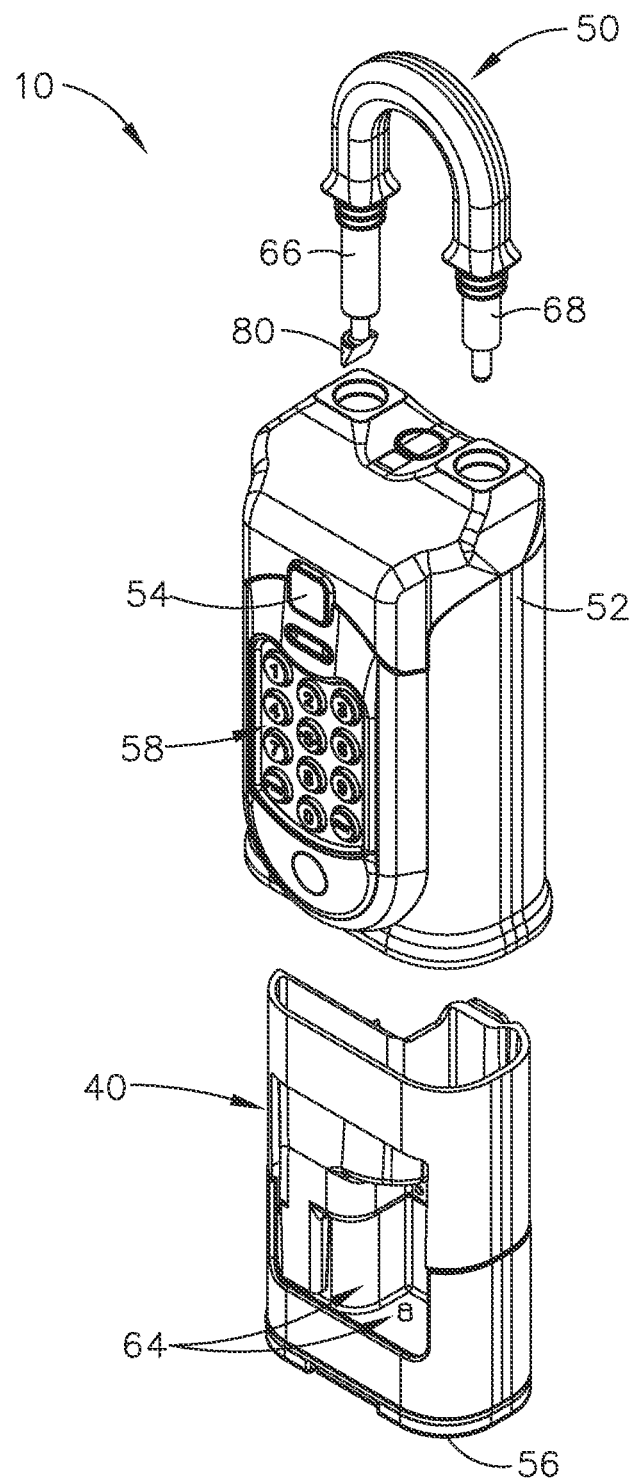
FIG. 8 is a front perspective view of the lockbox of FIG. 1 showing the shackle and key bin detached.

Referring now to FIG. 8, the electronic lockbox 10 is shown with the shackle 50 released, and the key bin 40 detached. It should be noted that key bin 40 is unable to completely detach as illustrated, because the protruding retainer 72 only allows the elongated guide 70 to drop down, and not fully disengage from the lockbox 10. A latch hook portion 80 is shown at the distal tip of shackle extension 66.

Figure 9:
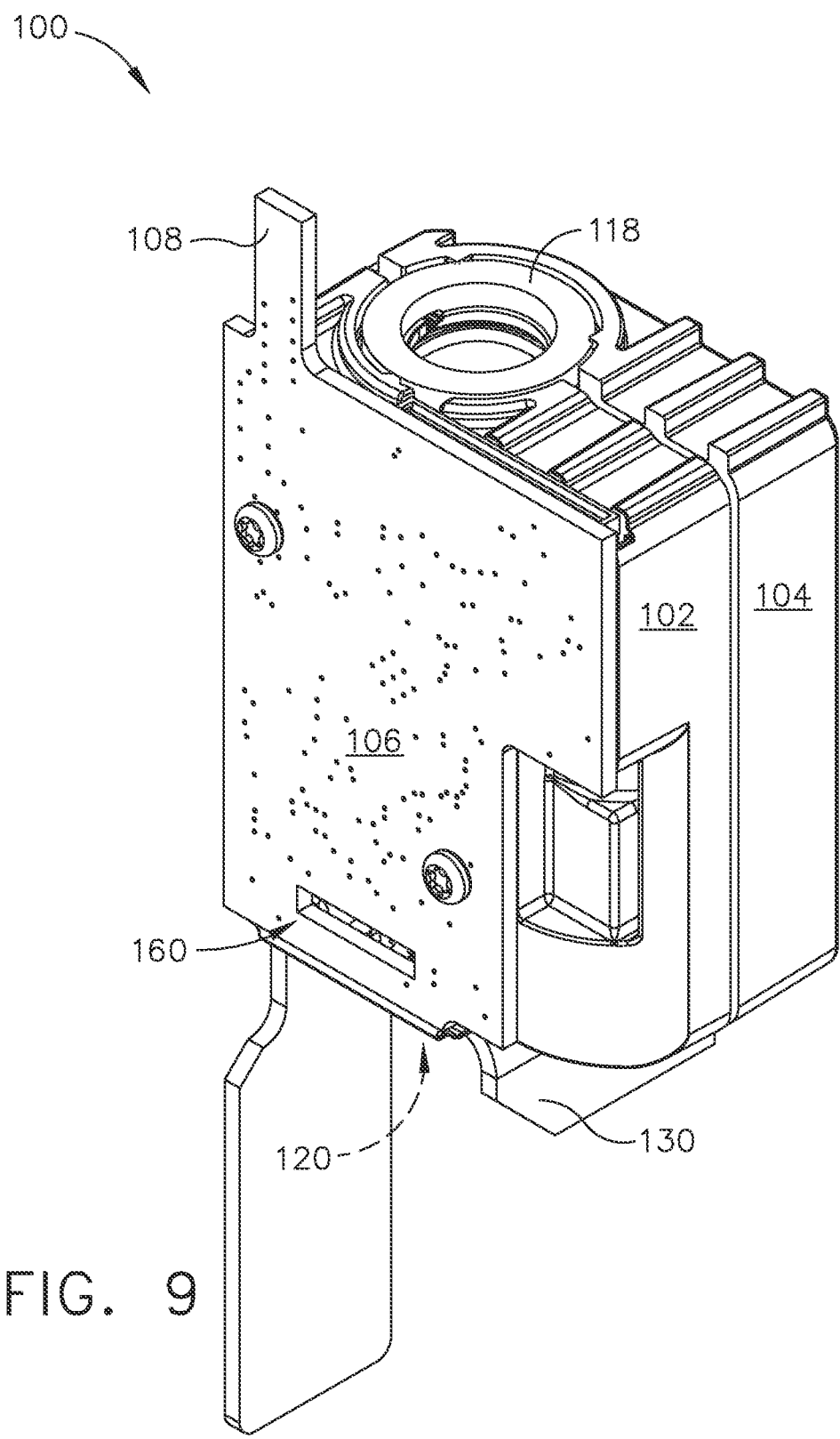
FIG. 9 is a front perspective view of the internal housing subassembly for the lockbox of FIG. 1.

Referring now to FIG. 9, the internal housing subassembly 100 is illustrated, showing a PC board outer surface 106 of the PC board 60. It should be noted that the PC board has an opening showing the optical sensor subassembly 160. In a direct line beneath the internal housing subassembly top opening 118, is an internal housing bottom opening 120 (not visible in this view).

Figure 10:
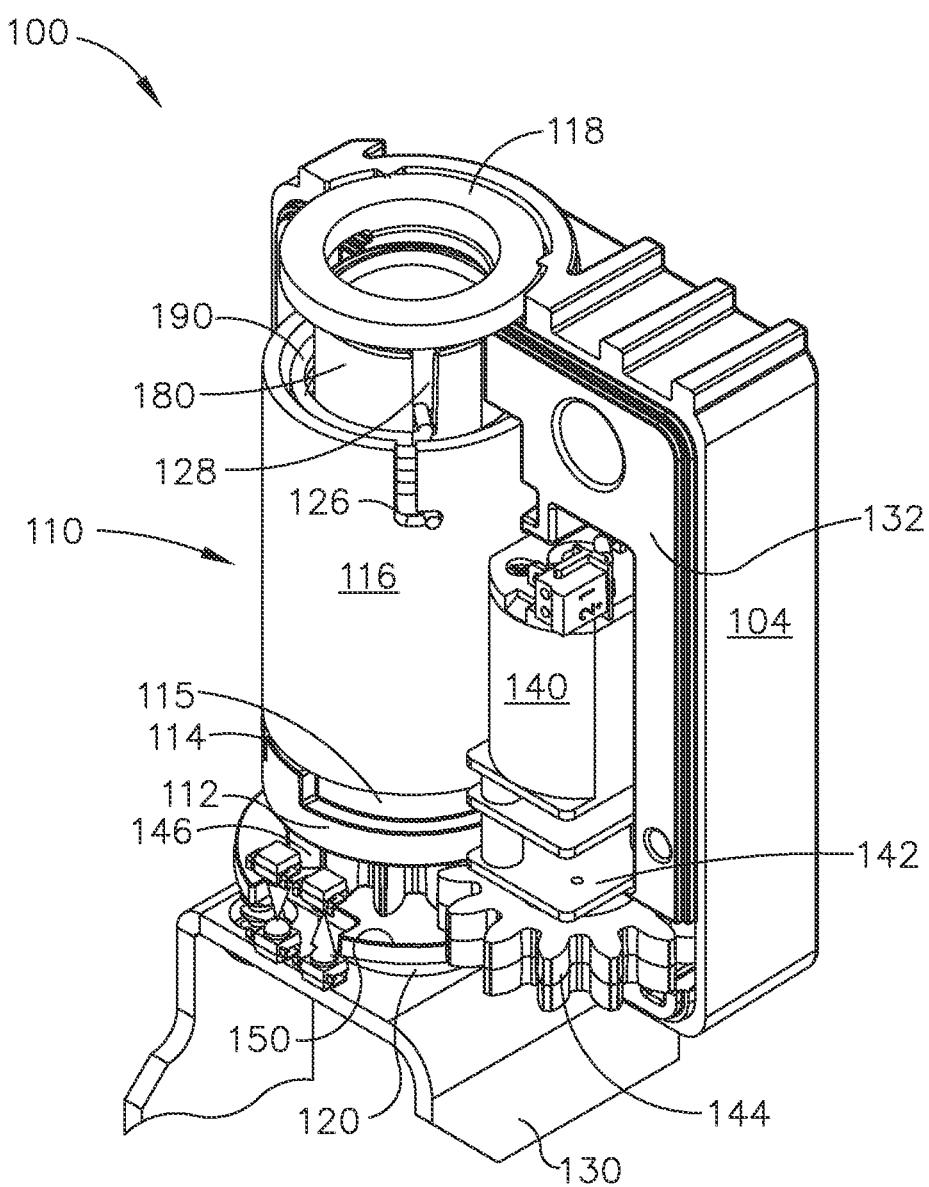
FIG. 10 is a front perspective view of the internal housing subassembly for the lockbox of FIG. 1 with the front half housing removed.

Referring now to FIG. 10, the rear half housing 104 of the internal housing subassembly 100 is depicted. A motor 140 (also referred to herein as a "prime mover") is mounted to a motor mounting bracket (or a reduction gearbox) 142, on the right portion (in this view) of the rear half housing 104. In a direct line below the motor 140, is a motor spur gear 144. A mounting plate 132 covers the remaining space on this right portion (in this view) of the rear half housing 104.

A barrel subassembly 110 (also sometimes referred to herein as a "movable actuator") has a top sleeve 116, coupled to a bottom sleeve 112 through a tab 114 and a recess 115. (The bottom sleeve 112 is mounted so as to rotate with the barrel spur gear 146, for example.) The barrel subassembly 110 also has a first torsion spring 190, that is coupled to a barrel slot 128, and a top sleeve top slot 126. A second torsion spring 192 (see FIG. 29) is coupled to a top sleeve bottom slot 124 (see FIG. 27), and a bottom sleeve slot 122 (see FIG. 11). In the illustrated embodiment, the first torsion spring 190 is depicted as being the "top" or "upper" torsion spring, and the second torsion spring 192 is depicted as being the "bottom" or "lower" torsion spring; this is the normal orientation for a lockbox that is hanging by its shackle after being installed on a building site.

At the bottom of the barrel subassembly 110 is the barrel spur gear 146, which is operationally coupled to the motor spur gear 144 to allow for rotation when the motor 140 is engaged. A mechanical output of the motor 140 is in mechanical communication with the motor spur gear 144, and the motor spur gear is in mechanical communication with the barrel spur gear 146, for example. The position indicator disk 150 is shown directly coupled to the barrel spur gear 146. (The movable indicator 150 is mounted, for example, so as to rotate with the barrel spur gear 146.) It should be noted that the internal housing bottom opening 120 is shown as extending through the bottom mounting bracket 130, directly beneath the barrel subassembly 110; this opening 120 in the housing 100 is co-linear with the other one of the open ends of the barrel (at 196—see FIG. 14), such that a shaft may be inserted through both openings 120 and 196, for example. Generally speaking, the above "shaft" will comprise a major portion of the key bin latch pin 86.

In operation, when the motor 140 energizes the motor spur gear 142, which in turn rotates the barrel spur gear 146, two primary situations will occur. In a first situation, if the barrel spur gear 146 is rotated in a counterclockwise direction (with respect to FIG. 10), the bottom sleeve 112 will rotate, forcing the torsion spring 192 (see FIG. 12) to rotate, through its engagement with the slot 122 (see FIG. 11). The torsion spring 192 will force the top sleeve 116 to rotate, through its engagement with the slot 124 (see FIG. 27). As the top sleeve 116 rotates, the torsion spring 190 will be forced to rotate through its engagement with the slot 126. Then, a barrel 180 will rotate through its engagement with the torsion spring 190.

In a second situation, if the barrel spur gear 146 is rotated in a clockwise direction (with respect to FIG. 10), the bottom sleeve 112 will rotate, forcing the top sleeve 116 to rotate through the engagement of a bottom sleeve tab 111 with the top sleeve tab 114. The top sleeve 116 will force the torsion spring 190 to rotate, through its engagement with the slot 126. Then, the barrel 180 will rotate through the engagement of its slot 128 with the torsion spring 190. The two situations illustrate how the shackle 50 and the key bin latch pin 86 may be unlocked and released.

Figure 11:
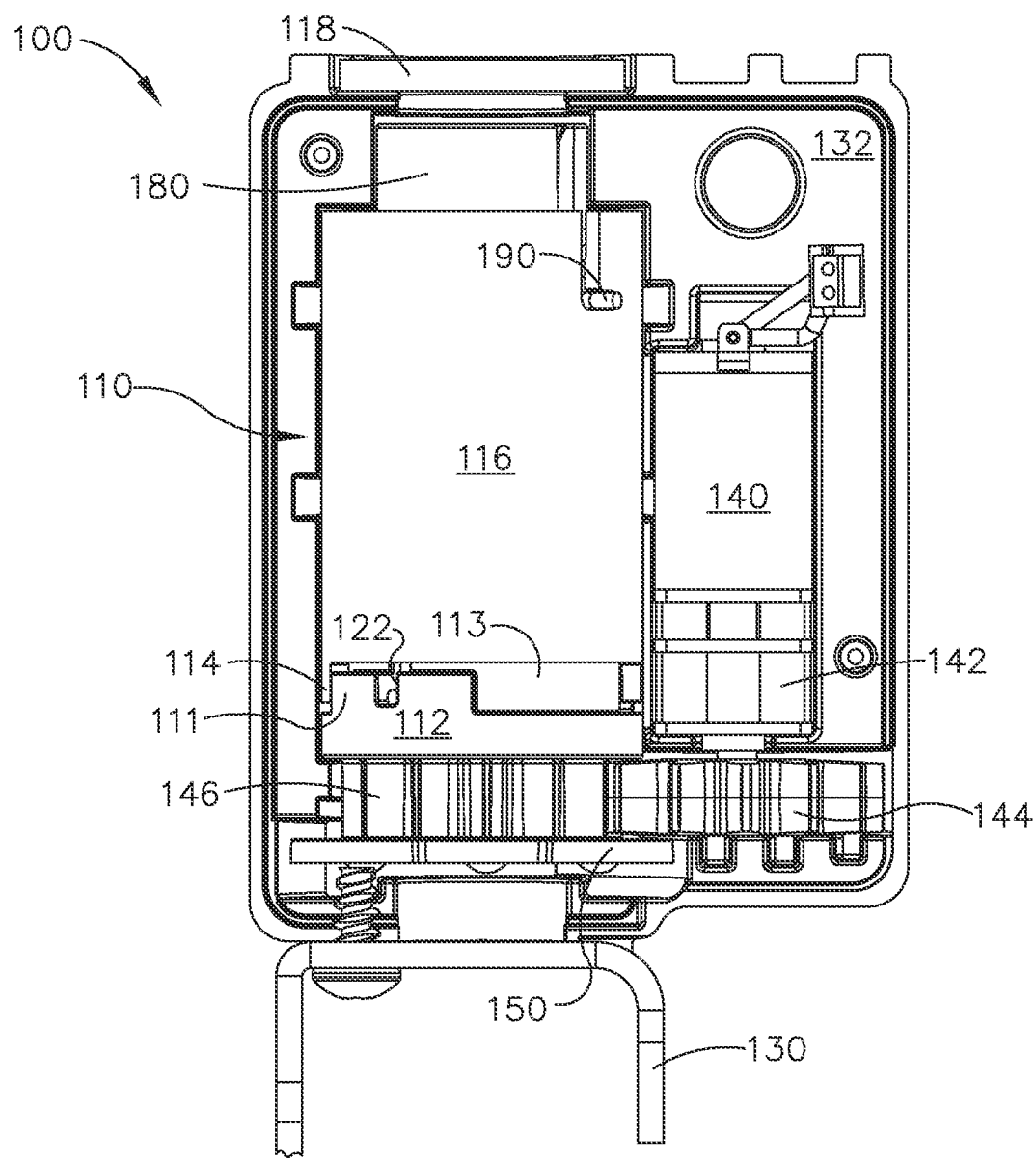
FIG. 11 is a front view of the internal housing subassembly of FIG. 10.

Referring now to FIG. 11, the internal housing top opening 118 is shown at the top (in this view), with the barrel 180 and the torsion spring 190 directly below. Below the barrel 180 is the top sleeve 116, which has the tab 114 at the bottom of the top sleeve. Below the top sleeve 116 is the bottom sleeve 112, which has the tab 111 that engages the tab 114 of the top sleeve 116. Below the bottom sleeve 112 is the barrel spur gear 146. Affixed to, and below, the barrel spur gear 146 is the barrel position disk 150. The bottom mounting bracket 130 is also shown, below the barrel position disk 150.

Next to the top sleeve 116 and to the right (in this view) is the motor 140. The motor 140 is mounted to the motor mounting bracket 142, and below the bracket 142 is the motor spur gear 144. Above the motor is the mounting plate 132.

Figure 12:
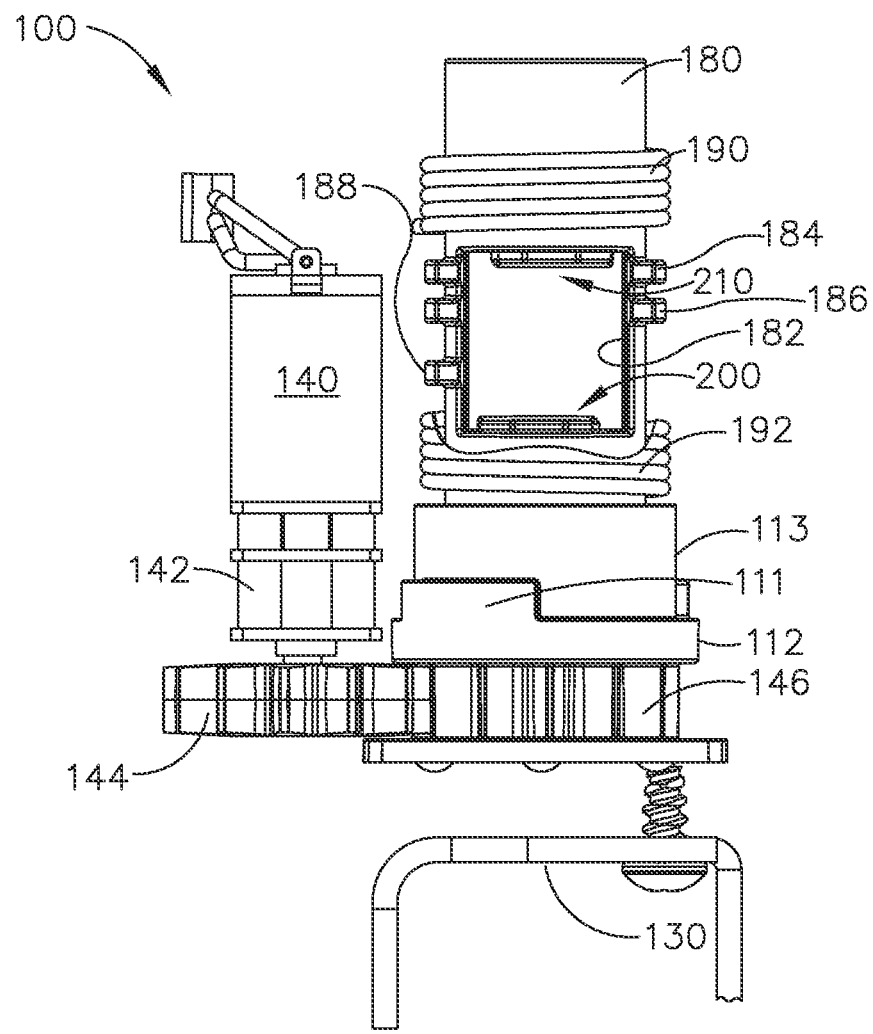
FIG. 12 is a rear view of the internal housing subassembly for the lockbox of FIG. without the front half housing, back half housing, and PC board.

Referring now to FIG. 12, the motor 140 is shown on the left (in this view), mounted to the motor mounting bracket 142, and the motor spur gear 144 is mounted below the motor mounting bracket 142.

The barrel spur gear 146 is operationally coupled to the right (in this view) with the motor spur gear 144. Above the barrel spur gear is the barrel subassembly 110, shown without the top sleeve. A barrel 180 is shown having the torsion spring 190 near the top of the barrel, and below that is an aperture 182. It should be noted that the aperture is only on one side of the barrel 180, and the aperture 182 faces away from the keypad side of the lockbox when in the home position. Three horizontal (in this view) protrusions 184, 186, 188 on the barrel 180 are located on the circumference of the barrel proximal to the aperture 182. Seen inside the aperture is a top inner protrusion 210, and a bottom inner protrusion 200. Below the aperture is the torsion spring 192.

The bottom sleeve 112 includes a guide portion at 113, which is smaller in outer diameter than the lowermost portion (at reference numeral 112 on FIG. 12). The inner diameter of the lowermost portion of the upper sleeve 116 fits around this guide portion 113, which helps to maintain proper alignment of upper sleeve 116. The tab portion 111 is also viewed on FIG. 12, which has a similar outer diameter as the lowermost portion at 112.

Figure 13:
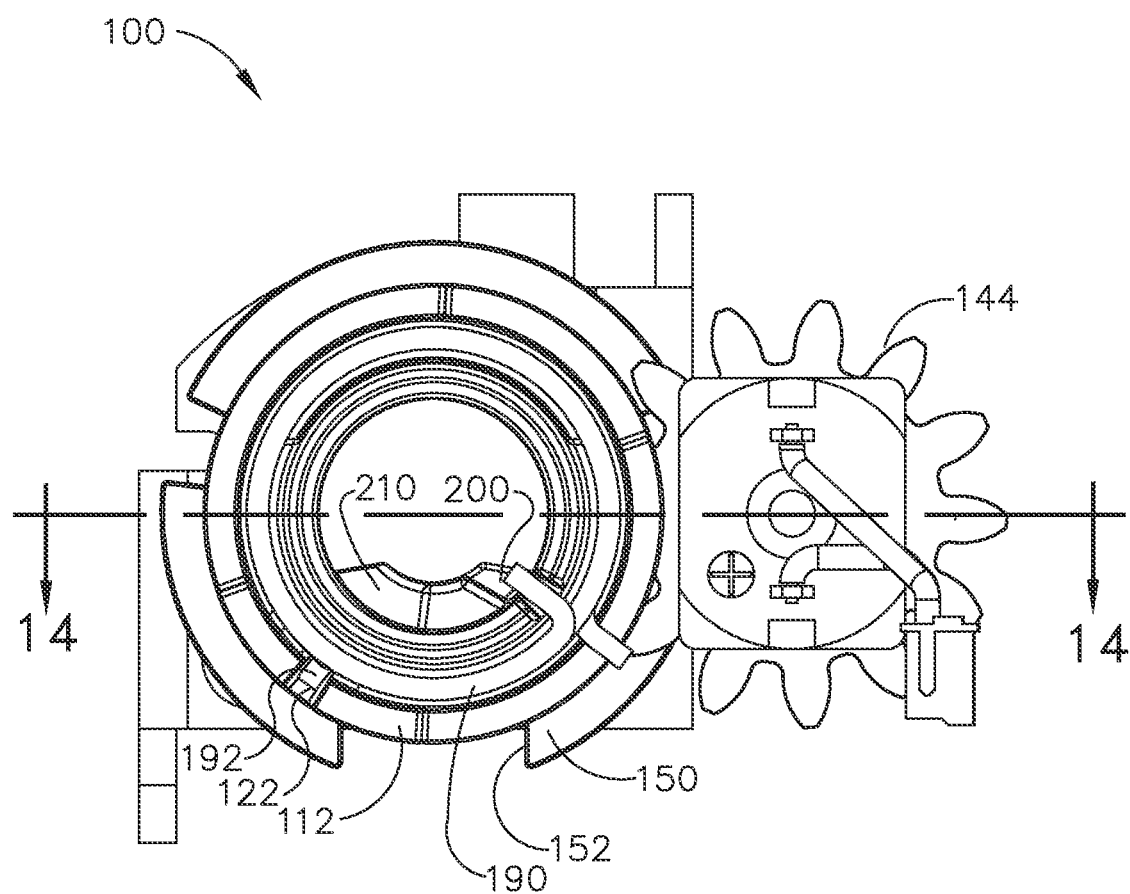
FIG. 13 is a top view of the internal housing subassembly of FIG. 12 showing the barrel, motor, and motor spur gear.

Referring now to FIG. 13, the two inner protrusions 210, 200 of barrel 180 are shown. It should be noted that inner protrusion 200 is lower than inner protrusion 210. (See FIG. 14 for greater detail.) The barrel position disk 150 is shown having a circumference larger than the barrel.

Figure 14:
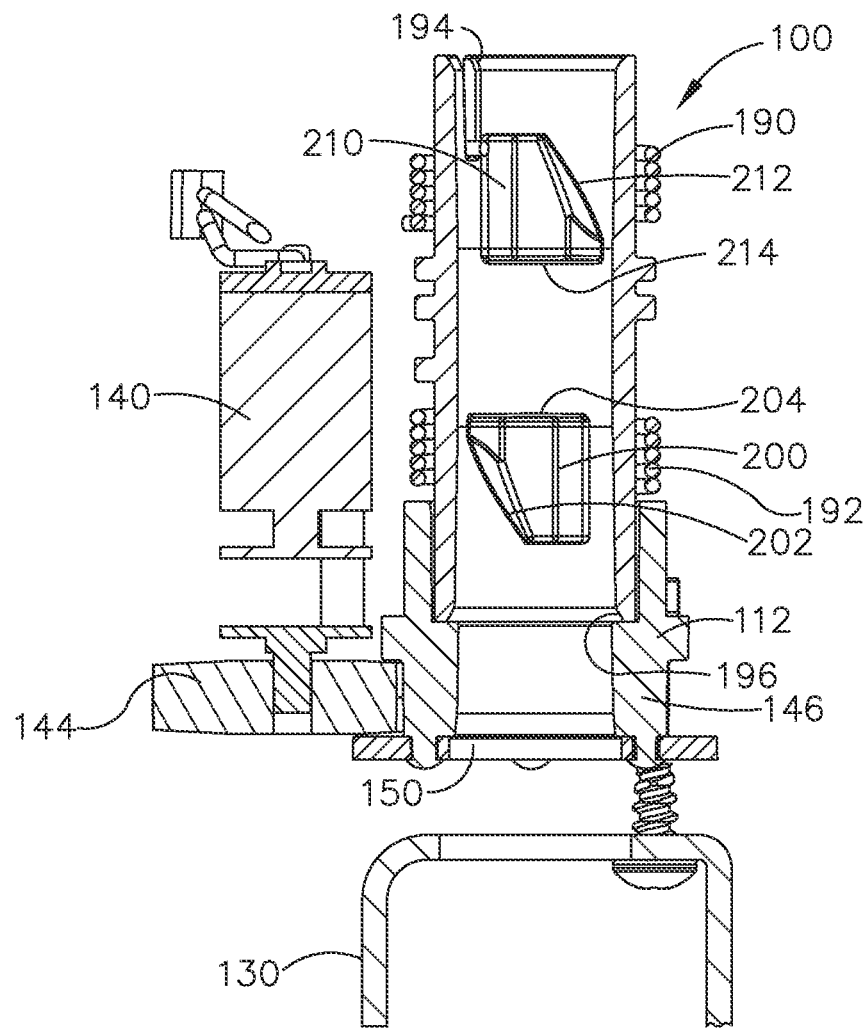
FIG. 14 is a rear sectional view taken along the line 14-14 of FIG. 13.

Referring now to FIG. 14, the top inner protrusion 210 is shown, having an oblique (inclined or sloped) surface 212, and a horizontal (in this view) latch or hook surface 214. Below the top inner protrusion is the bottom inner protrusion 200, having an oblique (inclined or sloped) surface 202, and a horizontal (in this view) latch or hook surface 204.

Figure 15:
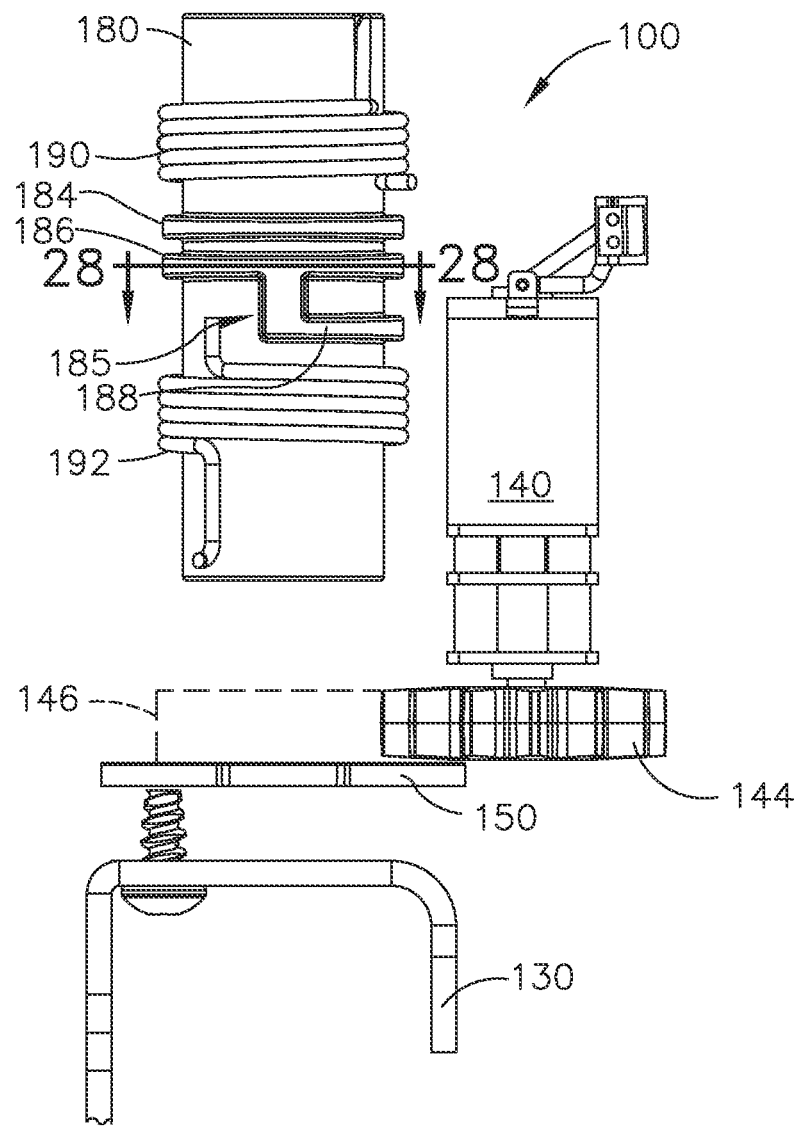
FIG. 15 is a front view of the internal housing subassembly of FIG. 10 without the front half housing, back half housing, PC board, top sleeve, and bottom sleeve.

Referring now to FIG. 15, the three protrusions 184, 186, 188 are more clearly shown along the barrel 180 circumference. A vertical stop portion 185 is illustrated as a vertical protrusion (in this view) connecting two horizontal (in this view) protrusions 186, 188. The vertical stop portion 185 keys to an interior tab on the top sleeve 116 (not shown in this view). The top sleeve 116 is prevented from moving down by engaging with the protrusion 184.

Figure 16:
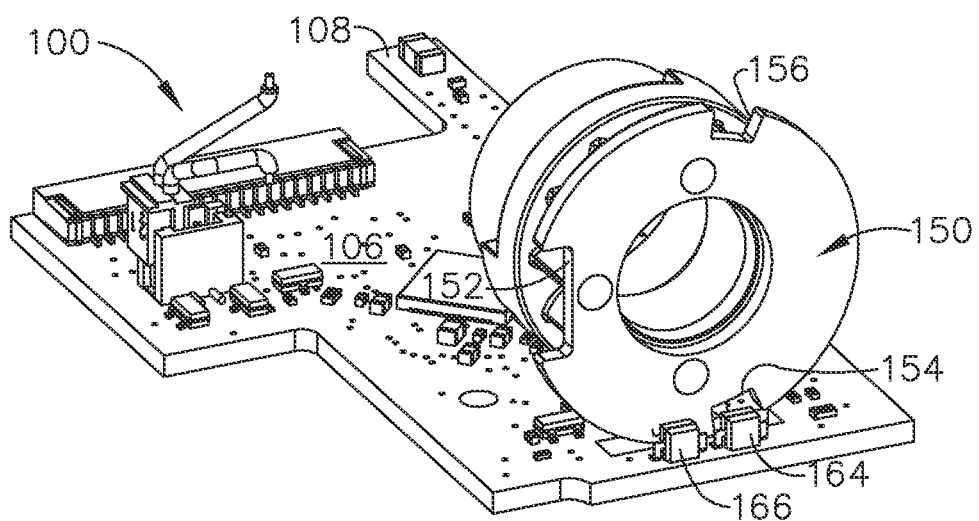
FIG. 16 is a bottom perspective view of the PC board and barrel position disk of FIG. 10 showing the disk in a clockwise, key bin release state.

The next three figures (FIGS. 16-18) show the three possible "rest" positions for the barrel position disk 150. In FIG. 16, the barrel position disk 150 is shown in a "key bin release" position. A key bin release opening 154 on the barrel position disk 150 is illustrated. This operating state shows the barrel position disk 150 covering the LED 162 (not shown) so that the photosensor 166 cannot detect the LED 162 light. However, the photosensor 168 (not shown in this view) can see the LED 164 light through the key bin release opening 154.

Figure 17:
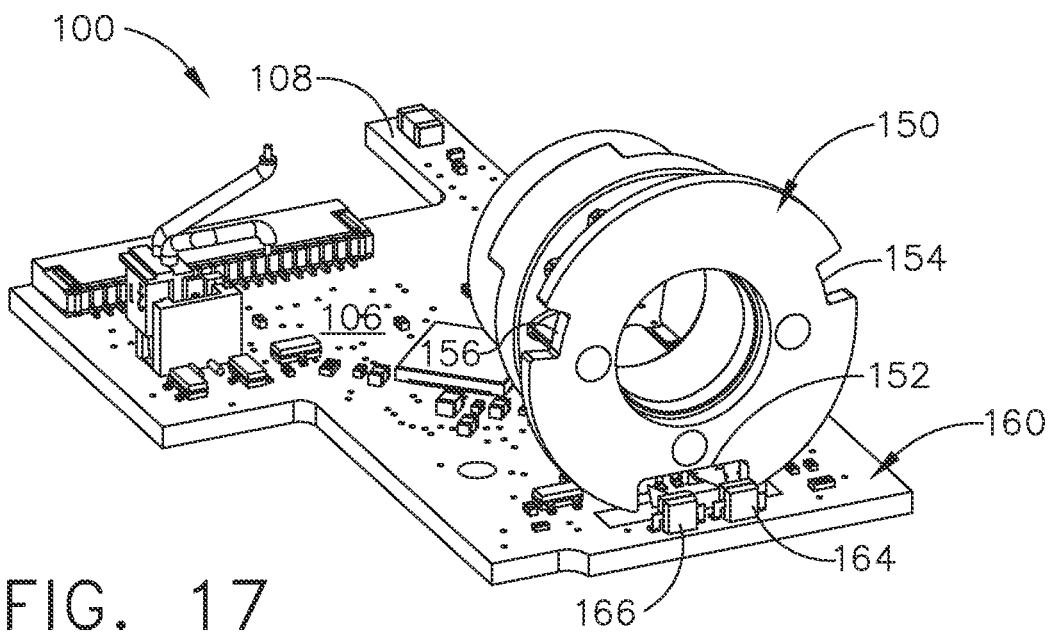
FIG. 17 is a bottom perspective view of the PC board and barrel position disk of FIG. 10 showing the disk in a home state.

In FIG. 17, the barrel position disk 150 is shown in a "home position," which also is an "armed" or "locked" position. A home opening 152 on the barrel position disk 150 is illustrated. This operating state shows the barrel position disk 150 not covering either LED 162, 164, or either photosensor 166, 168 and, therefore, both photosensors 166 and 168 will receive their respective optical signals from the LEDs 162 and 164 in this state.

Figure 18:
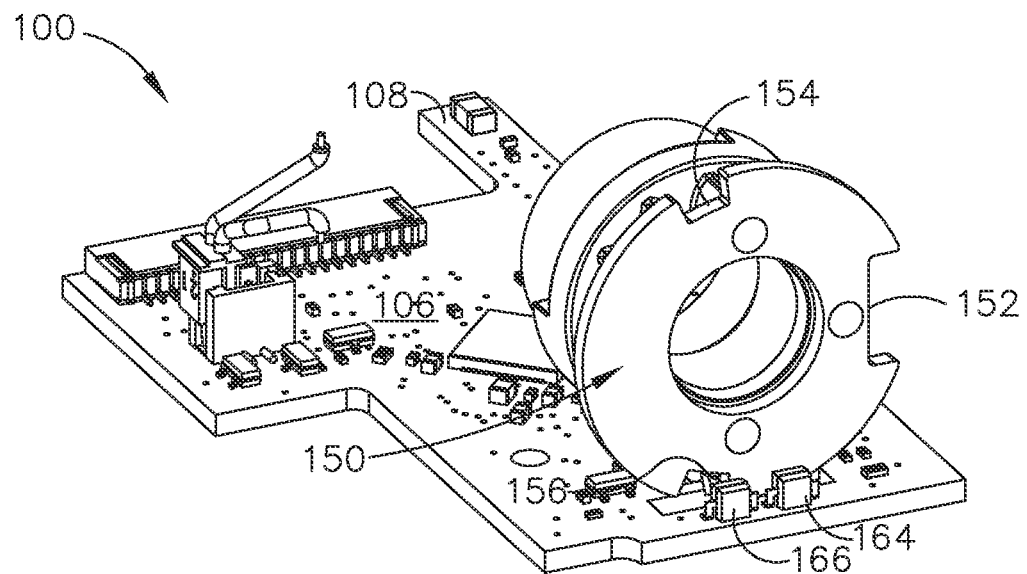
FIG. 18 is a bottom perspective view of the PC board and barrel position disk of FIG. 10 showing the disk in a counterclockwise, shackle release state.

In FIG. 18, the barrel position disk 150 is shown in a "shackle release" position. A shackle release opening 156 on the barrel position disk 150 is illustrated. This operating state shows the barrel position disk 150 covering the LED 164 so that the photosensor 168 (not shown) cannot detect the LED 164 light. However, the light from LED 162 (not shown) is detectable by the photosensor 166 through the shackle release opening 156.

Figure 19:
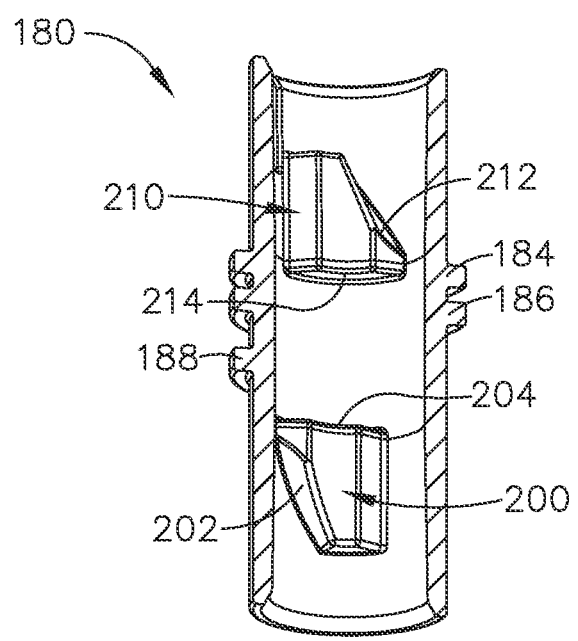
FIG. 19 is a rear sectional view of the barrel of FIG. 10.

Referring now to FIG. 19, a detailed view of the inside of the barrel is depicted. On the outside circumference of the barrel are the circumferential protrusions 184, 186, and 188. On the inside circumference of the barrel are the top inner protrusion 210, and the bottom inner protrusion 200. As can be seen, both protrusions have an opposing hook surface 214 (or "first locking surface") and 204 (or "second locking surface"), respectively, and both protrusions have an oblique surface 212 and 202, respectively.

Figure 20:
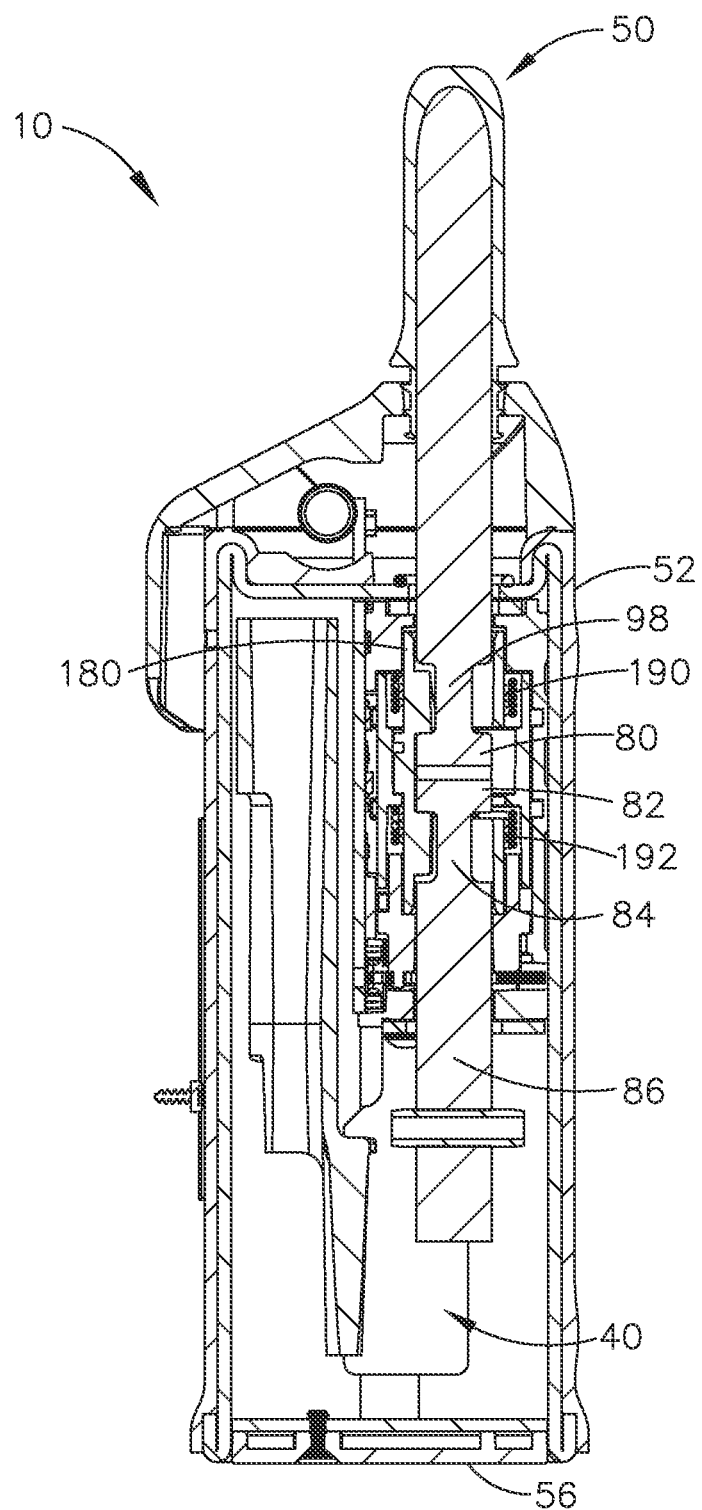
FIG. 20 is a side sectional view of the lockbox of FIG. 1 without the keypad.

Referring now to FIG. 20, the lockbox 10 is shown with both the shackle 50 and the key bin 40 in a locked position. The shackle latch hook portion 80 is shown nearly touching a key bin latch hook portion 82 inside the barrel 180. The key bin latch pin 86 is attached to the key bin 40, and at the distal end of the key bin extension is the key bin lock portion 82.

Figure 21:
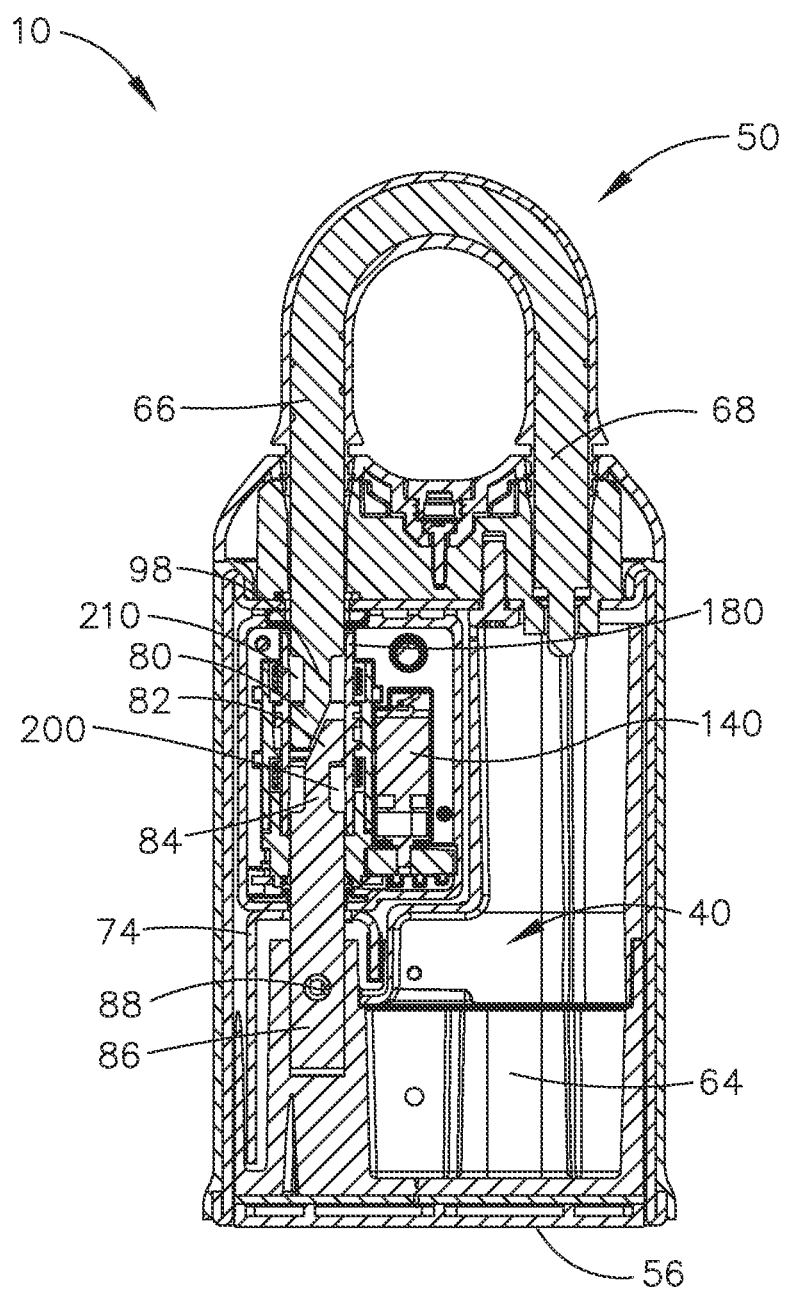
FIG. 21 is a front sectional view of the lockbox of FIG. 1.
Figure 23:
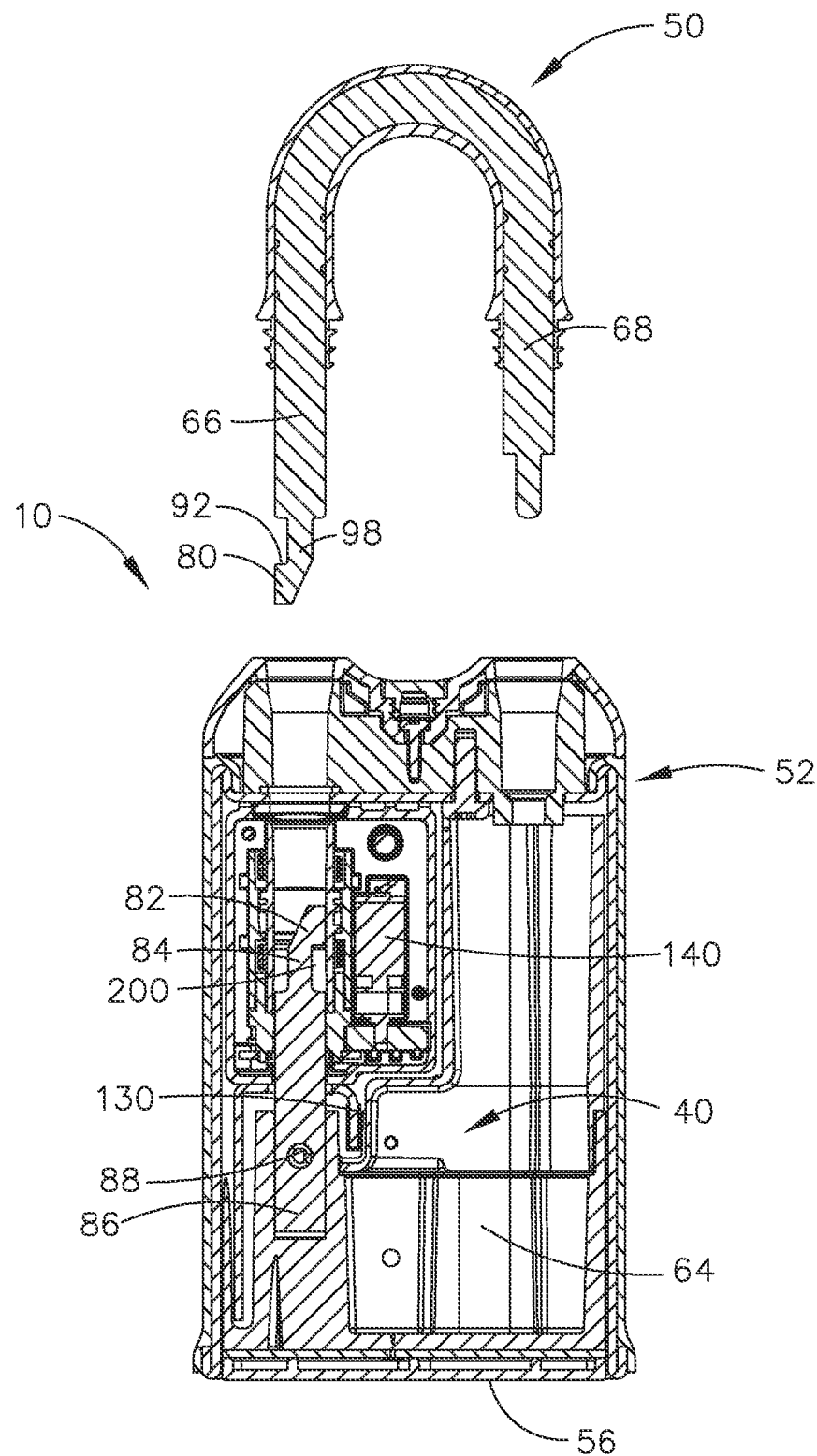
FIG. 23 is a front sectional view of the lockbox of FIG. 1 with the shackle detached.

FIGS. 21-23 show the lockbox in three operating states: (#1) locked, (#2) the key bin (only) disengaged (detached), and (#3) the shackle (only) disengaged (detached).

In FIG. 21, the lockbox 10 is shown in a front sectional view with both the shackle 50 and the key bin 40 in a locked position. The shackle extension 68 is shown fully inserted inside the lockbox. The shackle latch hook portion 80 and the key bin latch hook portion 82 are shown nearly touching inside the barrel 180. These latch hook portions 80, 82 can be seen engaged with the (horizontal) latch surfaces 214, 204 of the inner protrusions 210, 200.

In FIG. 22, the key bin 40 is shown detached from the lockbox 10. The latch hook portion 82 of the key bin latch pin 86 can be seen in some detail, depicting a narrowed shaft portion 84 and a horizontal (in this view) mating latch surface 96 (or "third locking surface") at a distal end of latch pin 86. The shackle 50 is shown still inserted inside the outer housing 52, and the shackle latch hook portion 80 is mated with the top inner protrusion 210, creating a shackle lock state.

In FIG. 23, the key bin 40 is shown inserted and locked within the outer housing 52, in which the shackle latch hook portion 80 can be seen in some detail, depicting a narrowed shaft portion 98 and a horizontal (in this view) mating latch surface 92 (or "fourth locking surface") at a distal end. The fourth locking surface 92 is substantially perpendicular to a longitudinal direction of the second elongated shaft 92. In this view, the shackle 50 is shown detached from the lockbox 10. The key bin latch hook portion 82 can be seen mated to the bottom inner protrusion 200, creating a key bin lock state.

Figure 24:
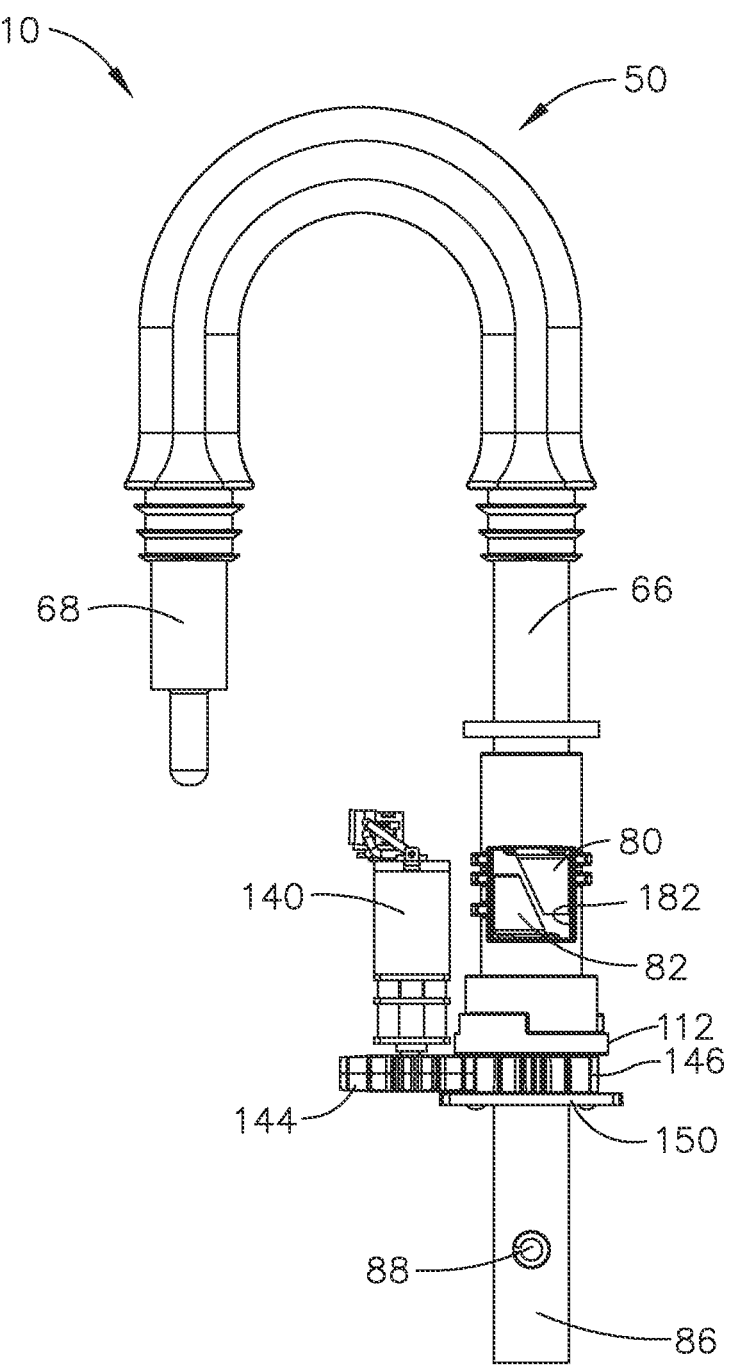
FIG. 24 is a rear view showing the shackle extension and key bin extension in a locked state within the barrel of the lockbox of FIG. 1.

Referring now to FIG. 24, this view illustrates how tight the engagement is between the latch hook portions and the inner protrusions of the barrel. As can be seen "through" the aperture 182, the shackle latch hook portion 80 is hooked onto the "shelf," or horizontal (in this view) latch surface, or "hook" surface, 214. (See FIG. 19.) Similarly, the key bin latch hook portion 82 is hooked onto the "shelf," or horizontal (in this view) latch surface, or "hook" surface 204. (See FIG. 19.)

Figure 25:
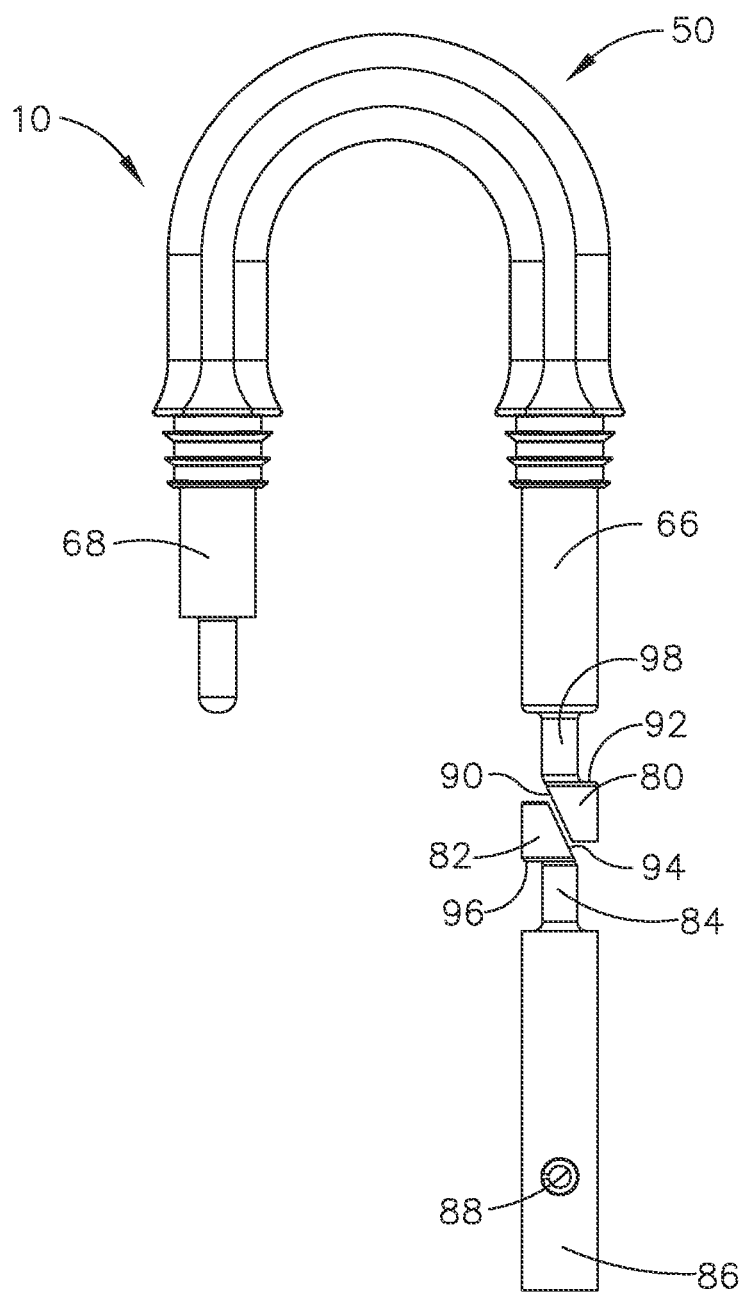
FIG. 25 is a rear view showing the shackle extension and key bin extension of FIG. 24 in a locked state, with the barrel removed.

Referring now to FIG. 25, the barrel 180 has been renewed, as compared to FIG. 24, to show just the latch hook portions 80, 82. It should be noted that the hook portions 80, 82 are almost touching each other inside the barrel when both latch pins 68 and 86 are fully inserted. The shackle latch hook portion 80 has an oblique surface 90, and a horizontal (in this view) latch surface 92. The key bin latch hook portion 82 also has an oblique surface 94, and a horizontal (in this view) latch surface 96.

When a user inserts the shackle 50 into the lockbox 10, the shackle oblique surface 90 initially contacts the top inner protrusion oblique surface 212. In the illustrated embodiment, the shackle oblique surface 90 is substantially flat (as an inclined plane); the oblique surface 212 has a helical shape, and that helical shape forces the barrel 180 to slightly rotate as the shackle is forced farther into the barrel. That rotation causes the torsion spring 190 to wind up (put under tension) as the shackle is inserted, because the barrel 180 cannot turn since the motor 140 is off, and both the motor spur gear 144 and the barrel spur gear 146 are "held" immobile. Once the shackle latch surface 92 clears the top inner protrusion 210, the torsion spring 190 unwinds and forces the barrel back into its "home" position. As the barrel rotates back to its home state, the top inner protrusion latch surface 214 rotates with it, and once in place it creates a latch or lock state with the shackle latch surface 92.

A similar operation occurs for the key bin latch hook 82. As the key bin 40 is inserted into the lockbox 10, the key bin oblique surface 94 initially contacts the bottom inner protrusion oblique surface 202. In the illustrated embodiment, the key bin oblique surface 94 is substantially flat (as an inclined plane); the oblique surface 202 has a helical shape, and that helical shape forces the barrel 180 to slightly rotate (in the opposite direction as described above) as the key bin latch pin is forced farther into the barrel. That rotation causes the torsion spring 192 to wind up (put under tension) as the key bin is inserted, because the barrel 180 cannot turn since the motor 140 is off, and both the motor spur gear 144 and the barrel spur gear 146 are "held" immobile. Once the key bin latch surface 96 clears the bottom inner protrusion 200, the torsion spring 192 unwinds and forces the barrel back into its "home" position. As the barrel rotates back to its home state, the bottom inner protrusion latch surface 204 rotates with it, and once in place it creates a latch or lock state with the key bin latch surface 96.

Figure 35:
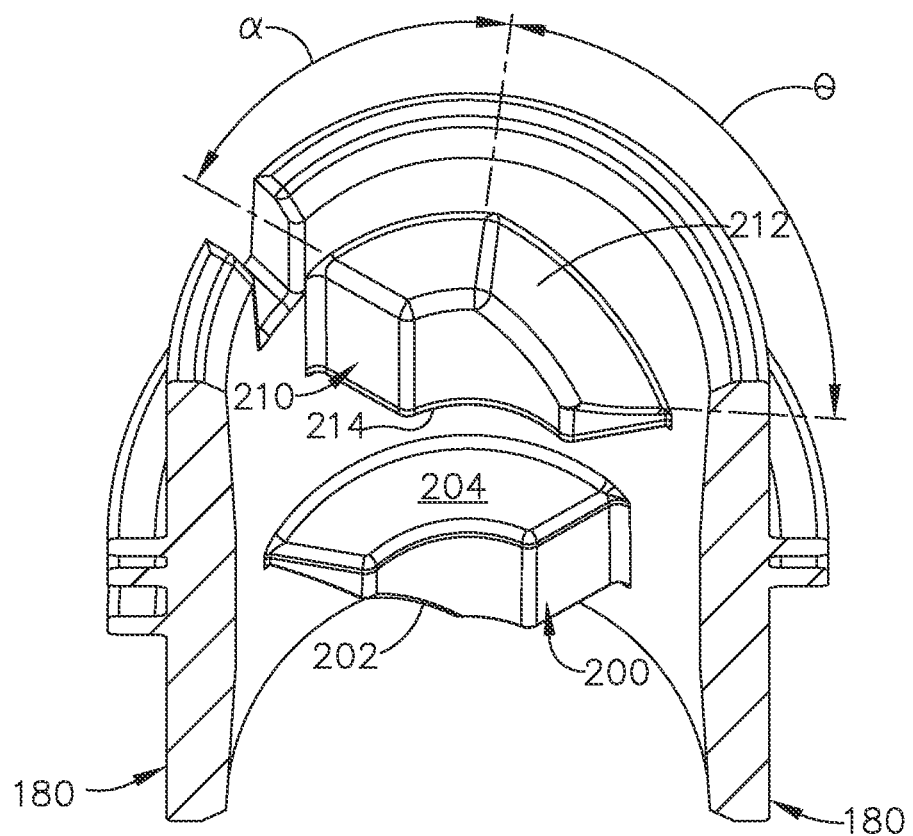
FIG. 35 is a rear perspective sectional view of the barrel of the lockbox of FIG. 1.

Certain angular characteristics of the barrel's oblique surfaces described above are shown in FIG. 35. The top inner protrusion 210 includes a (horizontal) planar latch surface 214, and an oblique surface 212, which has a helical-shaped profile. The helical-shaped surface 212 works against a latch pin as that latch pin is installed. For example, when the shackle is inserted, its most distal end, which is the latch hook 80 portion of its latch pin extension 66, comes into contact with the oblique surface 212 of the top inner protrusion 210. As the shackle is pushed farther into the lockbox, the barrel is forced to rotate through an angle θ (about 90°), as the tip of the latch hook portion 80 slides (downward) along that helical surface. Once the tip of the latch hook portion 80 "clears" the lowermost end of that portion 212 of the protrusion 210, the shackle will now become locked into place when the barrel is automatically rotated back to its home position by the action of the lockbox torsion springs. As described above, the horizontal surface 214 (if the lockbox is vertically positioned) has now become a latching (or locking) surface against the horizontal surface 92 of the shackle's latch hook 80.

The key bin's installation will force its latch pin 86 to be pushed against a similar oblique surface 202 of the lower inner protrusion 200; this surface 202 also has a helical-shaped profile. In other words, the most distal end of the latch hook portion 82 of the key bin's latch pin 86 comes into contact with the oblique surface 202 of the bottom inner protrusion 200. Similar to the shackle insertion, as the key bin is pushed farther into the lockbox, the barrel is forced to rotate through a similar angle θ (about 90°), but in the opposite angular direction, as the tip of the latch hook portion 82 slides (upward) along that helical surface. Once the tip of the latch hook portion 82 "clears" the uppermost end of that portion 202 of the protrusion 200, the key bin will now become locked into place when the barrel is automatically rotated back to its home position by the action of the lockbox torsion springs. As described above, the horizontal surface 204 (if the lockbox is vertically positioned) has then become a latching (or locking) surface against the horizontal surface 94 of the key bin's latch hook 82.

The additional angle α tends to hold a latch pin in place after its installation. For example, if the shackle has been installed, but the key bin is still loose, then that key bin's installation will force its latch pin 86 to be pushed against the oblique surface 202 of the lower inner protrusion 200. When that occurs, the angular rotation of the barrel will be in a direction that would tend to unlock the shackle. However, the top inner protrusion 210 has two angular portions along its bottom "latching" planar surface 214: the angle θ portion and the angle α portion. The combination of the angle θ plus the angle α equals the total barrel rotational angle for holding a latch pin in place—e.g., the size of the protrusion's bottom surface 214. Therefore, the shackle will not become unlatched (or unlocked) as the key bin latch pin is installed into the barrel 180.

As noted above, it will be understood that corresponding angles θ and α are exhibited regarding the movements of the bottom inner protrusion 200, but in the opposite orientation. Therefore, the key bin will not become unlatched (or unlocked) as the shackle's latch pin is installed into the barrel 180. As described above, the combination of the angle θ plus the angle α equals the total barrel rotational angle for holding a shackle's latch pin in place—i.e., in this instance, the size of the protrusion's 200 top planar surface 204.

Figure 26:
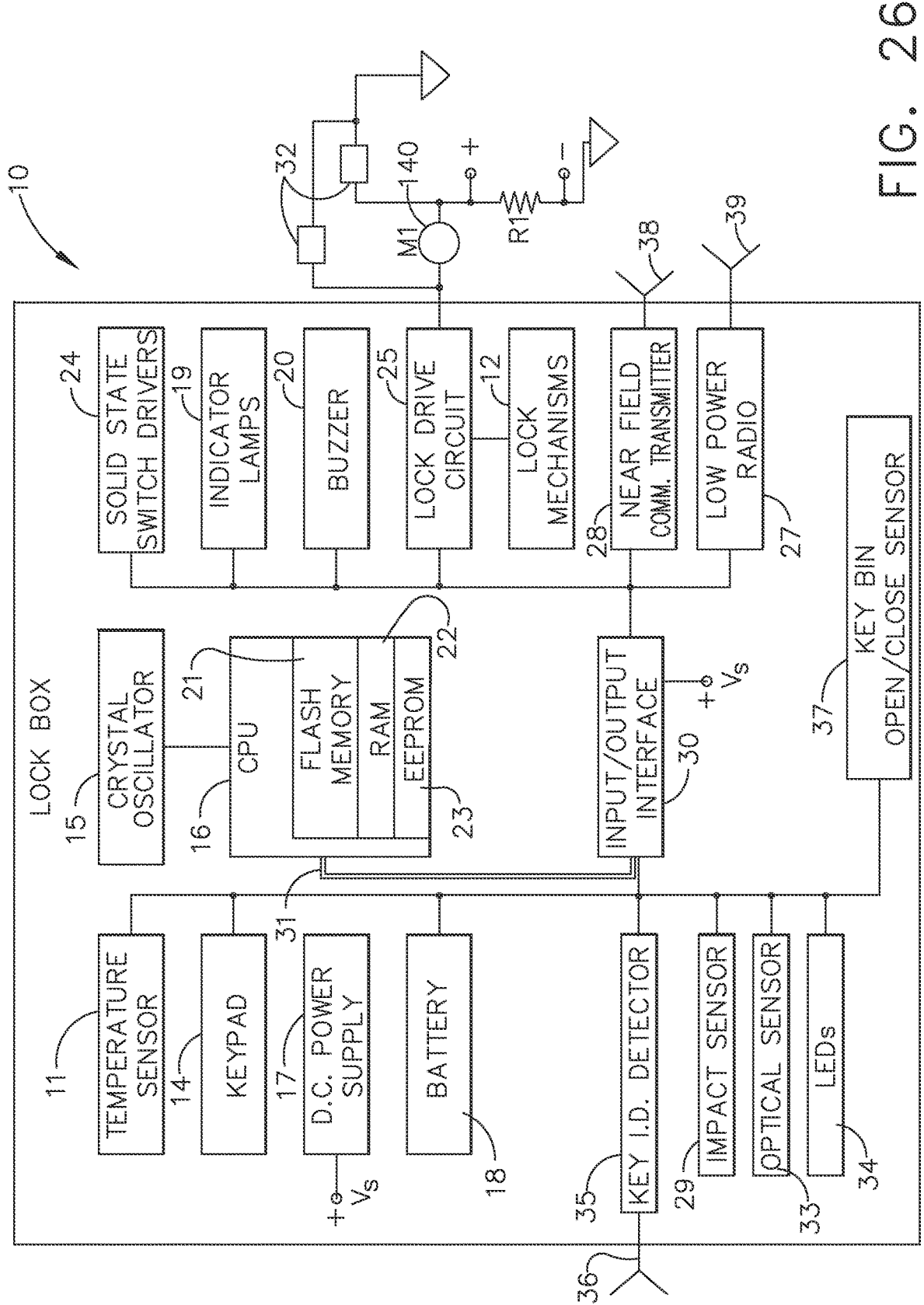
FIG. 26 is a block diagram of the lockbox of FIG. 1.

The main components of the electronic circuitry of electronic lockbox 10 is illustrated in block diagram form in FIG. 26. In this illustrated embodiment, electronic lockbox includes a microprocessor or microcontroller (CPU) 16, FLASH memory 21, random access memory (RAM) 22, EEPROM (electrically erasable programmable read only memory) 23, a battery (or other electrical power supply) 18 (power supply 18 on FIG. 26 is electrically equivalent to the battery 62 seen on FIG. 2), a D.C. power supply 17, indicator LED lamps 19, a piezo buzzer 20, a crystal oscillator 15, a digital temperature sensor 11 (these last two devices can be combined into a single chip), at least one solid state switch driver 24, a lock drive circuit a rotatable actuator to act as a shackle lock/release mechanism 12, and a membrane style keypad 14 for user data entry. (Keypad 14 on FIG. 26 is electrically equivalent to the external keypad 58 seen on FIG. 1). An impact sensor 29 can also be included in electronic lockbox 10, to detect abnormal mechanical forces that might be applied to the lockbox.

An input/output (I/O) interface circuit 30 is included to provide signal conditioning as needed between the CPU 16 and other components that typically use voltage and/or current levels that are not typically able to directly connect to a processing circuit, such as sensors and output device driver circuits. Each appropriate I/O signal is directed through a separate channel of the I/O interface circuit 30, unless perhaps more than one signal of a particular voltage and current rating can be multiplexed, in which case a multiplexer circuit can be included in the I/O interface circuit 30. The data signals between I/O circuit 30 and the CPU 16 run through a low voltage signal bus 31.

A data interface in the form of a low power radio 27 with an antenna 39 is included in this embodiment so that the CPU 16 is able to communicate with other external devices, such as a separate portable transponder that uses a compatible wireless data link. (The portable transponder can also be referred to as a "mobile device," a "portable communications device," an "electronic key," or a "smart phone" in some embodiments of this technology.) The portable transponder also includes a low power radio, which communicates with the lockbox radio 27 using a protocol that could be proprietary, if desired. However, these radios could use any number of various communications protocols, such as Bluetooth, although the data structure in the messages between these radios certainly could be encrypted (or otherwise formatted) in a proprietary manner.

The radio 27 further could comprise some other type of wireless communications circuit that may not operate on a strictly radio principle, including types of wireless communications transmitters or receivers that have not been invented as of yet. In this description, such wireless communications devices will typically be referred to as "radios;" however, in this patent document they may also be referred to as a "short range wireless communications device," a "low power wireless communications device," a "short range wireless transmitter" (and/or receiver), or a "low power wireless transmitter" (and/or receiver).

This radio 27 could have any number of types of communications protocols, including one that allows the lockbox 10 to exchange data with an electronic key in the form of a smart phone. A special software application program (an "APP") would typically run on the smart phone, to allow it to communicate with lockbox 10.

A near field communications (NFC) transmitter 28 with antenna 38 is also included so that the CPU 16 is able to communicate with other external devices, such as a separate portable computer in the form of a PDA (personal digital assistant), a smart phone, or other type of portable computing device that uses NFC. For example, NFC transmitter 28 can comprise an RFID port that communicates with a standard RFID port found on many PDA's; or it could use a different communications protocol.

One preferred processing circuit for use in this control system is a microcontroller chip made by Texas Instruments, part number CC2642. This microcontroller integrated circuit includes a microprocessor portion (with a 16-Bit RISC Architecture), a memory portion, a serial communications interface portion, and an analog signal interface portion (a 10-Bit A/D converter). Therefore, this single integrated circuit essentially contains all the components needed to make up the processing circuit 16, memory circuit 22, and most of the components necessary for the NFC transmitter 28, which is why it is called a microcontroller, rather than a mere microprocessor or microcomputer.

The microprocessor 16 controls the operation of the electronic lockbox 10 according to programmed instructions (electronic lockbox control software) stored in a memory circuit, such as in FLASH memory 21. RAM memory 22 is typically used to store various data elements such as counters, software variables and other informational data. EEPROM memory 23 is typically used to store more permanent electronic lockbox data such as serial number, configuration information, and other important data.

It will be understood that many different types of microprocessors or microcontrollers could be used in the electronic lockbox system 10, and that many different types of memory circuits could be used to store data in both volatile and non-volatile form, without departing from the principles disclosed herein. In one mode of an exemplary embodiment, the electronic lockbox CPU 16 is a microcontroller that incorporates RAM 22, FLASH memory 21 and EEPROM memory 23 internally (as on-board memory).

The power supply 18 typically comprises a battery that provides the operating electrical power for the electronic lockbox 10. It will be understood that an alternative electrical power supply could be used if desired, such as a solar panel with a memory backup capacitor.

An input/output (I/O) interface circuit 30 is provided so the microprocessor 16 can exchange data and operational signals with external devices, or with integral devices to the lockbox that require greater power than can be directly supplied by the microprocessor's pinouts. This puts the I/O circuit 30 in the pathway for virtually all signals that are used in the controlling of lockbox 10, including the data signals that are involved with the NFC transmitter 28, and the low power radio 27.

The lock and release mechanism 12 uses a gear motor mechanism (not shown on FIG. 26) that is controlled by a drive circuit 25 that, in turn is controlled by CPU 16. It will be understood that the release or locking mechanisms used for the shackle latch pin 66 and key bin latch pin 86 can be constructed of many different types of mechanical or electromechanical devices without departing from the principles disclosed herein.

The crystal oscillator 15 provides a steady or near-constant frequency (e.g., at 32.768 kHz) clock signal to CPU 16's asynchronous timer logic circuit.

It should be noted that an electronic key (such as that described above) could be used as a type of secure memory circuit, if desired. Such an electronic key would also contain memory elements, and perhaps would contain some control logic circuits, depending on the type of electronic key that is used. With regard to FIG. 26, if an electronic key is used, it could be interfaced to the CPU circuit 16 of the electronic lockbox 10 in many different ways, including via an electrical circuit that makes contact between the lockbox 10 and the electronic key, or perhaps via an electromagnetic signal such as a short range radio wave, or an optical signal. As used herein, the term "electronic key" can have a meaning to include a relatively simple device, such as a secure memory card (or a smart card), and it can have a meaning to include a sophisticated device, such as a laptop computer or a smart phone that has a wireless communications circuit to send and receive messages from other devices, including an electronic lockbox and/or a central clearinghouse computer. A "typical" electronic key for use with lockbox 10 will generally be a more sophisticated device.

In one embodiment, the digital temperature sensor 11 is read at regular intervals by the electronic lockbox CPU 16 to determine the ambient temperature. Crystal oscillator 15 may exhibit a small change in oscillating characteristics as its ambient temperature changes. In one type of crystal oscillator, the oscillation frequency drift follows a known parabolic curve around a 25 degrees C. center. The temperature measurements are used by CPU 16 in calculating the drift of crystal oscillator 15, thus compensating for the drift and allowing precise timing measurement regardless of electronic lockbox operating environment temperature. As noted above, a single chip can be used to replace the combination of crystal oscillator 15 and temperature sensor 11, such as a part number DS32KHZ manufactured by Dallas Semiconductor.

The LED indicator lamps 19 and piezo buzzer 20 are included to provide both an audible and a visual feedback of operational status of the electronic lockbox 10. Their specific uses are described in detail in other patent documents by the same inventor, as noted below. The keypad 14 preferably is a self-contained intelligent device, with its own processing circuit, such as a TI MSP430G2333.

The impact sensor 29 can be used to notify an external device, in case of an attempted removal or other type of damage being done to the lockbox 10, including intentional damage. Such an external device could comprise a "base station" as described in detail in other patent documents by the same inventor, or it could comprise a portable transponder or an electronic key.

A typical electronic lockbox system will include one or more electronic lockboxes, one or more portable transponder devices (such as "electronic keys"), a central clearinghouse computer system (also sometimes referred to as a "CCC"), and a wireless data communications system, typically having an Internet connection, and a mobile communications service provider. The central clearinghouse computer typically will include a database which contains a repository of electronic lockbox identification and attribute information, and also contains a repository of information about real estate agents. A computer controls the database, and includes a processing circuit and a memory circuit (in addition to any bulk memory storage devices that contain the database).

A typical electronic lockbox 10 is able to communicate with a portable transponder (or "electronic key") which includes a low power radio that can communicate data to and from the low power radio 27 of the electronic lockbox 10. If the portable transponder includes a wide area network radio, which would typically be the case for a smart phone, then such portable transponder will be able to communicate to the clearinghouse computer over a wide area network (WAN). Assuming that the mobile communications service provider is a cellular telephone system, the portable transponder will have the capability of essentially immediate communications with the clearinghouse computer from many, many locations, including most locations where an electronic lockbox 10 has been situated.

The wide area network radio further could comprise other types of wireless communications devices that may not operate on a strictly radio principle, including types of wireless communications devices that have not been invented as of yet. In this description, such wireless communications devices are sometimes referred to as "radios;" however, in this patent document they may also be referred to as a "wide area network wireless communications device," or as a "medium range wireless communications device." They can also be referred to as a "wireless transmitter" and/or a "wireless receiver," which implies either a radio or some other form of optical energy communications circuit; it could also imply transmitters and receivers that operate in wavelengths longer that typical "radio waves."

Some optional sensors can also be included in the lockbox 10 to enhance its overall performance, if desired by the system designer. For example, the key compartment cover (or door) can include an optional sensor that detects whether it is open or closed, which is designated by the reference numeral 37 on FIG. 26. This type of sensor has become a standard feature for lockboxes sold by SentriLock, LLC. There may be other lockbox manufacturers who are not using that type of sensor as a standard feature at this time, but may do so in the future.

Another optional sensor could be a dwelling key identification detector, designated by the reference numeral 35 on FIG. 26. This device would have the ability to detect the status of the identity of a key that has been placed inside the key compartment. One design for this type of device could be to use a RFID tag that is attached to a regular dwelling key of any type. The detector 35 would then comprise an RFID detector circuit, which can easily identify the correct RFID tag if the dwelling key with that particular RFID tag has been successfully placed back into the key compartment. Such a key detector 35 may well include an antenna 36.

The optical sensor package 33 that is included on the block diagram of FIG. 26 is equivalent to the photosensors 166, 168 seen on FIG. 17. This optical sensor package 33 will communicate with the input/output interface circuit 30, which provides a supply voltage $V_S$, as needed for the various I/O devices, including for the LEDs 34 that are part of the optical sensor package. (LEDs 34 on FIG. 26 are equivalent to the LEDs 162 and 164, described above.)

In the new-design lockbox technology that is disclosed herein, the lock drive circuit includes a motor 140, as described above, also referred to as motor "M1" of FIG. 26. In addition to a "normal" motor driver circuit, the lockbox 10 disclosed herein may include a current-sensing circuit, such as that illustrated in FIG. 26. As an example sensing circuit, a resistor of relatively low resistance value, but relatively high power rating (in watts) could be included in series with the drive coil of the motor M1. In this example, the resistor is designated "R1" on FIG. 18, and is positioned on the low-voltage side of the motor coil M1, between that coil and lockbox DC common. When current passes through the motor coil and through R1, a relatively low voltage is induced in the resistor R1; that voltage can be detected (with a differential voltage amplifier) to monitor the drive current of the motor M1.

The two motor leads are both connected to separate switching transistors, indicated at reference numeral 32 on FIG. 26. When the motor M1 is turned off, both transistors 32 can be turned on to effectively short-circuit the motor windings to DC common, thereby increasing the backdrive torque of the motor. This increase in backdrive torque helps to prevent the motor, and its mechanically-coupled motor spur gear 144, the movable indicator disk 150, and the bottom sleeve 112 from being rotated at times when the motor is de-energized.

Figure 27:
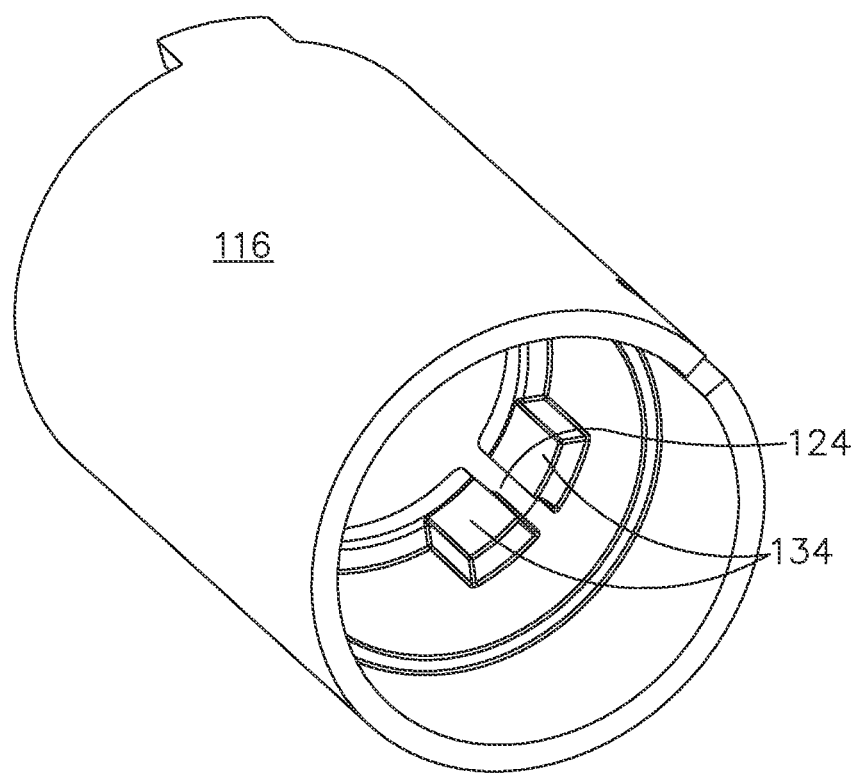
FIG. 27 is a front perspective view of the top sleeve of the internal housing subassembly of FIG. 10, showing the inner tab.
Figure 28:
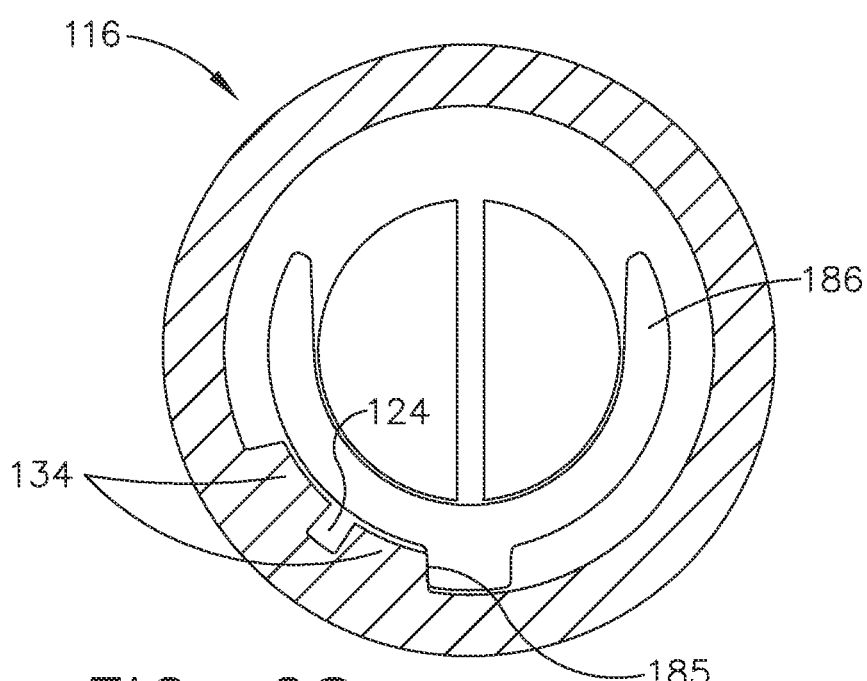
FIG. 28 is a top view of the barrel without the torsion springs taken along the line 28-28 of FIG. 15.

Referring now to FIGS. 27 and 28, the top sleeve 116 is shown having an interior tab 134. This interior tab 134 engages the protrusions 186, 188 of barrel 180, so that the top sleeve 116 smoothly moves around the circumference of the barrel 180 during operation. The stop portion 185 keys to the interior tab 134, under appropriate conditions.

Figure 29:
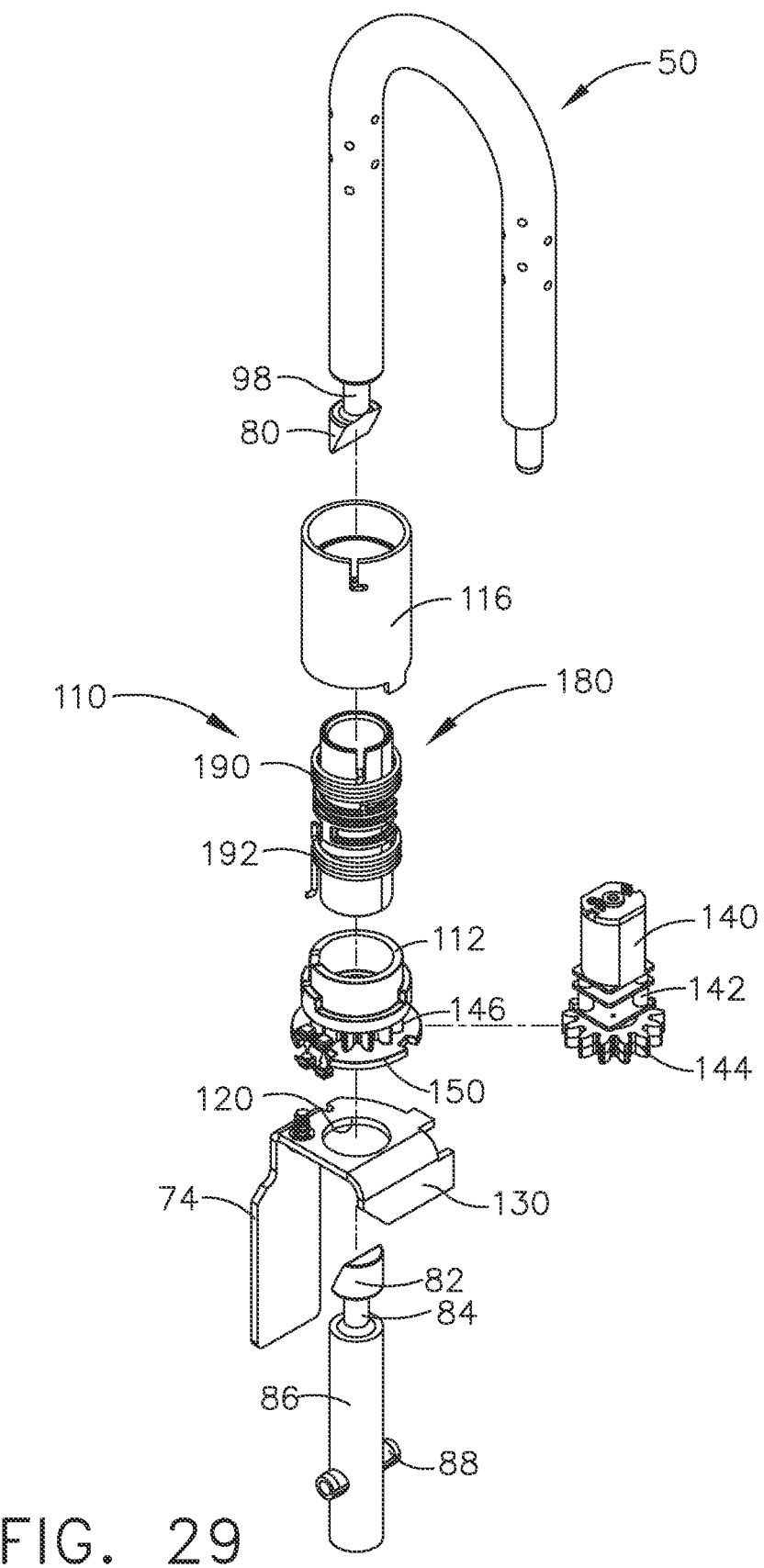
FIG. 29 is an exploded view of the barrel and mating latch pins, and other components, used in the locking subassembly of FIG. 10.

In FIG. 29, the barrel subassembly 110, motor 140, shackle 50, and key bin latch pin 86 are shown in an exploded view. (The movable actuator 110 has the general shape of a hollow cylinder, with a centerline in a longitudinal direction, for example.) As noted above, the entire locking assembly is in a direct line with each part, as illustrated in this view. When assembled, the motor spur gear 144 will engage the barrel spur gear 146.

Figure 30:
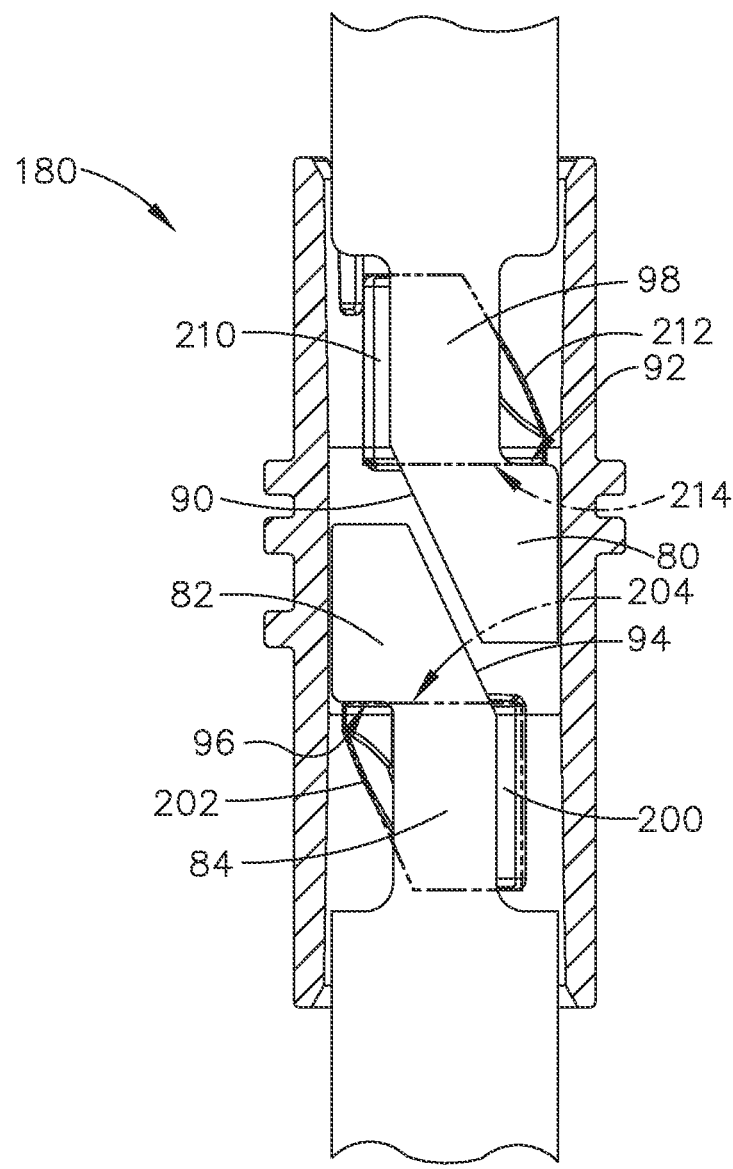
FIG. 30 is a cutaway view of the barrel of FIG. 10 showing how the latch hooks engage the barrel inner protrusions.

Referring now to FIG. 30, the barrel 180 is shown with both the shackle 50 and the key bin latch pin 86 engaged in a "locked" state. The sturdiness of this "locked" state comes not only from the latching of the shackle latch hook portion 80 with the top inner protrusion 210, and the key bin latch hook portion 82 with the bottom inner protrusion 200, but also with the engagement of a shackle narrow extension 98 and a key bin narrow extension 84.

These extensions 98, 84 engage the top inner protrusion 210, and the bottom inner protrusion 200, respectively. This engagement provides more stability when a person is attempting to break into the lockbox 10. Although the latch hook portions 80, 82 are held immobile in the lock state, these extension engagements help prevent further movement of the shackle and key bin latch members. The lockbox cannot simply be shaken or struck, because these engagements and the orientation of the oblique surfaces 90 and 94 prevent the latches from disengaging, and, along with the barrel being immobile (due to the motor being in a stop state), provide a very secure lockbox.

The first locking surface 214, and the second locking surface 204, are substantially perpendicular to the longitudinal direction of the barrel 180, as can be seen in this view of FIG. 30. The third locking surface 96, and the fourth locking surface 92, are shown substantially perpendicular to the longitudinal direction of the barrel 180, as well, as can be seen in this view of FIG. 30. As shown in this view, the third locking surface 96 directly faces the second locking surface 204, and the fourth locking surface 92 directly faces the first locking surface 214.

Latch Hooks Inserted

Some of the operational features of the lockbox will now be described, starting with an initial condition in which the system is in the "home position," with the latch pin members 66, 86 already inserted into the barrel 180. When the motor 140 drives the barrel to an unlock position such as depicted in FIG. 16 or 18, if there is not too much friction in play, the motor will be able to drive the barrel around and unlock. However, in a situation where a human user is pulling up on the shackle 50 while it is trying to release, then the internal metal barrel 180 could be held in place, because the pulling force can create so much friction between the latch surfaces 92 and 214 that the motor drive system may not be able to force the barrel to rotate. Instead, the motor 140 would rotate the lower sleeve 112, and that will wind the torsion spring 192. So when the lower sleeve 112 arrives at its unlock position, the movable indicator disk 150 arrives at the point where it indicates it should stop, the motor 140 deenergizes. However, the shackle would not unlock in that circumstance, because the extra friction caused by the user has prevented the barrel from rotating properly.

Note that, if the spring torque caused by the torsion springs was too high, then it will start to wind the motor 140 backwards, which would cause the effective tension on the spring 192 to be lessened, and effectively it would still not unlock. Therefore, the torsion springs 190, 192 should be selected so that their torque (or spring force) rating is less than the motor's 140 deenergized backdrive torque rating, to prevent the motor from being back-rotated when it has stopped at the shackle release position, for example.

Shackle Release Function

In the situation where the user is pulling up on the shackle 50 during a shackle release function, the motor 140 will drive the outside sleeve around, but the inside barrel 180 cannot move because it is held in place since there is too much friction at the interface between the shackle latch hook at 92 and the interior protrusion at 214 of the barrel. When the motor 140 deenergizes, it is now in a position, such that if the user slightly pushes the shackle 50 in, that will release the friction on the internal barrel 180, and it will quickly rotate and unlock due to the spring action.

One of the benefits of the present design is that, in the situation where a user is pulling on the shackle 50, the motor 140 can still drive the mechanism internally, so the motor and the bottom sleeve 112 can rotate to their unlock position, and because the torsion springs have been properly selected, the motor and bottom sleeve will remain in place. So now, if the user lets go of the shackle 50, the barrel 180 will quickly rotate around inside the sleeves, and the user can take the shackle out. In the older SentriLock products, when the motor tries to actuate a shackle release, if the user pulls up too hard on the shackle, while holding the lockbox, and trying to pull the lockbox down while the motor is actuating, the user can actually stall the motor out, since the mechanism can't move the latch out of the way because there is too much friction. The user would have to redo the whole shackle release cycle again.

Key Bin Release Function

In the situation where the user is pulling down on the key bin 40 during a key bin release function, the motor 140 will drive the outside sleeve around, but the inside barrel 180 cannot move because it is held in place since there is too much friction at the interface between the key bin latch hook at 96 and the interior protrusion at 204 of the barrel. When the motor 140 deenergizes, it is now in a position, such that if the user slightly pushes the key bin 40 in, that will release the friction on the internal barrel 180, and it will quickly rotate and unlock due to the spring action.

One of the benefits of the present design is that, in the situation where a user is pulling on the key bin 40, the motor 140 can still drive the mechanism internally, so the motor and the bottom sleeve 112 can rotate to their unlock position, and because the torsion springs have been properly selected, the motor and bottom sleeve will remain in place. So now, if the user lets go of the key bin 40, the barrel 180 will quickly rotate around inside the sleeves, and the user can take the key bin out.

Improved Lock Security

The rotary barrel interior protrusions 200, 210 prevent the counterrotation of either the shackle latch pin 66 or the key bin latch pin 86 when both are inserted into the rotary barrel. The way the barrel and internal protrusions are aligned and their shapes, accomplishes this, because when both latches 66, 86 are engaged, the narrow portions 84 and 98 are engaged with the inner protrusions 200 and 210. Also, the oblique surfaces 90 and 94 of the two latch pins 66 and 86 are nearly touching each other, and one latch pin cannot be rotated while the other latch pin is still in place. All of these conditions/restrictions are designed to prevent rotation of the barrel. Simultaneously, the latch portions 92 and 96 are "hooked" onto the corresponding latch portions of the inner protrusions 204 and 214, which means the pins cannot be pulled out, either. The combination of both latching methodologies prevents a person from cutting the shackle off on the new product, and then twisting the key bin latch open.

Improved Energy Efficiency

In this new design, there are two spring systems inside the plastic sleeve (i.e., sleeves 112 and 116). If there is no tension on the shackle 50 or key bin 40 while the entire barrel subassembly 110 is rotated, the system is not fighting the spring forces. The two torsion springs 190 and 192, one for the key bin 40, one for the shackle 50, provide counterforce to each other so the entire barrel subassembly 110 nominally is in neutral. If the drive gear 144 is rotated there is nothing stopping the internal barrel 180 from rotating, or otherwise slowing it down. The only thing the motor 140 is trying to overcome is friction at this point; it is not trying to overcome the inherent spring force that was created in the earlier SentriLock products that pushed the locking latches back out. In the earlier SentriLock lockboxes, virtually all the motor energy was used for unlatching the product, versus trying to just push a spring around as in this new design, disclosed herein. Therefore, the new design uses less energy.

In this particular design, with its internal latching protrusions 200 and 210, when the metal barrel 180 rotates, the motor 140 is turning the whole barrel subassembly 110, and the only thing it must overcome is the friction of its internal protrusions 200 and 210 riding on the horizontal surfaces of the various latch pins 66, 86 that are holding the key bin 40 and the shackle 50 in place, and the friction between the housing and the top and bottom sleeves 112 and 116, and the barrel 180.

Figure 34:
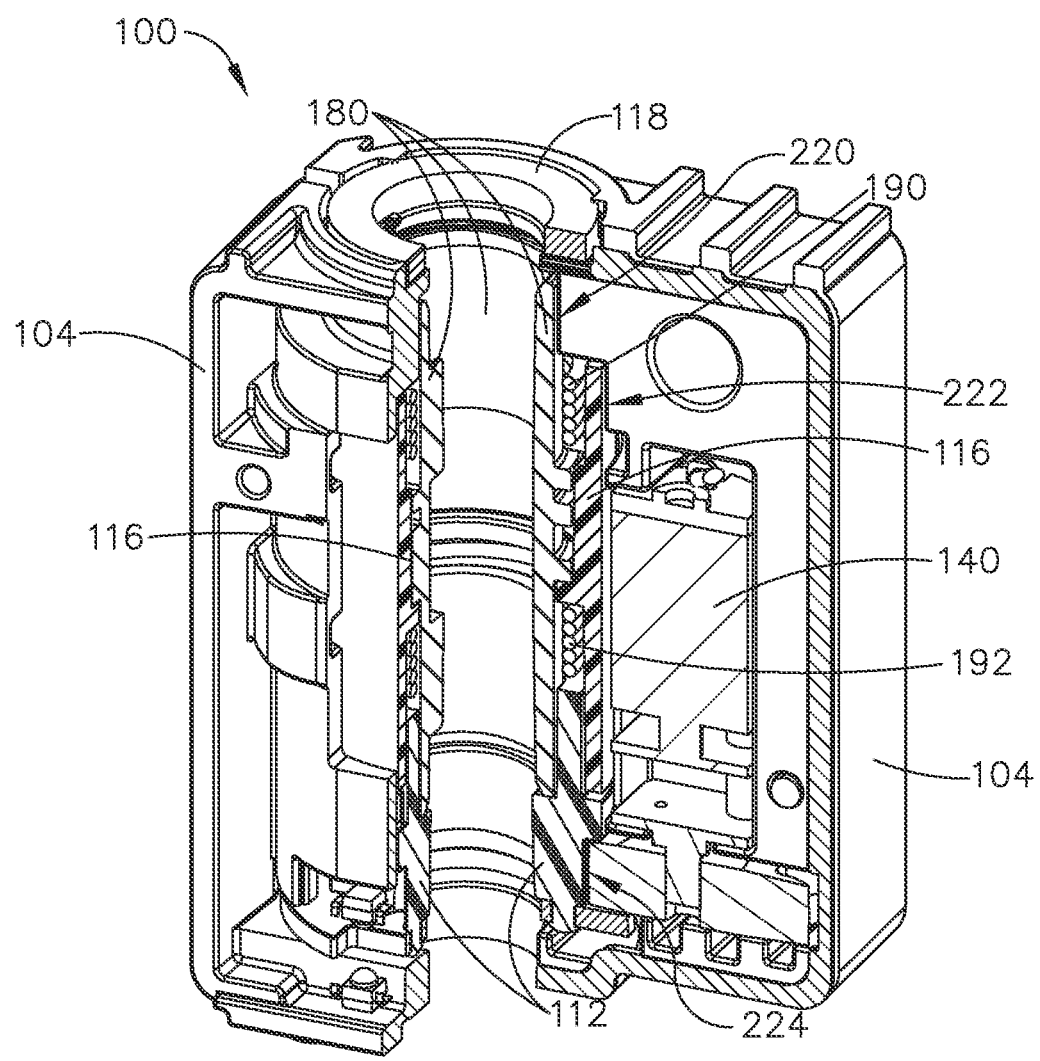
FIG. 34 is a front perspective one-quarter cutaway view of the internal housing subassembly of the lockbox of FIG. 1.

As seen in FIG. 34, the barrel 180 has a friction fit with an internal surface of the housing at the location 220; the upper sleeve has a friction fit with an internal surface of the housing at the location 222, and the lower sleeve has a friction fit with an internal surface of the housing at the location 224. These friction fits are not particularly "tight" fits, but are designed to support the substantially vertical orientation (in this view) of the barrel 180 within the housing structure, while allowing the rotatable components (i.e., barrel 180, top sleeve 116, and bottom sleeve 112) to rotate without substantial static friction. As noted above, while some friction is unavoidable, the lockbox design disclosed herein uses less energy for releasing (unlocking) the shackle and key bin than previous lockbox designs, because there are no "latch springs" that must be either fully "stretched" or fully compressed to perform such unlocking (or locking) functions.

It should be noted that the two torsion springs 190, 192 appear to be "opposing springs," but not directly to each other. They are merely wound in opposing directions; winding one will tend to unwind the other, and vice versa. The lower torsion spring 192 "connects" between the lower sleeve 112 and the upper sleeve 116. The upper torsion spring 190 "connects" between the upper sleeve 116 and the interior barrel 180. There is little backlash on these springs during rotation that might otherwise inhibit the motor's performance.

With this configuration, the internal barrel 180 is essentially held in place inside another tube (the sleeves 112, 116) by the torsion springs 190, 192. However, when one of the latch members 66 or 86 is inserted from the outside, the barrel 180 can rotate temporarily, and then snap back into position. But when the barrel subassembly 110 is driven from the motor side, the entire assembly becomes involved in the rotational movement. Unless there is something stopping the internal barrel 180 from moving, the torsion springs 190, 192 are imparting their force to the internal barrel in tandem with the sleeves 112 and 116, so that everything moves in tandem (i.e., barrel and sleeve). So, the motor 140 is using the spring 116 to push the inner barrel 180, but it is not overcoming spring force, but is only overcoming friction. The purpose is to reduce power consumption, because now in the mechanical actuation cycles, the unit does not need to move and compress any spring every cycle. This saves significant power because the new design does not waste energy merely compressing a spring, just to have it spring back out again.

Balanced Spring Forces

The torsion springs 190, 192 are pre-wound (tensioned) to a certain point so there is a relatively high centering force. So, if both springs 190, 192 are completely relaxed, there is no significant un-centering force. Pre-wound springs not only provide a high centering force, but this design also provides a dead band for some positional tolerance. In the neutral position, the tolerance is anywhere from ±20-30 degrees, but the dead band tolerance is about ±3 degrees, which provides a high centering force. The force characteristic versus rotational position creates a "deep notch" force vs. position curve that provides the dead band tolerance, and this allows the motor to begin rotating in a manner that impels the entire barrel subassembly to rotate, without the motor being required to "overpower" either torsion spring by forcing it to be wound (or stretched). Instead the "opposing spring" design causes the two springs 190, 192 (working in either rotational direction) to push the barrel 180 around, without significantly winding the springs in either direction, but instead uses spring force to push (rotate) the interior barrel. Since the centering force rises so quickly, that initial rotational effort needed by the motor 140 is very minimal.

With the torsion springs 190, 192 pre-loaded, any motor rotation causes these springs to move quickly up the force curve, and by imparting virtually all the motor energy into the barrel, the spring acts almost like a clutch. If the internal barrel 180 is immobilized, that spring force is raised, while winding that particular spring around. The spring is trying to push that force into the barrel, but the barrel cannot move. However, as soon as the immobilizing friction is relieved, the barrel will quickly rotate.

The operational tolerance for the angular positioning is about ±10 degrees for both unlocking positions, and for the neutral lock (or "arming") position. This allows the motor 140 to move between any two allowable positions very quickly, usually in less than one second.

The housing for lockbox 10 has been optimized for strength, while also maintaining a relatively lightweight structure. Part of this strength vs. weight optimization is due to its overall shape as a rounded cannister. This can be viewed in FIGS. 36-42, and in particular the elevational view from the bottom depicted in FIG. 42.

Figure 36:
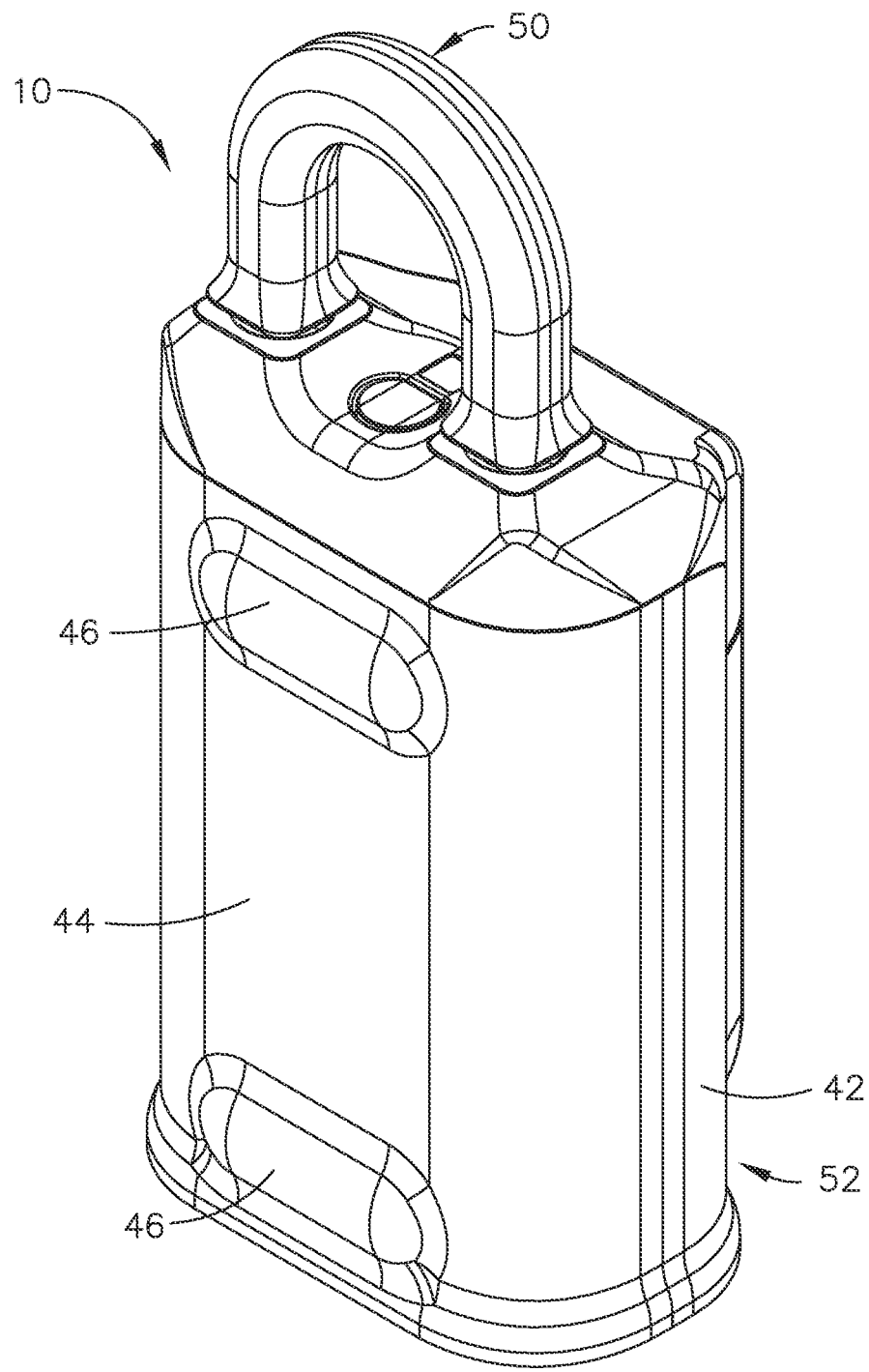
FIG. 36 is a rear perspective view of the lockbox of FIG. 1.

As shown in FIG. 36, the outer housing 52 is mainly constructed as a tubular extrusion, for greater strength. The keypad 58 is attached to a front portion 42 of the housing 52, while the rear portion 44 of the housing 52 is substantially planar. There are some minor protrusions at 46 in the rear housing for the purpose of acting as mounting pads against an exterior surface that the lockbox could be mounted near, such as a door or a wall.

Figure 37:
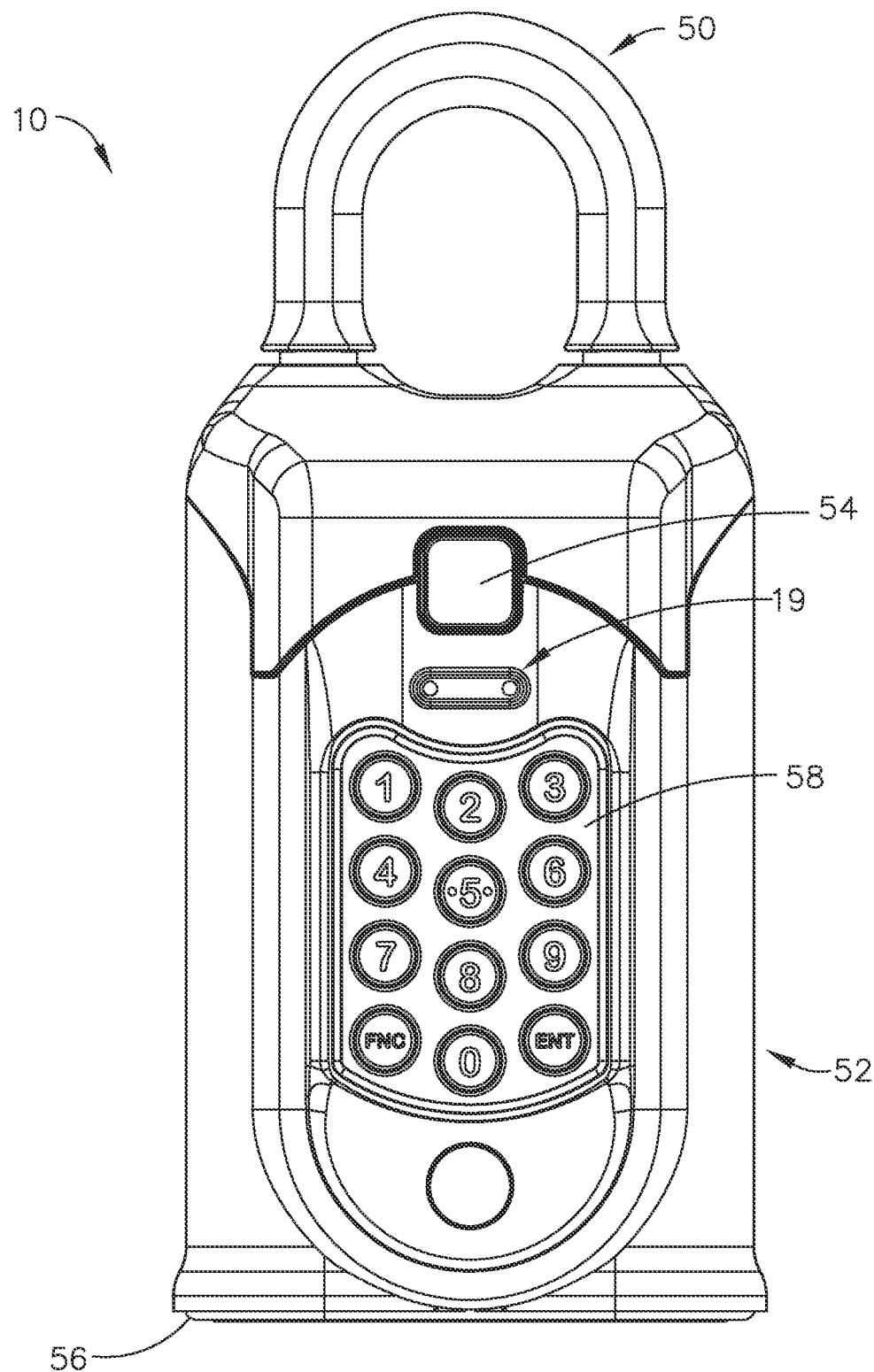
FIG. 37 is a front elevational view of the lockbox of FIG. 1.

FIG. 37 shows the keypad 58. Above the keypad 58, are indicator LED lamps 19, and above those lamps is an area at 54 for placing a label, or other indicia.

Figure 38:
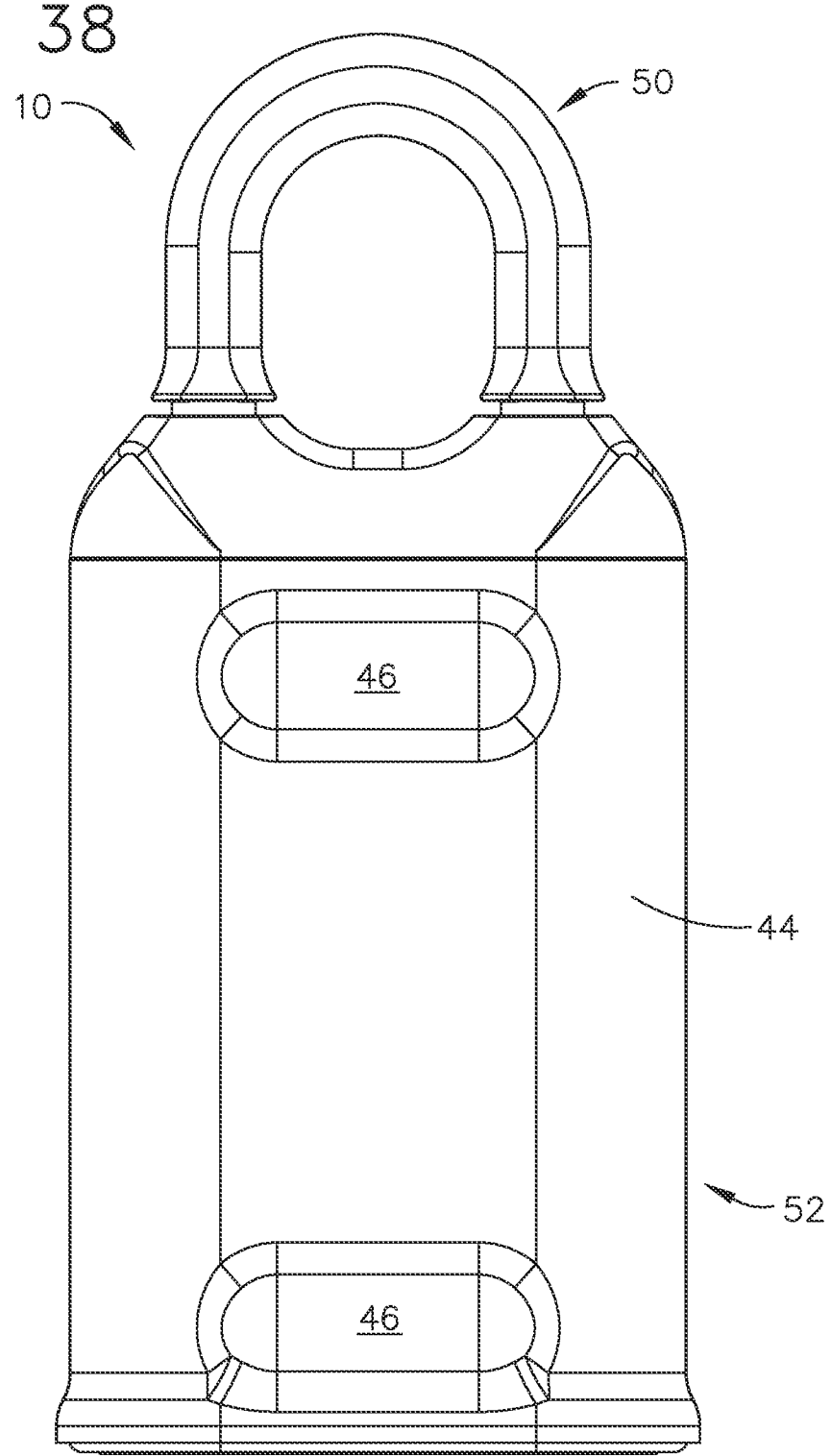
FIG. 38 is a rear elevational view of the lockbox of FIG. 1.
Figure 39:
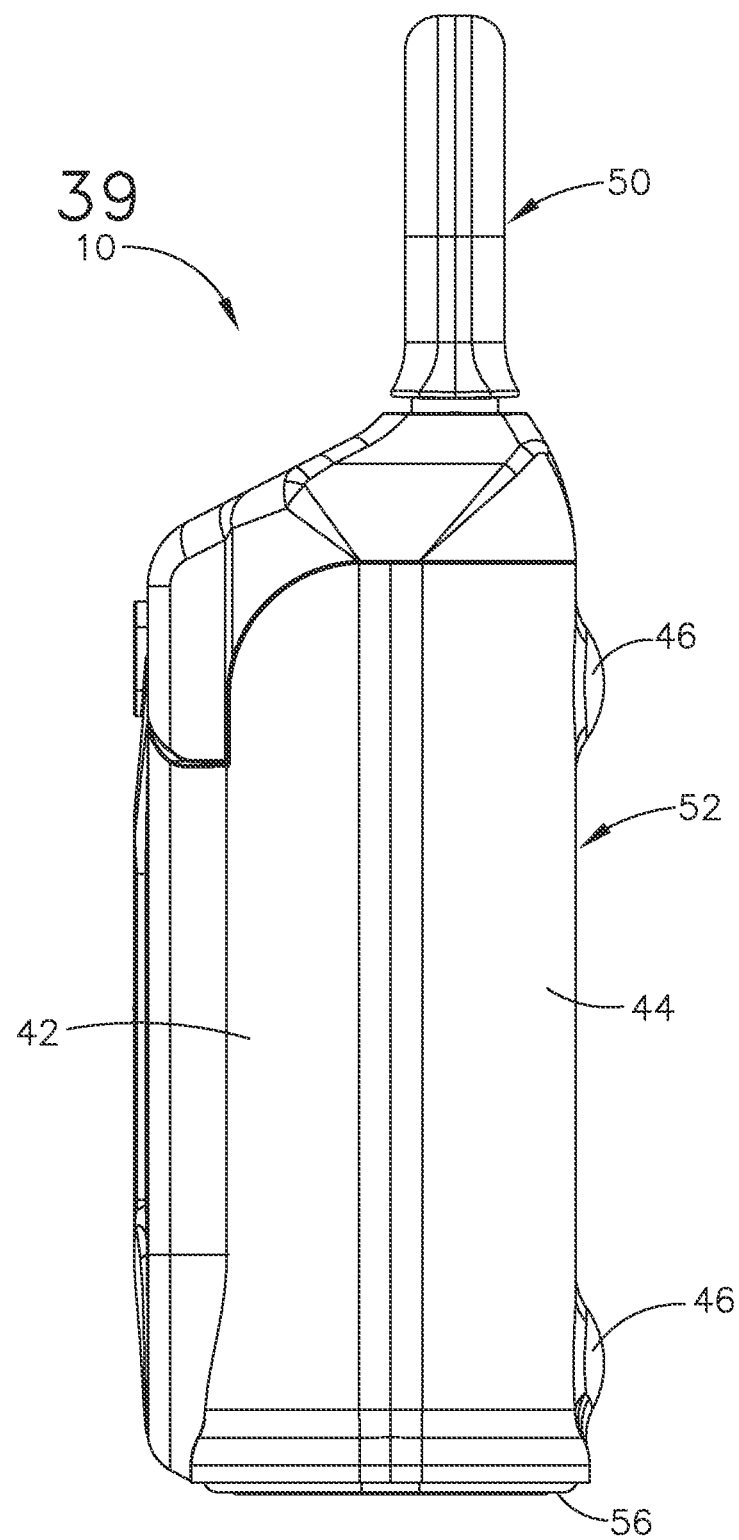
FIG. 39 is a right side elevational view of the lockbox of FIG. 1.
Figure 40:
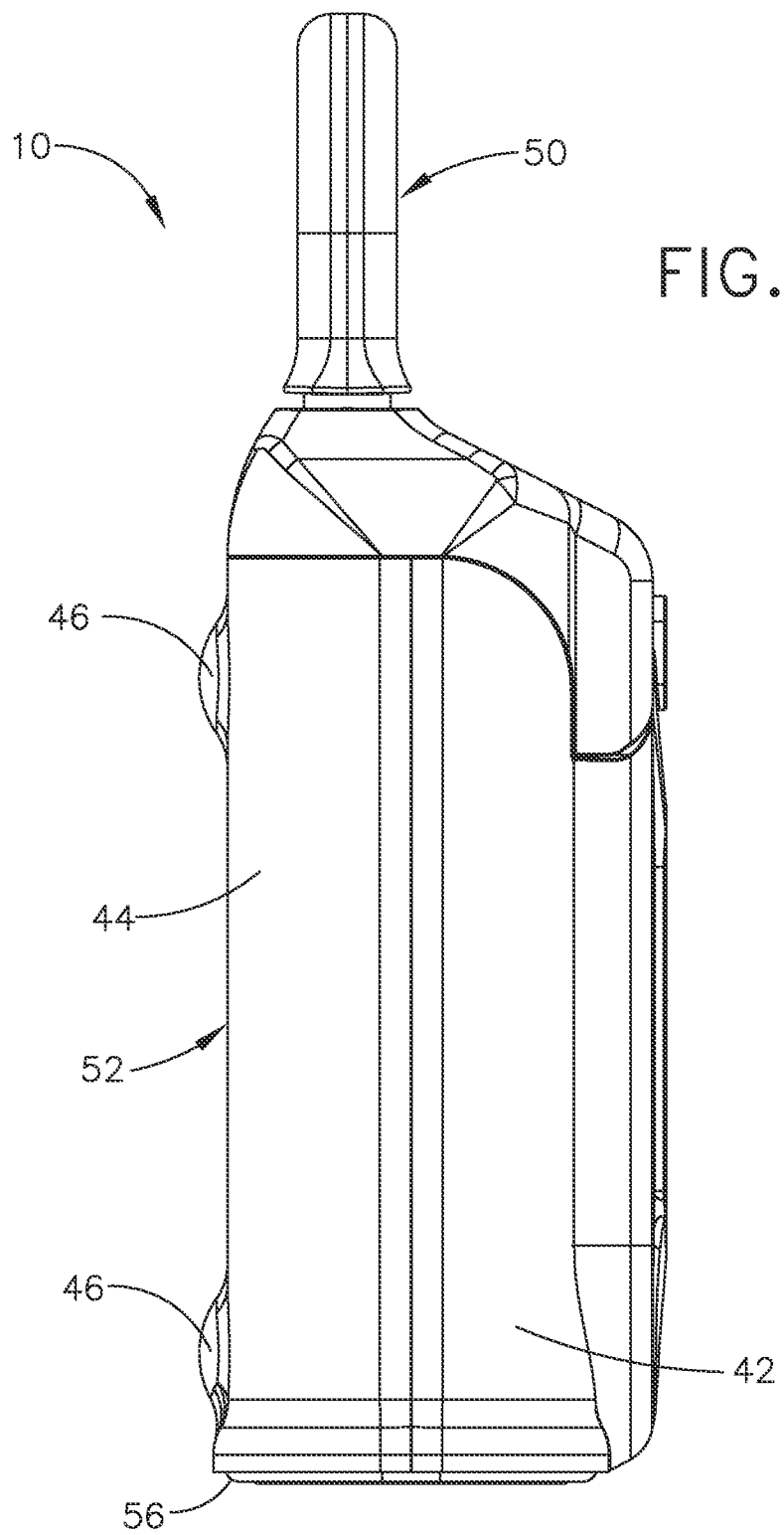
FIG. 40 is a left side elevational view of the lockbox of FIG. 1.
Figure 41:
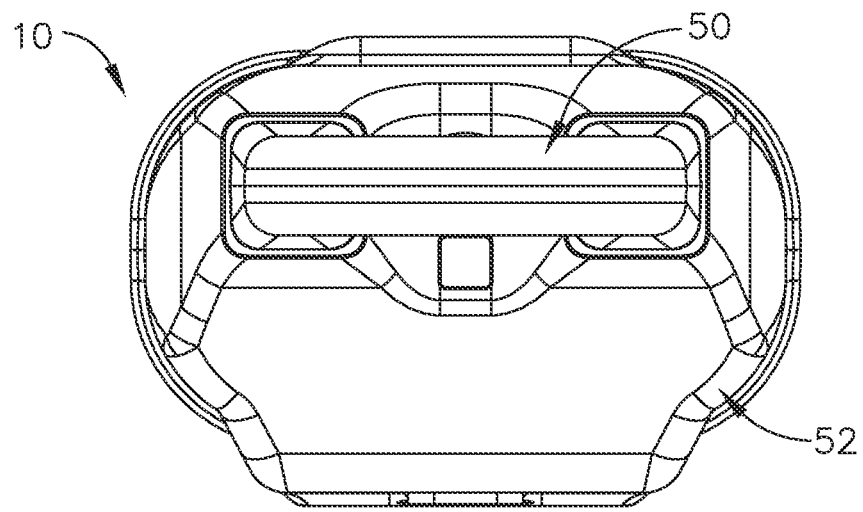
FIG. 41 is a top plan view of the lockbox of FIG. 1.
Figure 42:
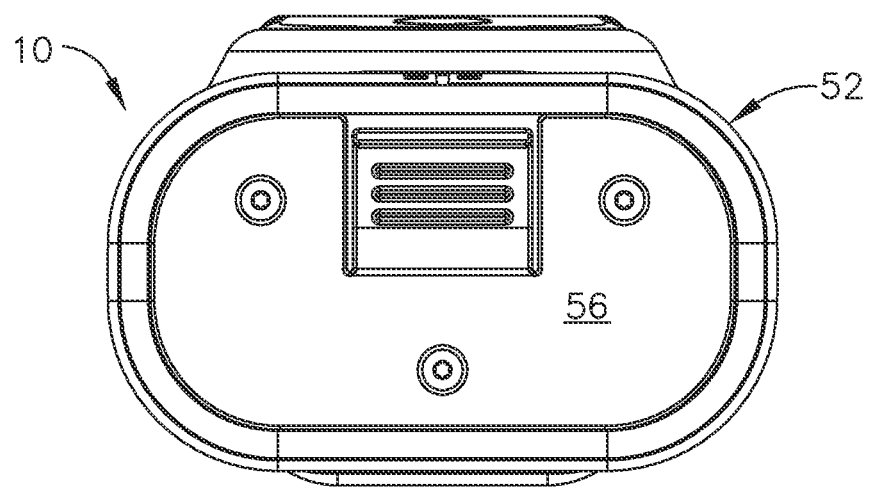
FIG. 42 is a bottom plan view of the lockbox of FIG. 1.

As shown in FIG. 38, the minor protrusions 46 are spaced apart on the rear portion 44 of the housing 52. The side views of FIGS. 39 and 40 illustrate the minor protrusions 46. FIGS. 41 and 42 show the lockbox in a top elevational view and a bottom elevational view, respectively.

The bottom view of FIG. 42 illustrates the bottom portion of the key bin, which will drop out the bottom of the lockbox housing when the key bin is commanded to be opened. The bottom rim, as seen by the arrow 52, is preferably reinforced so as to not provide a "weak point" for some person who may attempt to break into the lockbox. For example, the bottom rim could be rolled along its entire edge.

Second Embodiment

The lockbox 10 can be designed with its various internal components having somewhat different arrangements. For example, the torsion springs have end portions that fit into various slots in the sleeves or in the barrel. Those slots can either be "through-slots," such as slots 126 in sleeve 116 (see FIG. 10), or slots in protrusions that do not extend completely through a structure. For example, the internal protrusion (or tab) 134 has an internal slot 124 that does not extend completely through the sleeve 116. This internal slot 124 holds one end of the lower torsion spring 192.

Figure 43:
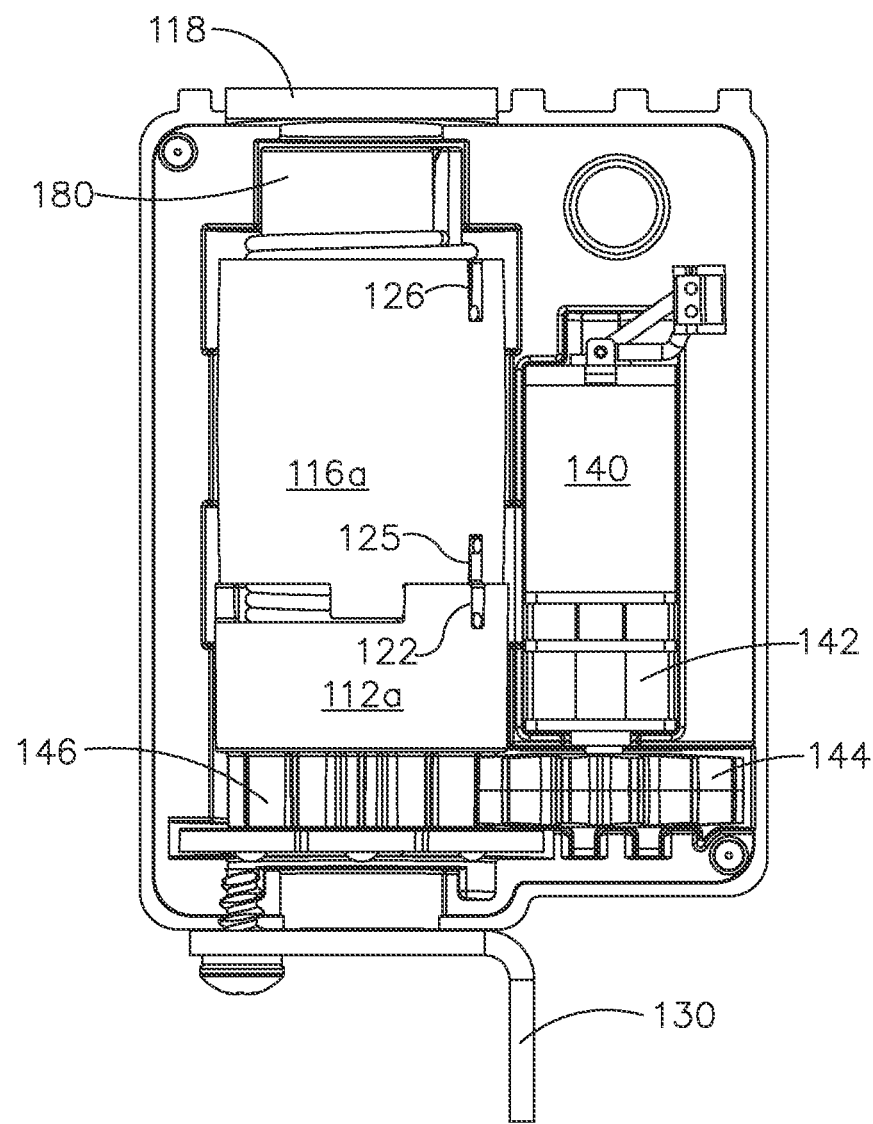
FIG. 43 is a front view of the internal housing subassembly used in an alternative embodiment lockbox.

However, a second embodiment of the locking subassembly could include a through-slot at that very location, if desired. FIG. 43 illustrates such a design arrangement. The torsion spring 192 has one end that fits into a slot 122 in an alternative bottom sleeve 112a, and its second end fits into a through-slot 125 in an alternative upper sleeve 116a. Other similar variations could be constructed, while still falling within the principles of this technology. For example, the location and size of the tabs on the rotatable sleeves can be altered, while still performing the same or similar functions; moreover, the sizes and overall shapes of the sleeves themselves could be altered. Similarly, the size and overall shape of the rotatable barrel 180 could be altered, while still performing the same or similar functions. The same is true for the torsion springs.

Alternative Embodiment

An alternative embodiment locking system could be used in a lockbox that includes a rotatable barrel as the major locking element. For example, the barrel subassembly 110 could be modified in a way that keeps the barrel's interior protrusions for latching with (and thus locking) the latch hooks on the shackle latch pin and on the key bin latch pin, but removes the exterior circumferential protrusions from the barrel, and removes the outer sleeves and the torsion springs. This alternative design still keeps the major security benefits of the strong metal barrel with its interior protrusions having sufficient mechanical strength to prevent a person from simply overpowering the latch, for example.

One feature that would be lost in this alternative embodiment would be the ability to re-insert the shackle or the key bin without any additional action by the human user. Without the torsion springs and outer sleeves, the barrel would not have an "armed" state that allows the shackle to be quickly inserted in a one-step procedure. Instead, the user would have to command the lock system in a two-step procedure: first, to move the barrel to the "shackle release" state, and while the barrel is in that position, the user would then need to re-insert the shackle. In a second step, the motor would need to move the barrel back to its "home" position so that the shackle now becomes locked in place. A similar set of commands would be needed to re-insert the key bin, also in a two-step procedure.

Figure 31:
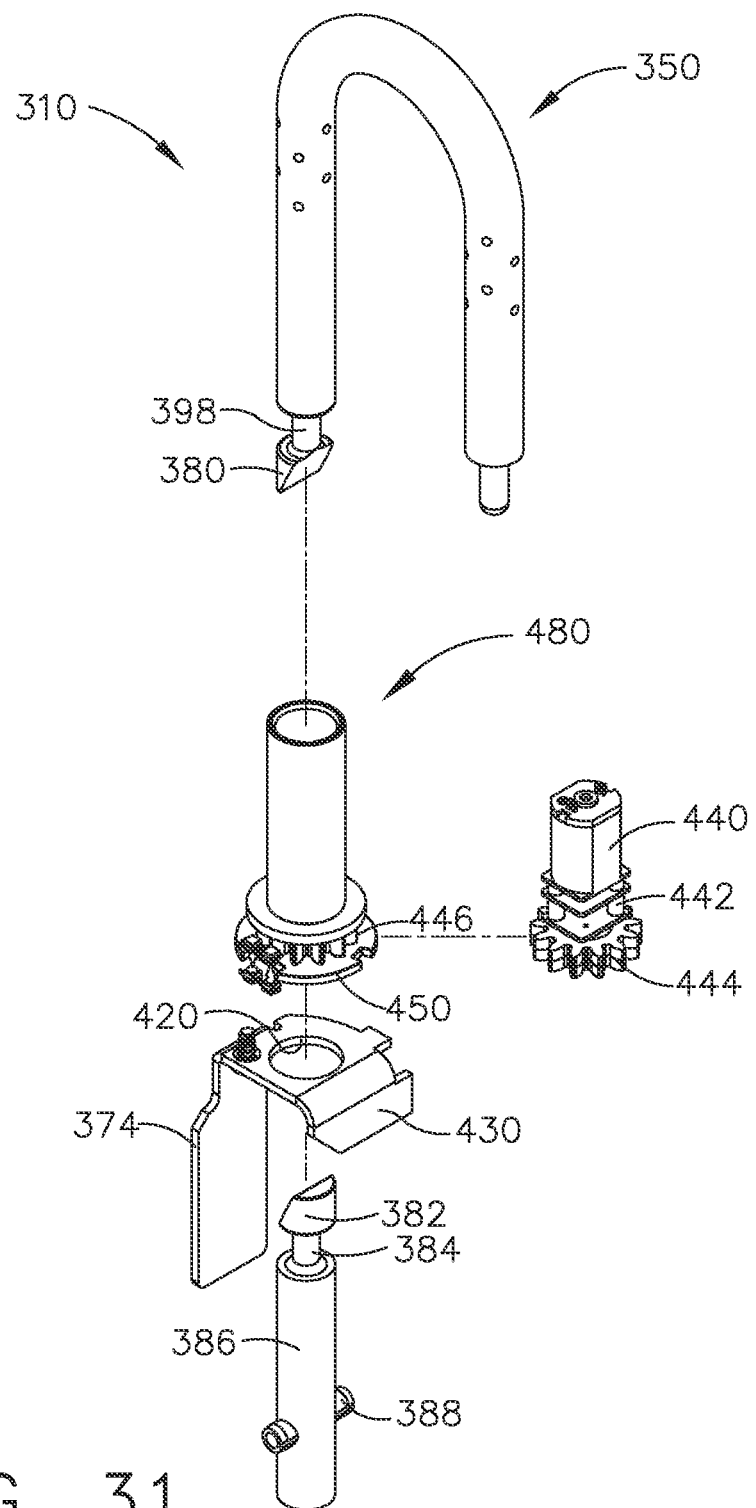
FIG. 31 is an exploded view of the barrel and mating latch pins, and other components, used in an alternative embodiment locking subassembly.

In FIG. 31, the alternate embodiment locking system, generally designated by the reference numeral 310 is illustrated, showing a cylindrically-shaped barrel 480, a motor 440, a shackle 350, and a key bin latch pin 386 in an exploded view. The shackle 350 has a narrow shaft extension 398 on one side that has a latch hook portion 380 on the end. This latch hook portion 380 latches onto an inner protrusion (not shown) inside the barrel 480 to "lock" the shackle in place. The key bin latch pin 386 has a narrow shaft extension 384 that has a latch hook portion 382 on the end. This latch hook portion 382 latches onto a different inner protrusion (not shown) inside the barrel 480. Note that the barrel 480 is sometimes referred to herein as a "movable actuator."

The key bin latch pin 386 has a latch pin fastener 388, that attaches the latch pin 386 to the key bin (not shown). A guide plate 374 helps the key bin (not shown) slide smoothly into the lockbox 310. Attached to the guide plate 374, is a bottom mounting bracket 430, which has a barrel bottom opening 420. The key bin latch pin 386 slides through the barrel bottom opening 420 when a user inserts the key bin into the lockbox 310 during a "locking" function.

The motor 440 is mounted to a motor mounting bracket 442, and a motor spur gear 444 is mounted beneath the mounting bracket. The motor spur gear 444 is engaged with a barrel spur gear 446. A barrel position disk (or "movable indicator") 450 is mounted underneath (in this view) the barrel spur gear 446. In operation, the motor 440 drives the motor spur gear 444, which then drives the barrel spur gear 446, which drives the barrel 480 during locking and unlocking functions. Another way of stating these functions is: a mechanical output of the motor 440 is in mechanical communication with the motor spur gear 444, and the motor spur gear is in mechanical communication with the barrel spur gear 446, for example; and the movable actuator 480 is mounted, for example, so as to rotate with the barrel spur gear 446. Additionally, the movable indicator 450 is also mounted, for example, so as to rotate with the barrel spur gear 446.

Other Special Features

The technology disclosed herein lends itself to some special features that will be described below in more detail. For example, in the first embodiment that has a movable barrel (shaped like a hollow cylinder), two outer sleeves, and two torsion springs, it is typically desired for the barrel to maintain a position that is substantially related to the position of the bottom sleeve, which is mechanically connected to the barrel spur gear that is controlled by the movements of the motor. In effect, if the motor 140 moves the barrel spur gear 146, which moves the bottom sleeve 112, it is desired for the barrel 180 itself to also move when that bottom sleeve moves.

One way of stating the above mechanical features is that the first and second torsion springs are pre-wound to a minimum tension that provides a torque sufficient to cause the barrel to move when the motor turns, by overcoming the static friction between the housing (102 or 104) and the top sleeve (at 222), the housing and the barrel (at 220), and the bottom sleeve 112 and the housing (at 224). See FIG. 34. In this manner, as the motor forces the lower sleeve 112 to rotate in either direction, at least one of the torsion springs (190 or 192) will induce a similar rotational movement in either (or both) the top sleeve 116 and the barrel 180. This will occur in both rotational directions, whether the barrel is to be moved to its "home" position or to one of its unlocking positions.

Another special feature involving the first embodiment that has at least one torsion spring, at least one latch pin, and a motor. When the barrel is moved by inserting (or re-inserting) one of the latch pins (e.g., the shackle or the key bin latch pin), the movable barrel has a latching member (e.g., an interior protrusion) that will retain the latch pin after the latch pin has been fully re-inserted. While this occurs, it is desired that the motor (as a prime mover) and the bottom sleeve not be moved while the barrel is being rotated by the latch pin re-insertion procedure. One way of describing this is as follows: during insertion of a latch pin (66 or 86) into the barrel 180, the torque imparted on the first (barrel) spur gear 146 by the torsion spring (190 or 192), at the maximum rotation angle of the barrel, is sufficient to force the barrel to be returned to its neutral position after the latch pin has been fully inserted into the barrel, and this maximum torque imparted by the torsion spring is less than or equal to the back drive torque limit of the motor 140.

Yet another special feature of the first embodiment that includes a movable barrel and two separate latch pins is that the latch pins maintain a close proximity to one another after they have both been completely inserted into the barrel, and the latch pin physical shapes prevent certain types of movements. More specifically, when the first and second latch pins are inserted into the barrel, and the barrel is rotated such that both latch pins are not removable (i.e., the barrel is in its home position and the latch pins are locked), due to being latched with the interior protrusions inside the barrel, then the sloped distal latch pin ends (i.e., the first and second oblique surfaces) are retained in sufficiently close proximity such that the latch pins cannot be independently sufficiently rotated to slide past the interior protrusions of the barrel. In other words, if a person would cut the shackle off, the latching portion of the shackle that remained in the barrel would still prevent the key bin latch pin from being rotated. Another way of stating this principle is the following: the first latch hook (80 or 82) at the distal end of a first latch pin (66 or 86) includes a first oblique surface (90 or 94), and a second latch hook (82 or 80) at the distal end of a second latch pin (86 or 66) includes a second oblique surface (94 or 90). When both latch pins are inserted into a movable actuator (e.g., the barrel 180), the actuator 180 is rotated such that both of the latch pins are not removable, due to being latched with at least one interior protrusion (200 or 210) inside the actuator, and the oblique surfaces (90 or 94) are retained in sufficiently close proximity (see FIG. 30) that the latch pins cannot be independently sufficiently rotated to slide past the interior protrusion inside the actuator.

Still another special feature is for a lockbox to have the barrel-shaped (or cylindrical-shaped) latching member that is movable (e.g., rotatable barrel 180), and has a top sleeve 116 and a bottom sleeve 112, and two torsion springs (190 and 192), in which during normal operating conditions the torsion springs collectively exert a high angular centering force on the top sleeve and on the barrel, ensuring that the barrel maintains a predetermined position relative to the bottom sleeve. It should be noted that the "during normal operating conditions" refers to a situation where a person is not pulling up on the shackle 50, because that action would tend to hold the barrel in a fixed position and would not allow the barrel to rotate, even if the motor was rotating the bottom sleeve of the latching subassembly. Of course, once the person releases the shackle, then the barrel, because of the torsion springs, will quickly move to the proper centered position with respect to where the bottom sleeve is currently situated, due to this high angular centering force. The torsion springs are placed under tension to a predetermined torque, and they are tensioned in opposite directions.

A further special feature of the lockbox is that the rotatable barrel, the bottom sleeve, the top sleeve, and the two torsion springs are mechanically coupled in such a way that, when a human user initiates an unlocking operation, the motor only has to overcome the inherent friction of moving the bottom sleeve, because the pre-wound tension of the torsion springs (190 and 192) will force the barrel 180 to move as the motor 140 moves the bottom sleeve 112 (thus unlocking either the shackle or the key bin). The combination and configuration of the barrel and the top and bottom sleeves, all being mechanically coupled through the torsion springs, increases the energy efficiency of the latching mechanism, because the motor only needs to overcome the friction (at 220) between the housing (102 and 104) and the barrel 180, and the friction (at 222 and 224) between the two sleeves (112 and 116) and the housing (102 and 104); therefore, the motor does not have to overcome the spring force exerted by the torsion springs during a latch release operation. The torsion springs are placed under tension to a predetermined torque, and they are tensioned in opposite directions.

Yet a further special feature of the lockbox occurs when, during an unlatching operation, a human user may become impatient and start to tug on the shackle 50 or the key bin However, this impatience does not affect the entire mechanical operation of the electronic lockbox. If the barrel 180 is immobilized during an unlatching operation, due to an external tension being applied by one or both of the latching pins (i.e., the shackle or the key bin), the motor 140 can still rotate the top and/or bottom sleeves (112 and 114) and impart the resultant torque into the corresponding torsion spring (190 or 192), thereby allowing the latching apparatus (inside barrel 180) to automatically unlatch once the external tension is removed. In effect, while the external tension is being applied, one of the torsion springs becomes wound by the angular distance that the motor turns the barrel spur gear 146 to reach the unlock position from the home position. Then after the external tension is released, that wound torsion spring quickly forces the barrel 180 to rotate to the proper unlatch position.

Still a further special feature of the lockbox is that when both the shackle and the key bin are inserted, the lockbox exhibits an enhanced security profile. The oblique portions (90 and 94) of the shackle and key bin latch pins are positioned inside the barrel 180 in such a way that a human user cannot forcibly remove the distal portion of either latch pin, and then also remove the other latch pin, through rotation. In other words, even if the (distal) shackle extension (above 66) is sawed off or otherwise broken off, the remaining proximal portion of that shackle (toward 80) will still remain in the barrel, and that proximal portion (with its oblique profile at 90) cannot force the key bin latch pin 86 to rotate, and thus be removed. The orientation of the first and second latch pins (66 and 86—i.e., for the shackle and the key bin) are in opposition to each other when inserted into the barrel, such that both the first and second latch pins create an improved security profile when the barrel is at its home (locked) position. More specifically, when the barrel is at its home position, the first and second oblique surfaces (90 and 94) of the two latch pins (66 and 86) face each other in sufficiently close proximity inside the barrel (see FIG. 30) that a human user cannot rotate either latch pin such that either pin can be removed, thereby creating an improved security profile.

Another special feature of the lockbox is that the barrel's interior latching protrusions are used to force the barrel to rotate when one of the latch pins is inserted. (See FIGS. 30 and 35.) A portion of the barrel's interior protrusions (200 and 210) exhibits a helical surface geometry (at 202 and 212), so when a latch pin (66 or 86) engages a barrel protrusion, the latch pin slides along the helical surface, which forces the barrel 180 to rotate as the latch pin continues to be inserted. Once the latch pin reaches the end of the protrusion, it mechanically clears the final portion of the helical surface of the barrel protrusion, and "latches" into place (beneath one of the "horizontal" latch surfaces 204 or 214), at which time the barrel quickly rotates back to its neutral position, because of the torsion springs (190 and 192).

Yet another special feature of the lockbox is that the barrel's interior protrusions are wide enough such that if a first latch pin is already in a "locked" position with respect to the barrel, then the act of inserting a second latch pin will not "unlock" the first latch pin. (See FIG. In other words, the interior protrusions (200 and 210) are wide enough so that the first latch pin to be inserted does not unlatch itself as the second latch pin rotates the barrel during its insertion. Stating this another way, a first latch hook (80 or 82) at the distal end of the first latch pin (66 or 86) is sized and shaped to mechanically interface with the first interior protrusion (200 or 210); and a second latch hook (82 or 80) at the distal end of the second latch pin (86 or 66) is sized and shaped to mechanically interface with the second interior protrusion (210 or 200). If the "first" latch hook is part of the shackle 50, then that first latch hook is item 80 on the drawings, and the "first" interior protrusion of the barrel is item 210 on the drawings. If the "second" latch hook is part of the key bin latch pin 86, then that second latch hook is item 82 on the drawings, and the "second" interior protrusion of the barrel is item 200 on the drawings.

Still another special feature of the lockbox is that it includes a motor as the prime mover, and that motor has a mechanical output that is in mechanical communication with a motor spur gear. The motor spur gear is in mechanical communication with a barrel spur gear. The lockbox also includes a movable actuator that comprises a cylindrically-shaped barrel, which is mounted so as to nominally rotate with the barrel spur gear. The entire movable actuator subassembly 110 is designed so that, when the prime mover (motor 140) rotates, then the motor spur gear 144 also rotates to change a rotational position of the movable indicator (e.g., the barrel position disk 150), and nominally changes a rotational position of the movable actuator (e.g., the barrel 180). The word "nominally" is used in the previous sentence to indicate that this feature occurs under nominal conditions, i.e., conditions that are not abnormal. If, for example, a person pulls up hard on the shackle 50 at the same time as the motor 140 is attempting to release that shackle—i.e., the very definition of a non-nominal condition—then the barrel may not be able to change its rotational position at all: at least, not until that person gets tired of pulling on the shackle. On the other hand, if the conditions are nominal, then the various mechanical components of the movable actuator subassembly 110 will allow the motor's rotation to "force" the barrel to rotate, even though the barrel spur gear 146 does not directly contact the barrel 180.

A further special feature of the lockbox is the mechanical construction of the movable actuator subassembly 110, which includes a two-piece outer sleeve, including a bottom sleeve 112 and a top sleeve 116, a first torsion spring 190 and a second torsion spring 192, and a cylindrically-shaped barrel 180, which is the actuator. The bottom sleeve is mounted so as to rotate with a barrel spur gear 146, which is controlled by a prime mover, e.g., an electric motor 140. The motor is controlled by the electronic control circuit, and when desired, is energized by the motor driver circuit 25; and if the motor rotates, then the motor spur gear 144 also rotates to change a rotational position of the bottom sleeve 112 and the movable indicator 150. The bottom sleeve 112, if moving in a first rotational direction of movement, contacts the top sleeve 116 and forces the top sleeve to also rotate in the first rotational direction; the bottom sleeve, if moving in a second rotational direction of movement, winds the first torsion spring 192, which forces the top sleeve 116 to also rotate in the second rotational direction; the top sleeve, if moving in the first rotational direction of movement, winds the second torsion spring 190, which forces the barrel 180 to also rotate in the first rotational direction; and the top sleeve 116, if moving in the second rotational direction of movement, contacts the barrel 180 and forces the barrel to also rotate in the second rotational direction.

Yet a further special feature of the lockbox is its movable actuator. This actuator has the general shape of a hollow cylinder (e.g., barrel 180) with at least two open ends, in which the hollow cylinder has a centerline in a longitudinal direction. This hollow cylinder includes at least one interior protrusion, e.g., protrusion 200 or 210. In a configuration with two such interior protrusions, a first of these interior protrusions 200 includes a first locking surface 204 that is substantially perpendicular to the longitudinal direction of the hollow cylinder, and a second of these interior protrusions 210 includes a second locking surface 214 that is substantially perpendicular to the longitudinal direction of the hollow cylinder. Furthermore, the first these interior protrusions 200 also includes a first oblique surface 202, and the second of these interior protrusions 210 also includes a second oblique surface 212, in which the first oblique surface comprises a curved surface; and the second oblique surface comprises a curved surface. As described above in detail, these locking surfaces 204 and 214 are used to lock or "latch" the shackle and key bin into the lockbox, and to hold those potentially movable parts in that locked (or latched) position until those parts are properly released by an authorized user's commands to the lockbox electronic controller. Moreover, the oblique surfaces 202 and 212 are designed to allow the shackle and key bin to be inserted into the lockbox by manual action of a human user and, as the particular latch pin is pressed against the corresponding oblique surface, the barrel 180 is forced to rotate to a sufficient degree that the latch hook portion (e.g., the latch hook 80 or 82) will travel all the way past one of those oblique features (202 or 212) so that the perpendicular locking surface (e.g., 204 or 214) will come into contact with a flat surface of the latch hook (80 or 82), as soon as the barrel springs back into its home position. Finally, if the barrel 180 is made of a strong metal, then it becomes literally impossible for a human being to manually pull the shackle out of the lockbox. Even if additional "burglar tools" would be used on the shackle, by the time the barrel would be forced to break, the would-be thief or vandal probably could have more easily broken down the entire door (or other building entrance).

Flow Charts for Motor Control

Figure 32:
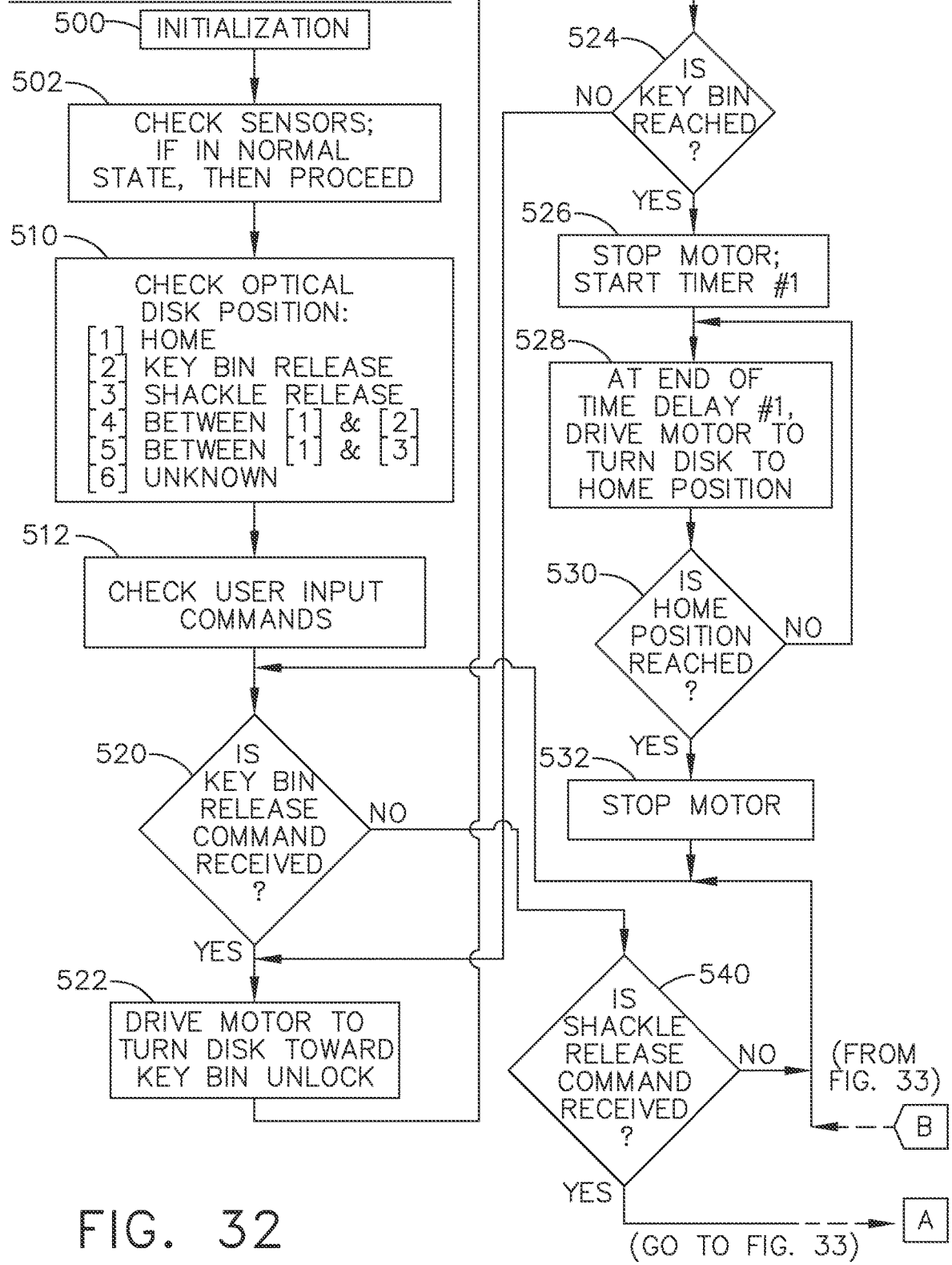
FIGS. 32 and 33 present a flow chart of the some of the important steps performed by the lockbox system controller to command the motor to move the locking subassembly to various positions, such as the "home" position, the shackle release position, or the key bin unlock position.
Figure 33:
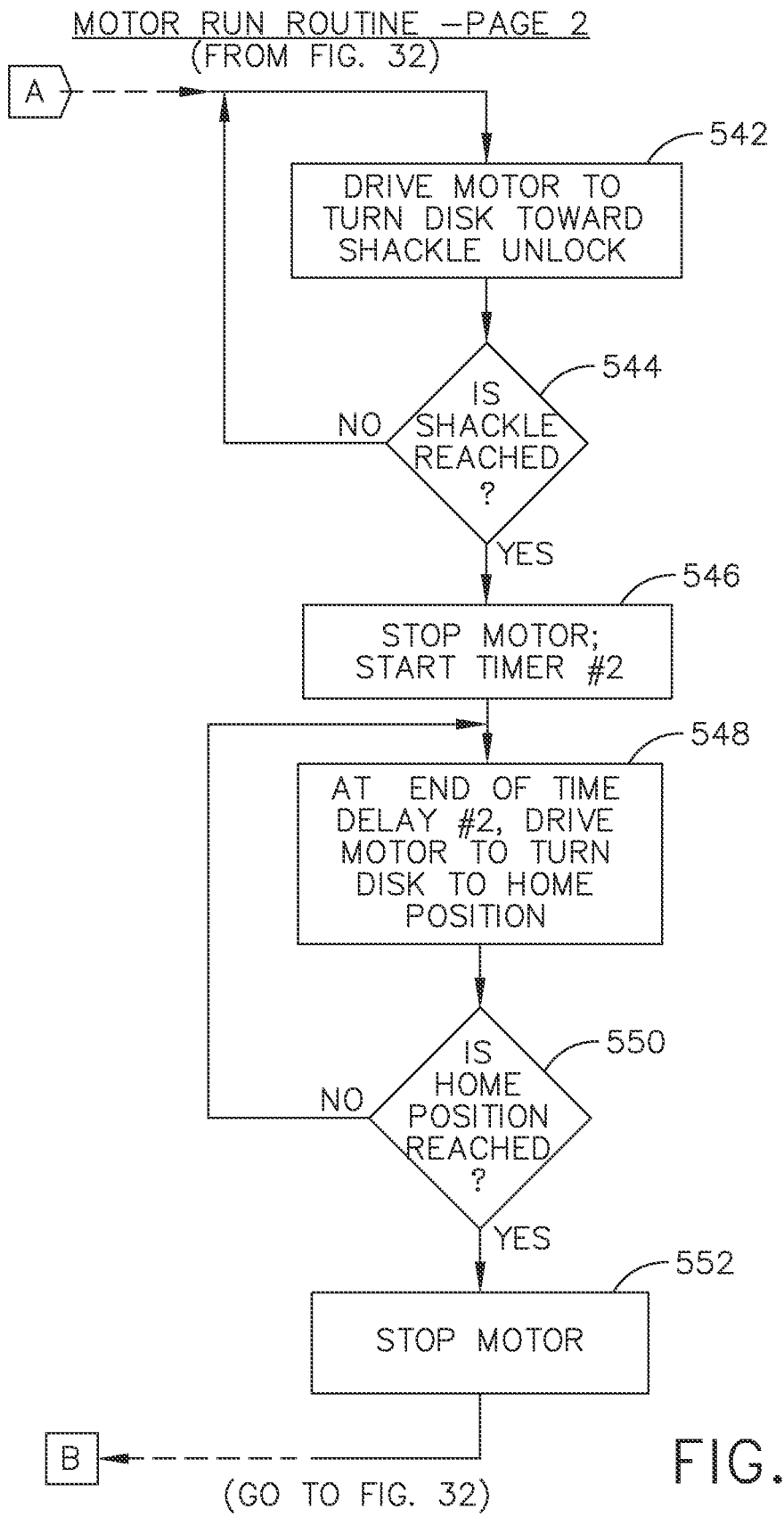

Referring now to FIGS. 32 and 33, a set of flow charts are provided that show some of the important logical steps performed by the computer processing circuits of the lockbox when using the motor 140 to release the shackle 50 or the key bin 40. After an initialization step 500, a "Motor Run Routine" begins with a "check sensors" 502 step, and if the sensors of the lockbox are in a normal state, then the logic flow proceeds. Some of the sensors to be checked are, for example, the digital temperature sensor 11, the impact sensor 29, and the key bin open/close sensor 37.

The next logic step is a "check movable indicator disk position," also referred to herein as a "check optical disk position" step 510, in which several possible positions of the movable indicator disk 150 are checked, such as, for example: (1) home; (2) key bin release; (3) shackle release; (4) between positions (1) & (2); (5) between positions (1) & (3); and (6) unknown. Once the CPU 16 "finds" the current state of barrel position disk 150, the logic flow continues.

Assuming the position disk 150 is presently at a known position, the logic flow now moves to step 512 that checks for any user input commands. The user may input commands directly onto the keypad 14, or remotely by using a smart device using Bluetooth or NFC communication protocols, for example. Next, the logic flow is directed to a decision step 520 that determines whether a key bin release command has been received. If not, the logic flow is directed to another decision step 540 that determines whether a shackle release command has been received. If that command has also not been received, then the logic flow is directed back to step 512, which again checks for user input commands.

At decision step 520, if the key bin release command has been received, then the logic flow is directed to step 522, and the motor is commanded to turn the disk toward the key bin unlock position. (Note that this action also rotates the motor spur gear 144.) Once that occurs, a decision step 524 determines if the key bin unlock position has been reached. If not, the logic flow is directed back to step 522 and continues to drive the motor towards the key bin unlock position. Once that key bin unlock position is reached, the logic flow at step 524 is directed to a step 526 that stops the motor and starts a timer #1. This timer creates a timer delay before automatically commanding the motor to rotate back to the "home" position. The time delay period can be set to a value in the range of 5-6 seconds, for example. This allows an authorized user to access the key bin within the time #1 interval.

A step 528 commands the motor to turn the disk toward the home position, at the end of the time delay #1. A decision step 530 determines if the home position has been reached. If not, the logic flow is directed back to step 528, to continue running the motor. Once decision step 530 determines that the home position has been reached, the flow continues to a step 532 and the motor stops. The logic flow then loops back to step 512, checking for further user input commands.

Assuming a user inputs a shackle release command, the logic flow first arrives at decision step 520, and then the logic flow next arrives at decision step 540. Since a shackle release command was input, the logic flow is directed to a box "A" which continues to a step 542 on FIG. 33.

Referring now to FIG. 33, the logic flow arrives at step 542 which drives the motor to turn the position disk 150 toward the shackle unlock position. A decision step 544 determines whether or not the shackle unlock position has been reached. If not, the logic flow is directed back to step 542. However, if the shackle unlock position has been reached, then the logic flow continues to a step 546. At step 546, the motor is stopped and a timer #2 is started. This timer creates a time delay, similar to timer #1 as mentioned above, before automatically commanding the motor to rotate back to the "home" position. The time delay period can be set to a value in the range of about 4-5 seconds, for example. This allows an authorized user to remove the shackle within the timer #2 delay interval.

The logic flow continues to a step 548 which commands the motor to rotate the disk toward the home position, once the time delay #2 has elapsed. Next, a decision step 550 determines if the home position has been reached. If not, step 548 is repeated. If so, then the logic flow is directed to a step 552 and the motor is stopped. The logic flow now reaches a box "B," which loops back to step 512 on FIG. 32, and checks for new user input commands.

If the position of the barrel position disk 150 was "unknown" back at the function step 510, then that essentially means that the lockbox probably lost power while the motor was running (i.e., moving the position disk, etc.). If that unknown state occurs, then the motor will be commanded to rotate the position disk 150 toward the shackle release position. One of two possible actions will then occur: #1, the motor will continue to rotate around until reaching the shackle release position or, #2, the position disk will reach the "home" position, as indicated by the two photosensors both sensing their respective light sources at the same time. If action #1 occurs, when the motor continues to rotate the system will know that the shackle release position has been attained by the position disk 150 (note: the shackle release photosensor should detect its LED's light, at this time), and after that occurs, the motor will be commanded to rotate until the position disk reaches the "home" position. On the other hand, if action #2 occurs before action #1 occurs, then the system will realize that the "home" position has been reached and the motor can be commanded to stop at that time.

Another way of describing some of the rotatable stop positions described above can be summarized as follows: the movable indicator is in mechanical communication with the movable actuator, and the movable indicator includes at least one permanent magnet. At least one magnetic sensor is located proximal to the movable indicator, and the magnetic sensor can detect at least a portion of the magnetic field emitted by the permanent magnet if the movable indicator is at one of the appropriate predetermined positions. Each predetermined stop position of the position disk is determined by one of the magnetic sensors.

Yet another way of describing some of the rotatable stop positions described above can be summarized as follows: the movable indicator is in mechanical communication with the movable actuator, the movable indicator includes metallic portions. At least one metal proximity sensor is located proximal to the movable indicator. The metal proximity sensor can detect the metallic portions if the movable indicator is at one of the appropriate predetermined positions. Each predetermined stop position of the position disk is determined by the magnetic sensor.

Still another way of describing some of the rotatable stop positions described above, using physical contact, can be summarized as follows: the movable indicator is in mechanical communication with the movable actuator, and the movable indicator includes detectable portions. A limit switch located proximal to the movable indicator. The limit switch generates a "hit" when a detectable portion (i.e., a protrusion or a depression in the disk perimeter) is reached on the movable indicator (i.e., a predetermined position). Each predetermined stop position of the position disk is determined by the limit switch. Yet another possibility is to use a potentiometer to detect the position of the movable actuator.

When the lockbox is received from the "factory," the barrel position disk will have already been set to the "home" position. Therefore, at function step 510, the first possible state will be the detected state by the lockbox operating system, and the lockbox will be in a physical state where it can execute its various commands to release (unlock) the shackle or release (unlock) the key bin. On the other hand, if the lockbox is in one of the other states #2 through #5, the control logic will be aware of why the position disk is at its current state, and will know how to command its future operations. It will be understood that the flow chart of FIGS. 32-33 does not show every detail of computer logic for fully controlling the motor, and that other commands or routines can be executed, as needed, to properly control these functions.

It will also be understood that this portion of the overall lockbox control logic will execute in real time in a multitasking computer operating system, so that these functions depicted on this flow chart of FIGS. 32-33 are available to be performed essentially at all times (once the system has been initialized), but also there are multiple other functions that will also be executed in real time, such as receiving data from the keypad or from the communications circuits, for example. In general, the lockbox controller operations will usually jump between tasks so quickly that a human user will not notice much, or any, time delay between those tasks.

Another way of describing some of the above features can be summarized as follows: in a system for operating an electronic lockbox, there typically will be a housing, an electronic control circuit, a key bin, a shackle, a prime mover, and a movable actuator that rotates. The electronic control circuit includes a computer processing circuit, a memory circuit (including executable instructions for the processing circuit), an input/output interface circuit, and a prime mover driver circuit. The rotatable actuator has three predetermined stop positions: at a home position a key bin release position, and a shackle release position.

Yet another way of describing some of the rotatable stop positions described above can be summarized as follows: the movable optical indicator is in mechanical communication with the movable actuator. At least one light source emits electromagnetic energy towards the optical indicator, and a photosensor that is located proximal to the optical indicator can detect at least a portion of the electromagnetic energy emitted by the light source if the optical indicator is at one of the appropriate predetermined positions. Each predetermined rotatable stop position is determined by one of the photosensors. The optical signal emitted by one of the light sources is directed at one of the photosensors, but the movable indicator disk blocks that optical signal at most of the rotatable positions. Only when the indicator disk is at a correct predetermined position will there be an opening, or a window, in the disk that allows the light to pass all the way to the photosensor.

Some additional information about "basic" lockbox embodiments, including advanced features, are more fully described in earlier patent documents by some of the same inventors, and assigned to SentriLock, Inc. or SentriLock LLC, including: U.S. Pat. No. 7,009,489, issued Mar. 7, 2006, for ELECTRONIC LOCK SYSTEM AND METHOD FOR ITS USE; U.S. Pat. No. 6,989,732, issued Jan. 24, 2006, for ELECTRONIC LOCK SYSTEM AND METHOD FOR ITS USE WITH CARD ONLY MODE; U.S. Pat. No. 7,086,258, issued Aug. 8, 2006, for ELECTRONIC LOCK BOX WITH SINGLE LINEAR ACTUATOR OPERATING TWO DIFFERENT LATCHING MECHANISMS; U.S. Pat. No. 7,420,456, issued Sep. 2, 2008, for ELECTRONIC LOCK BOX WITH MULTIPLE MODES AND SECURITY STATES; U.S. Pat. No. 7,193,503, issued Mar. 20, 2007, for ELECTRONIC LOCK SYSTEM AND METHOD FOR ITS USE WITH A SECURE MEMORY CARD; U.S. Pat. No. 7,999,656, issued Aug. 16, 2011, for ELECTRONIC LOCK BOX WITH KEY PRESENCE SENSING; U.S. Pat. No. 7,734,068, issued Jun. 8, 2010, for ELECTRONIC LOCK BOX USING A BIOMETRIC IDENTIFICATION DEVICE; U.S. Pat. No. 8,451,088, issued May 28, 2013, for ELECTRONIC LOCK BOX WITH TRANSPONDER BASED COMMUNICATIONS; U.S. Pat. No. 8,164,419, issued Apr. 24, 2012, for ELECTRONIC LOCK BOX WITH TIME-RELATED DATA ENCRYPTION BASED ON USER-SELECTED PIN; U.S. Pat. No. 8,151,608, issued Apr. 10, 2012, for ELECTRONIC LOCK BOX WITH MECHANISM IMMOBILIZER FEATURES; U.S. Pat. No. 9,208,466, issued on Nov. 18, 2015, for ELECTRONIC LOCK BOX SYSTEM WITH INCENTIVIZED FEEDBACK; U.S. Pat. No. 8,593,252, issued Nov. 26, 2013, for ELECTRONIC LOCK BOX PROXIMITY ACCESS CONTROL; U.S. Pat. No. 8,912,884, issued Dec. 16, 2014, for ELECTRONIC KEY LOCKOUT CONTROL IN LOCKBOX SYSTEM; U.S. Pat. No. 9,053,629, issued on May 20, 2015, for CONTEXTUAL DATA DELIVERY TO MOBILE USERS RESPONSIVE TO ACCESS OF AN ELECTRONIC LOCKBOX; U.S. Pat. No. 9,478,083, issued on Oct. 5, 2016, for ELECTRONIC KEY LOCKOUT CONTROL IN LOCKBOX SYSTEM; U.S. Pat. No. 9,704,315, issued on Jun. 21, 2017, for CONTEXTUAL DATA DELIVERY TO OTHER USERS AT AN ELECTRONIC LOCKBOX; U.S. Pat. No. 10,068,399, issued on Aug. 21, 2018, for CONTEXTUAL DATA DELIVERY TO OTHER USERS AT AN ELECTRONIC LOCKBOX; and U.S. Pat. No. 10,026,250, issued on Jun. 27, 2018, for CONTEXTUAL DATA DELIVERY TO USERS AT A LOCKED PROPERTY. These patent documents are incorporated by reference herein, in their entirety.

All documents cited in the Background and in the Detailed Description are, in relevant part, incorporated herein by reference; the citation of any document is not to be construed as an admission that it is prior art with respect to the technology disclosed herein.

It will be understood that the logical operations described in relation to the flow charts of FIGS. 32-33 can be implemented using sequential logic (such as by using microprocessor technology), or using a logic state machine, or perhaps by discrete logic; it even could be implemented using parallel processors. One preferred embodiment may use a microprocessor or microcontroller (e.g., microprocessor 16) to execute software instructions that are stored in memory cells within an ASIC. In fact, the entire microprocessor 16, along with RAM and executable ROM, may be contained within a single ASIC, in one mode of the technology disclosed herein. Of course, other types of circuitry could be used to implement these logical operations depicted in the drawings without departing from the principles of the technology disclosed herein. In any event, some type of processing circuit will be provided, whether it is based on a microprocessor, a microcomputer, a microcontroller, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information (such as the lockbox access log data stored, for example, in memory elements 21 or 23), or perhaps by a type of memory device not yet invented.

It will also be understood that the precise logical operations depicted in the flow charts of FIGS. 32-33, and discussed above, could be somewhat modified to perform similar, although perhaps not exact, functions without departing from the principles of the technology disclosed herein. The exact nature of some of the decision steps and other commands in these flow charts are directed toward specific future models of lockbox systems (those involving lockboxes sold by SentriLock, LLC, for example) and certainly similar, but somewhat different, steps would be taken for use with other models or brands of lockbox systems in many instances, with the overall inventive results being the same.

It will be further understood that any type of product described herein that has moving parts, or that performs functions (such as computers with processing circuits and memory circuits), should be considered a "machine," and not merely as some inanimate apparatus. Such "machine" devices should automatically include power tools, printers, electronic locks, and the like, as those example devices each have certain moving parts. Moreover, a computerized device that performs useful functions should also be considered a machine, and such terminology is often used to describe many such devices; for example, a solid-state telephone answering machine may have no moving parts, yet it is commonly called a "machine" because it performs well-known useful functions.

Additionally, it will be understood that a computing product that includes a display to show information to a human user, and that also includes a "user operated input circuit" so the human user is able to enter commands or data, can be provided with a single device that is known as a "touchscreen display." In other words, if a patent claim recites a "display" and a "user operated input circuit" as two separate elements, then a single touchscreen display, in actually, is exactly the same thing. It should be noted that a touchscreen display usually includes a virtual keypad, and therefore, a "user operated input circuit" typically comprises a virtual keypad, particularly on smart phones and on tablet computers. Moreover, in this situation, the word "virtual" means that it is not a hardware keypad; more specifically, "virtual" means that it is formed (i.e., "created") on the display screen because of software being executed by a processing circuit.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A latching apparatus for an electronic lockbox comprising:
   (a) a movable actuator having the general shape of a hollow cylinder with at least two open ends, said hollow cylinder including at least one interior protrusion; the movable actuator including:
      (i) a cylindrically-shaped rotatable barrel;
      (ii) a movable two-piece outer sleeve, including a bottom sleeve and a top sleeve; and
      (iii) a first torsion spring mechanically coupled to said cylindrically-shaped rotatable barrel and said top sleeve, in a configuration that holds said first torsion spring under tension to a predetermined torque;
      (iv) a second torsion spring mechanically coupled to said top sleeve and said bottom sleeve in a configuration that holds said second torsion spring under tension to a predetermined torque in a direction opposite said first torsion spring; and
   (b) a first latch hook at the distal end of a first latch pin;
   (c) wherein: an interior protrusion of said at least one interior protrusions exhibits a helical geometry surface, such that if said first latch pin is inserted into said cylindrically-shaped rotatable barrel, said first latch pin slides along said helical geometry surface, forcing said barrel to rotate, and once said first latch pin mechanically clears a final portion of said helical geometry surface, said first latch pin latches with said interior protrusion, and said cylindrically-shaped rotatable barrel rotates back to a neutral position, due to the tension of said first torsion spring and said second torsion spring.

2. The latching apparatus of claim 1, further comprising:
   (a) a housing;
   (b) an electronic control circuit, including: a computer processing circuit, a memory circuit including instructions executable by the processing circuit, an input/output interface circuit, a prime mover driver circuit;
   (c) a key bin that is either locked in place with respect to said hollow cylinder or is released, which is under the control of the computer processing circuit;
   (d) a shackle that is either locked in place with respect to said hollow cylinder or is released, which is under the control of the computer processing circuit; and
   (e) a prime mover that is in mechanical communication with said movable actuator, and controls movements of said movable actuator, said prime mover receiving energy from the prime mover driver circuit under the control of the computer processing circuit.

3. The latching apparatus of claim 2, wherein:
   said movable actuator having a plurality of predetermined stop positions at least at:
   (a) a home position;
   (b) a key bin release position; and
   (c) a shackle release position;
   said movable actuator having said at least one interior protrusion that either locks one of said key bin and said shackle in place, or releases one of said key bin and said shackle, depending upon a physical position of said movable actuator.

4. The latching apparatus of claim 3, wherein:
   (a) if said movable actuator is positioned at said home position, then both said key bin and said shackle are locked in place;
   (b) if said movable actuator is positioned at said key bin release position, then said key bin is in a released state and its contents become available to a human user; and
   (c) if said movable actuator is positioned at said shackle release position, then said shackle is in a released state and can be removed by a human user.

5. The latching apparatus of claim 1; further comprising:
(a) a movable indicator that is in mechanical communication with said movable actuator;
(b) at least one sensor that is located proximal to said movable indicator, said at least one sensor detecting at least a portion of the movable indicator; and
if said movable indicator has been moved to a predetermined position, then said at least one sensor generates at least one output signal that is related to the detected movable indicator;
(c) wherein:
  (i) if said movable actuator is positioned at a home position as determined by said at least one sensor, then both a key bin and a shackle are locked in place;
  (ii) if said movable actuator is positioned at a key bin release position as determined by said at least one sensor, said key bin is in a released state and its contents become available to a human user; and
  (iii) if said movable actuator is positioned at a shackle release position as determined by said at least one sensor, said shackle is in a released state and can be removed by a human user.

* * * * *

UNITED STATES PATENT AND TRADEMARK OFFICE
CERTIFICATE OF CORRECTION

PATENT NO. : 12,480,333 B2
APPLICATION NO. : 18/237181
DATED : November 25, 2025
INVENTOR(S) : Scott R. Fisher et al.

It is certified that error appears in the above-identified patent and that said Letters Patent is hereby corrected as shown below:

In the Claims

Claim 1 should read:
1. A latching apparatus for an electronic lockbox comprising:
    (a) a movable actuator having the general shape of a hollow cylinder with at least two open ends, said hollow cylinder including at least one interior protrusion; the movable actuator including:
        (i) a cylindrically-shaped rotatable barrel;
        (ii) a movable two-piece outer sleeve, including a bottom sleeve and a top sleeve; and
        (iii) a first torsion spring mechanically coupled to said cylindrically-shaped rotatable barrel and said top sleeve, in a configuration that holds said first torsion spring under tension to a predetermined torque;
        (iv) a second torsion spring mechanically coupled to said top sleeve and said bottom sleeve in a configuration that holds said second torsion spring under tension to a predetermined torque in a direction opposite said first torsion spring; and
    (b) a first latch hook at the distal end of a first latch pin;
    (c) wherein: an interior protrusion of said at least one interior protrusion exhibits a helical geometry surface, such that if said first latch pin is inserted into said cylindrically-shaped rotatable barrel, said first latch pin slides along said helical geometry surface, forcing said barrel to rotate, and once said first latch pin mechanically clears a final portion of said helical geometry surface, said first latch pin latches with said interior protrusion, and said cylindrically-shaped rotatable barrel rotates back to a neutral position, due to the tension of said first torsion spring and said second torsion spring.

Signed and Sealed this
Sixth Day of January, 2026

John A. Squires
*Director of the United States Patent and Trademark Office*